(12) United States Patent
Dix et al.

(10) Patent No.: US 12,466,297 B1
(45) Date of Patent: Nov. 11, 2025

(54) REMOVABLE TRIM COVER WITH HEADREST GUIDE

(71) Applicant: Toyota Motor Engineering & Manufacturing North America, Inc., Plano, TX (US)

(72) Inventors: William P. Dix, Highland Park, MI (US); Emily M. Deming, Ann Arbor, MI (US); Vasudeva S. Murthy, Ann Arbor, MI (US); John D. Harkleroad, Ypsilanti, MI (US); Alexander W. Schuyler, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 19/002,877

(22) Filed: Dec. 27, 2024

Related U.S. Application Data

(63) Continuation-in-part of application No. 18/785,470, filed on Jul. 26, 2024.

(51) Int. Cl.
*A47C 31/02* (2006.01)
*B60N 2/00* (2006.01)
(Continued)

(52) U.S. Cl.
CPC ......... *B60N 2/6018* (2013.01); *B60N 2/0034* (2023.08); *B60N 2/5642* (2013.01);
(Continued)

(58) Field of Classification Search
CPC .. B60N 2/5825; B60N 2/6018; B60N 2/5816; B60N 2/60; B60N 2/58; B60N 2/6027;
(Continued)

(56) References Cited

U.S. PATENT DOCUMENTS 4,143,909 A 3/1979 McFarlin
4,784,890 A 11/1988 Black
(Continued)

FOREIGN PATENT DOCUMENTS

CN 118201808 A 6/2024
DE 102009006985 A1 8/2010
(Continued)

OTHER PUBLICATIONS

Legendary Auto Interiors Ltd, "68 Javelin/AMX 'Zippered' Headrest Covers—Black", Retrieved from the Internet: <https://www.legendaryautointeriors.com/products/hc68aaj0014100a>, Retrieved Dec. 17, 2024. (10 pages).
(Continued)

*Primary Examiner* — Shin H Kim
(74) *Attorney, Agent, or Firm* — Christopher G. Darrow; Darrow Mustafa PC

(57) ABSTRACT

A removable trim cover described herein includes a headrest guide to ensure alignment of the removable trim cover to the seat. In one embodiment, the removable trim cover includes a material body sized to cover a front face of a backrest of a seat. The material body has apertures forming a headrest guide. The headrest guide is adapted to align with headrest sleeves in the backrest. The removable trim cover also includes a first zipper portion, disposed around a border of the material body, adapted to be joined with a second zipper portion affixed to the backrest.

24 Claims, 41 Drawing Sheets

(51) Int. Cl.
  *B60N 2/56* (2006.01)
  *B60N 2/60* (2006.01)
  *B60N 2/897* (2018.01)
  *B60N 2/90* (2018.01)

(52) U.S. Cl.
  CPC ......... *B60N 2/5657* (2013.01); *B60N 2/5685* (2013.01); *B60N 2/897* (2018.02); *B60N 2/976* (2018.02); *B60N 2002/981* (2018.02)

(58) Field of Classification Search
  CPC .. B60N 2/6036; B60N 2/5833; B60N 2/7005; B60N 2/5883; B60N 2/5891; B60N 2/6009; B60N 2/64; B60R 21/20
  See application file for complete search history.

(56) References Cited

U.S. PATENT DOCUMENTS

| | | | |
|---|---|---|---|
| 4,844,539 A | 7/1989 | Selbert | |
| 4,860,415 A | 8/1989 | Witzke | |
| 5,503,428 A | 4/1996 | Awotwi et al. | |
| 5,556,129 A | 9/1996 | Coman et al. | |
| 5,601,332 A | 2/1997 | Schultz et al. | |
| 5,820,213 A | 10/1998 | Severinski | |
| 5,820,214 A | 10/1998 | Bessette et al. | |
| 5,863,063 A | 1/1999 | Harrell | |
| 5,967,603 A | 10/1999 | Genders et al. | |
| 6,045,151 A | 4/2000 | Wu | |
| 6,067,777 A * | 5/2000 | Stoll | B65B 53/02 53/442 |
| 6,079,779 A | 6/2000 | Tanaka et al. | |
| 6,206,467 B1 | 3/2001 | Mense et al. | |
| 6,254,183 B1 | 7/2001 | Bian et al. | |
| 6,588,838 B1 | 7/2003 | Dick, Jr. et al. | |
| 7,134,685 B2 | 11/2006 | Panagos et al. | |
| 7,195,274 B2 | 3/2007 | Tracht | |
| 7,195,277 B2 | 3/2007 | Tracht et al. | |
| 7,290,791 B2 | 11/2007 | Tracht | |
| 7,290,792 B2 | 11/2007 | Tracht | |
| 7,290,793 B2 | 11/2007 | Tracht | |
| 7,290,794 B2 | 11/2007 | Tracht | |
| 7,311,325 B2 | 12/2007 | Tracht et al. | |
| 7,390,059 B2 | 6/2008 | Brockschnieder et al. | |
| 7,461,894 B2 | 12/2008 | Leeds | |
| 7,506,939 B2 | 3/2009 | Brockschnieder et al. | |
| 7,654,612 B2 | 2/2010 | Tracht et al. | |
| 7,673,939 B2 * | 3/2010 | Taguchi | B60N 2/72 297/218.4 |
| 7,841,656 B2 | 11/2010 | Tracht et al. | |
| 7,883,105 B2 | 2/2011 | Smith | |
| 7,946,649 B2 | 5/2011 | Galbreath et al. | |
| 8,177,256 B2 | 5/2012 | Smith et al. | |
| 8,465,093 B2 | 6/2013 | Janowski | |
| 8,573,635 B2 | 11/2013 | Festag et al. | |
| 8,733,834 B2 | 5/2014 | Palmer | |
| 8,820,833 B2 * | 9/2014 | Tsuchiya | B60N 2/682 297/228.13 |
| 9,027,958 B2 | 5/2015 | Tracht | |
| 9,505,329 B2 | 11/2016 | Mori et al. | |
| 9,555,728 B2 | 1/2017 | Galbreath et al. | |
| 9,643,518 B2 | 5/2017 | Correia et al. | |
| 10,124,699 B2 | 11/2018 | Galbreath et al. | |
| 10,144,323 B2 | 12/2018 | Hosbach et al. | |
| 10,155,462 B2 | 12/2018 | Mohr | |
| 10,173,563 B2 | 1/2019 | Kurobe et al. | |
| 10,232,749 B2 | 3/2019 | Fujikake et al. | |
| 10,251,491 B2 | 4/2019 | Nishino et al. | |
| 10,328,828 B2 | 6/2019 | Fujikake et al. | |
| 10,369,910 B1 | 8/2019 | Atragene et al. | |
| 10,414,303 B2 | 9/2019 | Fujikake et al. | |
| 10,414,306 B2 | 9/2019 | Kumagai et al. | |
| 10,518,735 B2 | 12/2019 | Kondrad et al. | |
| 10,654,384 B2 | 5/2020 | Nagasawa et al. | |
| 10,668,841 B2 | 6/2020 | Feng | |
| 10,676,001 B2 | 6/2020 | Baba et al. | |
| 10,703,232 B2 | 7/2020 | Matsui et al. | |
| 10,730,420 B2 | 8/2020 | Francois | |
| 10,773,619 B1 * | 9/2020 | Hamlin | B60N 2/6027 |
| 10,787,149 B2 | 9/2020 | Kaltschmidt et al. | |
| 10,933,783 B1 * | 3/2021 | Hamlin | B60N 2/5825 |
| 11,072,304 B2 | 7/2021 | Yang | |
| 11,135,951 B2 | 10/2021 | Marquès et al. | |
| 11,225,191 B2 * | 1/2022 | Ali | H05K 3/12 |
| 11,458,871 B2 | 10/2022 | Diamond et al. | |
| 11,505,099 B2 | 11/2022 | Gomez et al. | |
| 11,505,152 B2 | 11/2022 | Tanabe et al. | |
| 11,541,835 B2 | 1/2023 | Hamm et al. | |
| 11,548,420 B2 | 1/2023 | Mauffrey et al. | |
| 11,607,979 B2 | 3/2023 | Hallock et al. | |
| 11,617,451 B1 * | 4/2023 | Caruso | A47C 7/00 297/217.3 |
| 11,628,792 B2 | 4/2023 | Kondou et al. | |
| 11,760,242 B2 | 9/2023 | Reith et al. | |
| 11,787,320 B2 | 10/2023 | Gasko et al. | |
| 11,981,232 B2 | 5/2024 | Riva et al. | |
| 11,992,130 B2 | 5/2024 | Chee | |
| 12,036,904 B2 | 7/2024 | Sumoto et al. | |
| 12,139,057 B1 * | 11/2024 | White | B60N 2/914 |
| 2002/0101109 A1 | 8/2002 | Stiller et al. | |
| 2005/0156412 A1 | 7/2005 | Panagos et al. | |
| 2006/0214485 A1 | 9/2006 | Brockschnieder | |
| 2009/0160230 A1 * | 6/2009 | Yasuda | B60N 2/5825 297/228.13 |
| 2015/0008710 A1 * | 1/2015 | Young | B60N 2/0276 297/217.3 |
| 2015/0313475 A1 * | 11/2015 | Benson | A61B 5/6893 600/323 |
| 2016/0347221 A1 | 12/2016 | Hayashi et al. | |
| 2017/0253157 A1 | 9/2017 | Nagasawa et al. | |
| 2018/0345832 A1 | 12/2018 | Kumagai et al. | |
| 2019/0248744 A1 | 8/2019 | Mondelaers et al. | |
| 2019/0337430 A1 * | 11/2019 | Nourollah | B60N 2/60 |
| 2019/0389347 A1 * | 12/2019 | Francescatto | B60N 2/60 |
| 2020/0017007 A1 * | 1/2020 | Feng | B60N 2/6036 |
| 2020/0194935 A1 * | 6/2020 | Gallagher | B60N 2/0264 |
| 2020/0238864 A1 | 7/2020 | Heiden et al. | |
| 2020/0238877 A1 | 7/2020 | Heiden et al. | |
| 2021/0188139 A1 | 6/2021 | Fang | |
| 2022/0153172 A1 | 5/2022 | Sumoto et al. | |
| 2022/0340060 A1 | 10/2022 | Mitsuoka et al. | |
| 2024/0108495 A1 * | 4/2024 | Gerrett | B60N 2/5678 |

FOREIGN PATENT DOCUMENTS

| | | |
|---|---|---|
| DE | 102011009773 A1 | 8/2012 |
| DE | 102017215998 A1 | 3/2019 |
| DE | 102018202153 A1 | 8/2019 |
| DE | 102019106879 A1 | 9/2020 |
| DE | 202020105440 U1 | 10/2020 |
| DE | 102021114867 A1 | 8/2022 |
| EP | 2075156 A2 | 7/2009 |
| EP | 2412569 A1 | 2/2012 |
| EP | 2961631 A1 | 1/2016 |
| EP | 2998156 A1 | 3/2016 |
| EP | 3221183 A1 | 9/2017 |
| EP | 3486113 A1 | 5/2019 |
| EP | 4043277 A1 | 8/2022 |
| FR | 1593125 A | 5/1970 |
| FR | 2298988 A1 | 8/1976 |
| FR | 2792585 A1 | 10/2000 |
| FR | 2833899 A1 | 6/2003 |
| FR | 2900607 A1 | 11/2007 |
| FR | 2923768 A1 | 5/2009 |
| FR | 2952867 A3 | 5/2011 |
| FR | 3002499 | 8/2014 |
| FR | 3007702 A1 | 1/2015 |
| FR | 3014780 A1 | 6/2015 |
| FR | 3026359 A1 | 4/2016 |
| FR | 3028466 A1 | 5/2016 |
| FR | 3028467 A1 | 5/2016 |
| JP | 0614628 Y2 | 4/1994 |
| JP | 2006122594 A | 5/2006 |

(56) References Cited

FOREIGN PATENT DOCUMENTS

| WO | 2011002951 A1 | 1/2011 |
| WO | 2012139759 A1 | 10/2012 |
| WO | 2019183488 A1 | 3/2018 |
| WO | 2023244758 A1 | 12/2023 |

OTHER PUBLICATIONS

Covercraft, "PrecisionFit Seat Covers", Retrieved from the Internet: <https://www.covercraft.com/c/precisionfit-seat-covers?gclid=Cj0KCQiAvP-6BhDyARIsAJ3uv7YZx5c8wgXX316vLjuLePL67p5TXtf6FJarlBjbHhq_xFVLy-7ie2oaAkidEALw_wcB&gad_source=1>, Retrieved Dec. 17, 2024. (2 pages).

Clazzio, "Clazzio Seat Covers—The Best Seat Covers Earth!", Retrieved from the Internet: <https://www.clazzio.com/>, Retrieved Dec. 17, 2024. (7 pages).

Katzkin, "Custom Leather Seat Covers, Leather Seats, & Interiors | Katzkin", Retrieved from the Internet: <https://katzkin.com/>, Retrieved Dec. 17, 2024. (9 pages).

Saddleman, "Custom Car & Truck Seat Covers for Every Ride | Saddleman", Retrieved from the Internet: <https://www.saddleman.com/>, Retrieved Dec. 17, 2024. (7 pages).

Amazon, "Luckyman Club Seat Covers", Retrieved from the Internet: <https://www.amazon.com/s?k=luckyman+club+seat+covers>, Retrieved Dec. 17, 2024. (12 Pages).

Weathertech, "Vehicle Seat Covers & Car Seat Protectors for Pets | WeatherTech", Retrieved from the Internet: <https://www.weathertech.com/seat-protectors/?gad_source=1&gclid=Cj0KCQiAvP-6BhDyARIsAJ3uv7YK3PImm6SbOLYtbXxdxOLAqyhnnej2ha18T1c6XamMsWAK5rdW6doaAoksEALw_wcB>, Retrieved Dec. 17, 2024. (11 Pages).

Tigertough, "Best Work Truck and Heavy Equipment Seat Covers—TigerTough", Retrieved from the Internet: <https://www.tigertough.com/?tw_source=google&tw_adid=&tw_campaign=20419907445&gad_source=1&gclid=Cj0KCQiAvP-6BhDyARIsAJ3uv7Zdpxx4320ZbxPE6KgkQb-5AVJaZXoWrR85w_0h89BjHsYZbVmFyK0aAk5DEALw_wcB>, Retrieved Dec. 17, 2024. (9 Pages).

e-guide.renault.com, "e-guide.renault.com / Captur / Make the most of all your . . . ", Retrieved from the Internet: <https://gb.e-guide.renault.com/eng/Captur/SEAT-COVERINGS>, Retrieved Dec. 17, 2024. (5 pages).

Youtube, "Renault Captur—Zip collection seat covers // Housses zip collection", Retrieved from the Internet: <https://www.youtube.com/watch?v=86T-9odJaxU>, Retrieved Dec. 17, 2024. (2 pages).

Youtube, "Renault Captur Zen removable seat covers", Retrieved from the Internet: <https://www.youtube.com/shorts/k5RMsN268BQ> Retrieved Dec. 17, 2024. (2 pages).

\* cited by examiner

REMOVABLE TRIM COVER WITH HEADREST GUIDE

CROSS-REFERENCE TO RELATED APPLICATIONS

This application is a continuation-in-part of U.S. Non-Provisional application Ser. No. 18/785,470, filed on Jul. 26, 2024, which is herein incorporated by reference in its entirety.

TECHNICAL FIELD

The present invention relates to vehicle seat upholstery and, more particularly, to a removable trim cover adapted to be applied to a backrest cushion of a vehicle seat and a removable seat cover adapted to be applied to a bottom cushion of the vehicle seat.

BACKGROUND

Vehicle passengers may spend many hours, sometimes in a single day, traveling in a vehicle. Given these durations, an individual may desire a comfortable and ergonomic seat that prevents discomfort and pain, that is aesthetically pleasing, and that allows a driver to focus on the driving environment. In general, a seat includes a rigid frame mounted to the vehicle. The frame is a structural member that keeps occupants safe during an event, such as a collision. The frame supports padded cushions. A material cover wrapped around the padded cushions provides a comfortable, supportive, and aesthetically pleasing exterior surface.

Over time and during the ordinary course of use, the material cover may become worn down or damaged, resulting in thin spots, tears, etc. Moreover, from time to time, the material cover may become soiled or stained. For example, individuals may eat food or consume beverages in their vehicle. The food and/or beverages may spill and soil the material cover.

SUMMARY

In one aspect of the embodiments described herein, a removable trim cover is described. The removable trim cover includes a material body sized to cover a front face of a backrest of a seat. The material body includes apertures that form a headrest guide. The headrest guide is adapted to align with headrest sleeves in the backrest. The removable trim cover also includes a first zipper portion, disposed around a border of the material body. The first zipper portion is adapted to be joined with a second zipper portion affixed to the backrest.

In one aspect of the embodiments described herein, a removable trim cover is described. The removable trim cover includes a material body sized to cover a front face of a backrest of a seat and a headrest of the seat. The removable trim cover also includes a first zipper portion, disposed around a border of the material body. The first zipper portion is adapted to be joined with a second zipper portion affixed to the backrest. A central portion of the first zipper portion is adapted to be joined with a central portion of the second zipper portion that is behind the headrest of the seat.

In one aspect of the embodiments described herein, a removable cushion cover is described. The removable cushion cover includes a material cover sized to cover an occupant-facing surface of a cushion of a seat. The removable trim cover includes a first zipper portion, disposed around a border of the material cover. The first zipper portion is adapted to be joined with a second zipper portion affixed to the cushion of the seat. The removable cushion cover also includes an accessory component integrated with the material cover.

BRIEF DESCRIPTION OF THE DRAWINGS

The accompanying drawings, which are incorporated in and constitute a part of the specification, illustrate various systems, methods, and other embodiments of the disclosure. In some embodiments, one element may be designed as multiple elements or multiple elements may be designed as one element. In some embodiments, an element shown as an internal component of another element may be implemented as an external component and vice versa. Furthermore, elements may not be drawn to scale. Also, unless otherwise stated or shown, the same or similar elements shown in different views may be given the same or similar reference numerals or designations.

DETAILED DESCRIPTION

Figure 1:
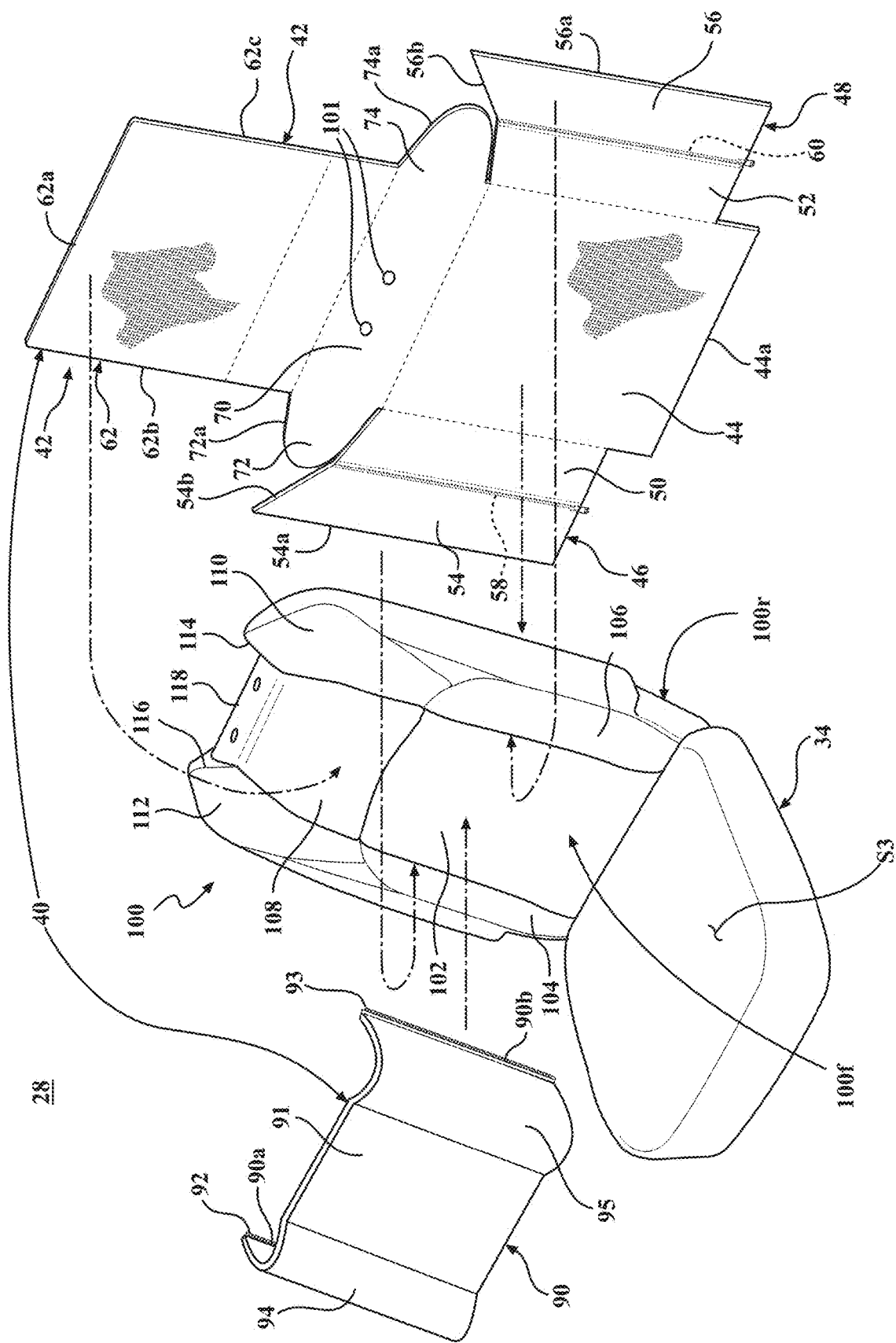
FIG. 1 is a schematic exploded perspective view of a vehicle seat incorporating a trim cover assembly in accordance with an embodiment described herein.

As described above, vehicle seats may be adorned with a material cover that 1) conceals the seat frame and cushions and 2) provides an aesthetically pleasing and comfortable surface on which the driver or occupant sits. However, over time, the material that makes up the body may wear down or become damaged, stained, or soiled. As an example, a passenger may spill a beverage from a container onto the seat of a vehicle. This liquid may stain the surface of the material cover.

In another example, a user may desire to change the aesthetic of the seat, for example, to reflect the driver's support of a particular sports team. As yet another example, a user may utilize the vehicle in certain settings where particular materials may be beneficial as seat covers. For example, a user may frequent the waterfront or rainy, snowy environments such that a waterproof seat cover may be beneficial. As yet another example, the interior of the vehicle may be prone to abrasion, for example, through the unloading or loading of equipment such as construction tools. In this example, an anti-abrasion material (e.g., a ripstop fabric) may provide more protection to the seats than fabric-based materials. That is, a user may desire to customize the interior of their vehicle in any number of ways.

In these cases and others, repairing, removing, or replacing the material body may be expensive, complex, and time-consuming. In some cases, the process may be outside the technical capability of a consumer. As such, the individual may have to temporarily leave their vehicle in the custody of a manufacturer for the desired repair, removal, or replacement. In this case, in addition to being expensive, complex, and time-consuming, the individual may be left without their vehicle as the manufacturer completes the task. Accordingly, the trim cover assembly of the present specification facilitates the facile replacement of the exterior portions of a seat.

Specifically, the present specification describes a trim cover assembly structured to be applied to a backrest cushion and a vehicle seat cushion. The trim cover assembly includes a base trim cover applied to a backrest. The base trim cover for the backrest has a rear portion, first side portion extending from a first side of the rear portion, and a second side portion extending from a second side of the rear portion opposite the first side portion. Each side portion is structured to be wrappable along a respective side of the backrest. Each side portion also has a side edge structured to be securable to the backrest along a front face of the backrest. The base trim cover may be attached to the backrest using suitable fasteners (e.g., hog-rings, EZ clips, hook and loop tape, arrow-hooks, stitching, etc.) and conventional upholstery securement methods. After attachment of the base trim cover to the backrest, a removable trim cover may be attached to the backrest and to the base trim cover. Because the base trim cover is not wrapped over the top of the seat and does not use zippers to attach to the backrest, time and labor are saved during application of the base trim cover to the backrest.

The trim cover assembly may also include a base seat cover applied to a seat. The base seat cover is structured to be wrappable around a cushion of the seat. The base seat cover may be attached to the seat bottom using suitable fasteners (e.g., hog-rings, EZ clips, hook and loop tape, arrow-hooks, stitching, etc.) and conventional upholstery securement methods. After attachment of the base seat cover to the seat bottom, a removable seat cover may be attached to the seat bottom and to the base seat cover.

The present specification also describes a removable trim cover attached to the base trim cover or the backrest via a zipper that passes behind the headrest of the vehicle. In general, zippers include rigid materials such as metal or hard thermoformed plastic. These materials may make a zipper an uncomfortable support surface. For example, a zipper that falls along the back of an occupant may be a source of discomfort for the occupant. Moreover, a metal zipper may become hot and could injure an occupant. Still further, user clothing may snag within the zipper, for example, during ingress and egress, which may damage the clothing and is an undesirable result.

Accordingly, a removable trim cover with the zipper assembly behind the headrest removes the likelihood of discomfort, injury, and potential damage to clothing by removing the contact point between the zipper and the occupant. Still further, a zipper behind the headrest is less visible to bystanders, thus enhancing the visual appeal of the seat. Moreover, the zipper location behind the headrest of the seat provides a continuous surface, uninterrupted by a zipper, on which an aesthetic pattern may be provided.

In an example, the removable trim cover also includes headrest guide holes to register, position, or datum the removable trim cover to the backrest. In this way, the removable trim cover is held in place, not sliding over the surface of the seat and/or base trim cover, which movement be an annoyance to a passenger.

In an example, the removable trim cover is also sized to cover the headrest of the seat. That is, a portion of the removable trim cover is wrappable over a fixed headrest of a vehicle, which headrest may be integrated with a backrest of the seat. In this example, a central portion of the first zipper portion on the removable trim cover is adapted to be joined with a central portion of the second zipper portion (either on the backrest itself or a base trim cover) that is behind the headrest of the seat.

Still further, the present specification also describes a removable cushion cover with accessory components such as massaging devices, heating devices, cooling elements, sensors, haptic feedback devices, and other accessory components integrated therein. The removable cushion cover may be a removable trim cover applied to the backrest of the seat or a removable seat cover applied to the bottom of the seat. A removable cushion cover may add functionality, utility, and comfort to the vehicle. For example, a vehicle seat may not be initially equipped with certain components, such as a cooling system. In this example, a user may supplement their seat with a removable trim cover with integrated cooling components to provide this desired functionality.

As used herein, the term "upper" refers to a vertically relatively higher position or location, and "lower" refers to a vertically relatively lower position or location, from the perspective of an occupant seated in the vehicle seat when the seat is mounted in a vehicle and the vehicle rests on a ground surface. Similarly, the term "left" refers to a direction on or toward a left side from the perspective of an occupant seated in the vehicle seat when the seat is mounted in a vehicle and the vehicle rests on a ground surface. Also, the term "right" refers to a direction on or toward a right side from the perspective of an occupant seated in the vehicle seat when the seat is mounted in a vehicle and the vehicle rests on a ground surface.

Moreover, as used herein, the term "material" may refer to natural or synthetic fabrics. Examples of fabrics include cloth and DuonX, among others. The material may be of other types as well, such as natural or synthetic materials, such as polyurethane, polyvinyl chloride (PVC), and/or leather. In an example, the material could be perforated to accommodate ventilation. While the present specification refers to particular materials from which components of the trim cover assembly may be formed, these components may be formed of other materials and/or combinations of these and other flexible materials, including those that are yet developed.

FIG. 1 is a schematic exploded perspective view of a vehicle seat 28 incorporating a trim cover assembly 40 in accordance with an embodiment described herein. The vehicle seat 28 may include a seat bottom 34 and a seat back or backrest 100 extending from a rear of the seat bottom 34 to support the back of a vehicle occupant in a known manner.

The backrest 100 may have a front face 100f structured to face in a direction toward a front of a vehicle in which the vehicle seat 28 is mounted. The backrest 100 may also have a rear face 100r positioned opposite the front face 100f and structured to face in a direction toward a rear of the vehicle in which the vehicle seat 28 is mounted.

Figure 4A:
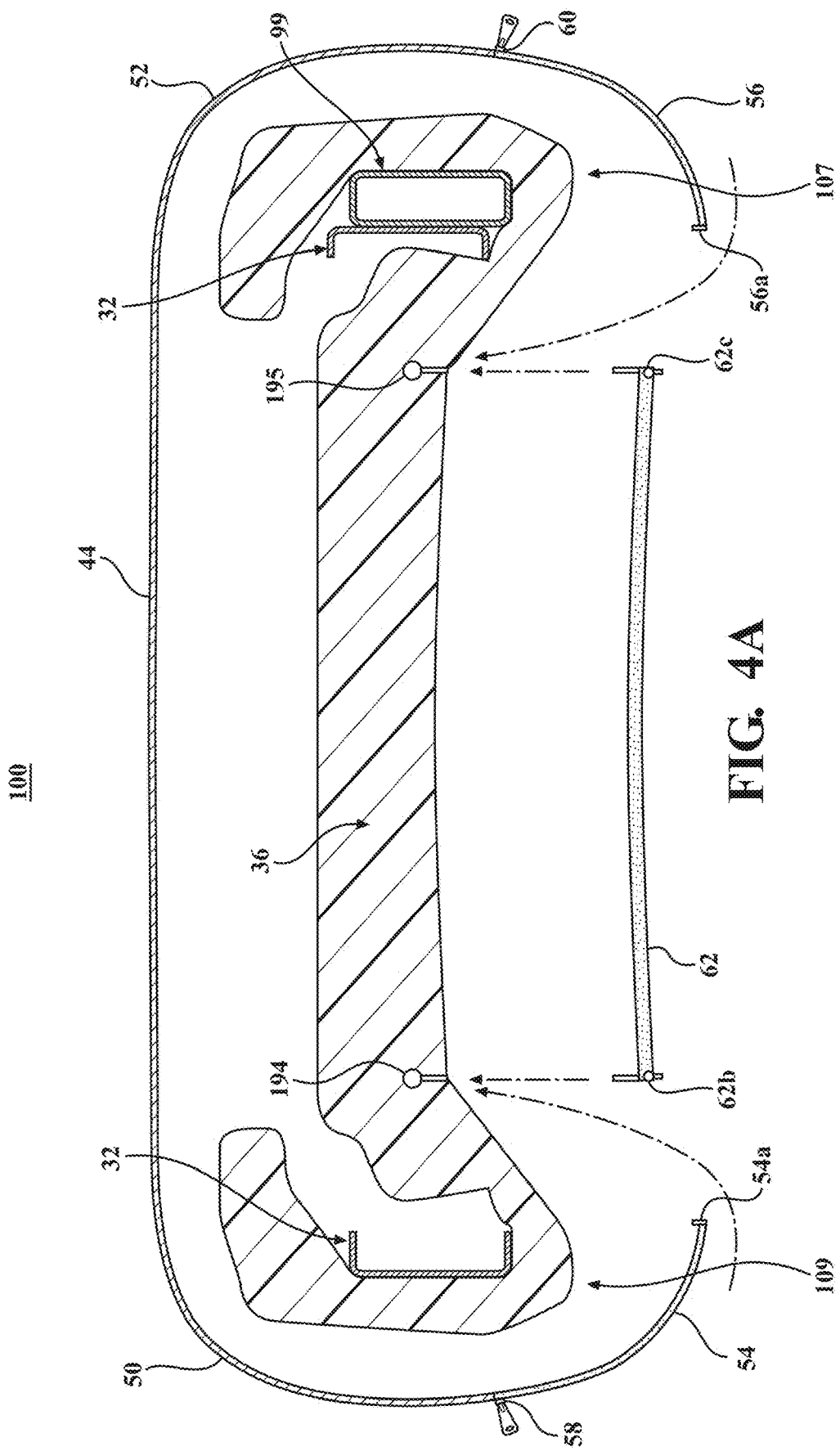
FIG. 4A is a schematic plan cross-sectional view of a portion of the backrest of FIG. 2, illustrating an initial stage of application of the base trim cover of FIG. 3 to the backrest.
Figure 4B:
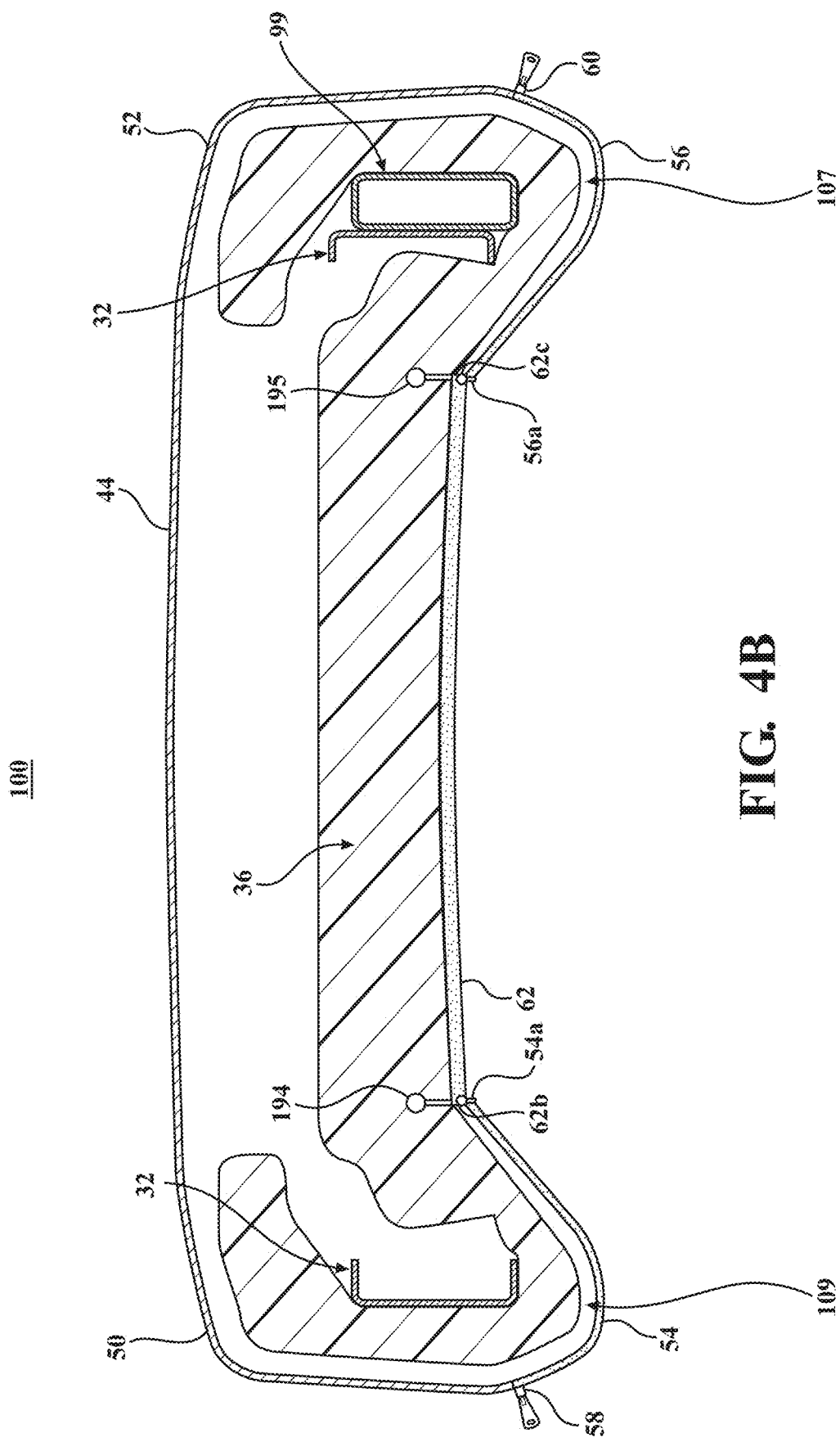
FIG. 4B is the schematic plan cross-sectional view of FIG. 4A, illustrating a later stage of application of the base trim cover of FIG. 3 to the backrest.
Figure 4C:
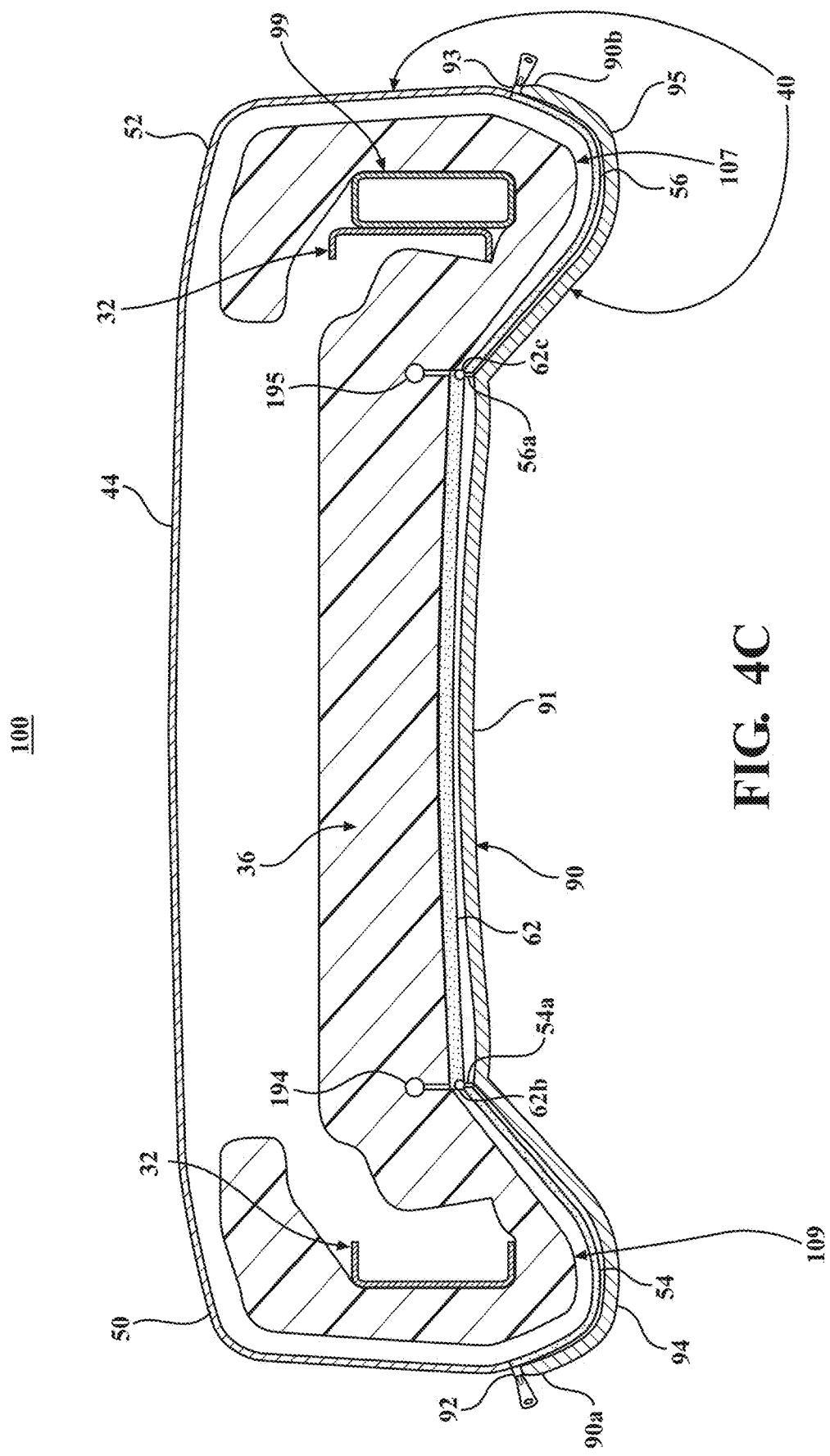
FIG. 4C is the schematic plan cross-sectional view of FIG. 4B, illustrating application of a removable trim cover to the backrest over the base trim cover after the base trim cover has been secured to the backrest.

Referring to FIGS. 4A-4C, the backrest 100 may have a frame 32 structured to enable attachment of seat padding 36 and one or more seat covers thereto. The backrest frame 32 may define structure that (when suitably padded) supports various portions of a seat occupant's upper body in a desired manner. For example, the backrest frame 32 may include supporting structure for seat bolsters which may operate to support an occupant along the sides of the seat 28, help keep a driver in control during an emergency, help keep a driver's body in the proper posture, and prevent the driver from sliding sideways during turns. The backrest frame 32 may be formed from a suitably rigid material such as metal or a polymer, for example. An airbag module 99 may be attached to the frame 32 prior to application of the trim cover assembly 40 to the seat frame as described herein.

Figure 2:
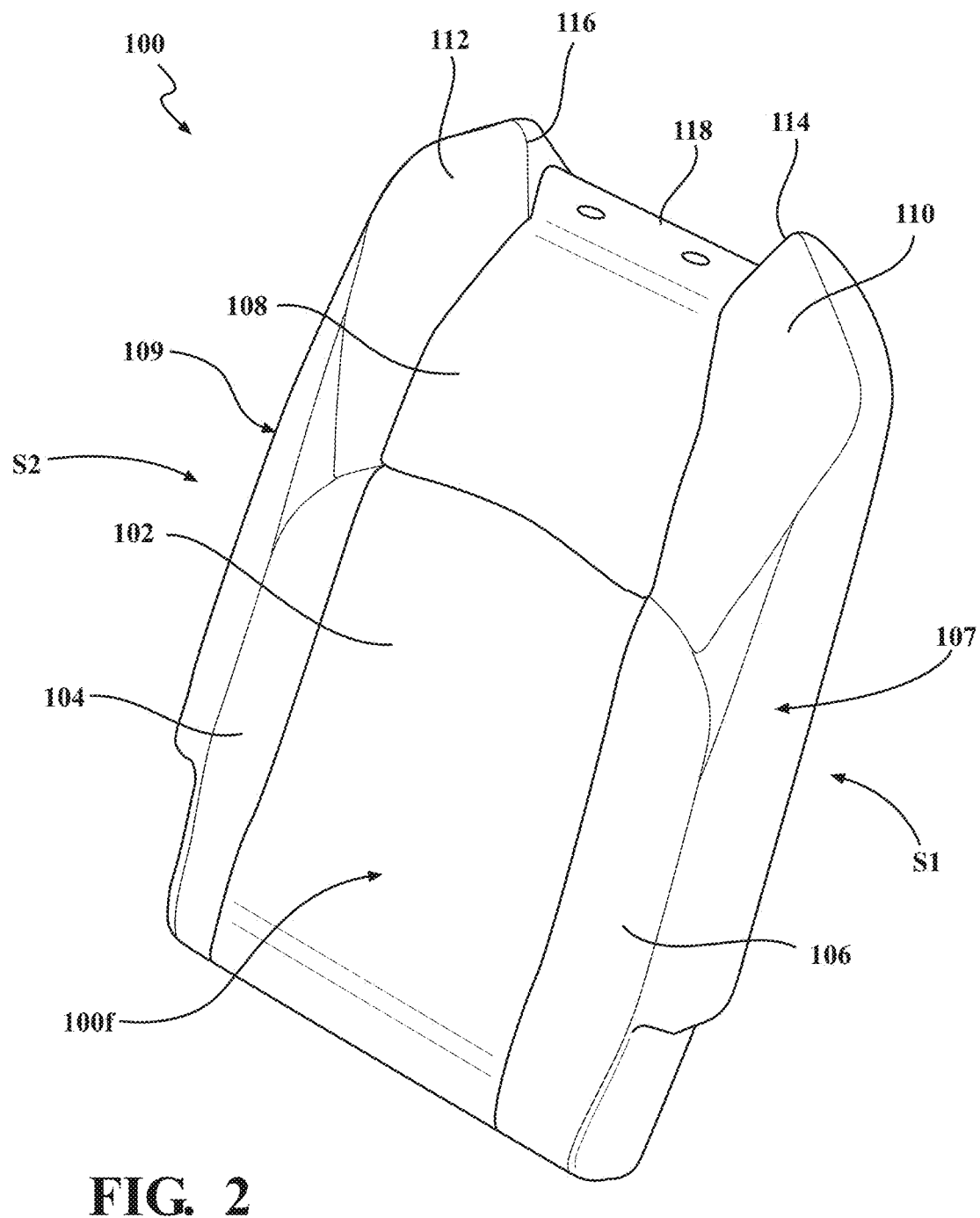
FIG. 2 is a schematic frontal view of a backrest of the vehicle seat of FIG. 1, showing various sections of padding covering a frame of the backrest.

The backrest 100 may have padding (e.g., foam padding) wrapped over the backrest frame 32 so as to overlie portions of the frame 32 and cushion the seat occupant. FIG. 2 is a schematic frontal perspective view of the backrest 100 of the vehicle seat of FIG. 1, showing various portions of the backrest as covered by associated sections of padding applied over the frame 32, and prior to application of any trim covers to the backrest. Referring to FIG. 2, in one or more arrangements, the backrest 100 may have a lower portion 102, and an upper portion 108 positioned above the lower portion 102 of the backrest 100. The backrest 100 may include a left side bolster 107 having a lower portion 106 and an upper portion 110 extending from a left edge of the backrest 100. The backrest 100 may also include a right side bolster 109 having a lower portion 104 and an upper portion 112 extending from a right edge of the backrest 100. In addition, the left side bolster 107 may include a left upper bolster end portion 114 angling inwardly and downwardly toward a centrally-positioned headrest portion 118 of the backrest 100. Similarly, the right side bolster 109 may include a right upper bolster end portion 116 angling inwardly and downwardly toward the headrest portion 118. The backrest frame 32 may also have additional elements (e.g., seat heater mats) of the seat 28 attached thereto.

In its assembled form, the seat backrest 100 may include a backrest trim cover assembly (generally designated 40) applied to the padded backrest. As used herein, "applied" refers to attachment of an element of the backrest trim cover assembly to the backrest or to another element of the backrest trim cover assembly during the vehicle seat fabrication process.

Figure 3:
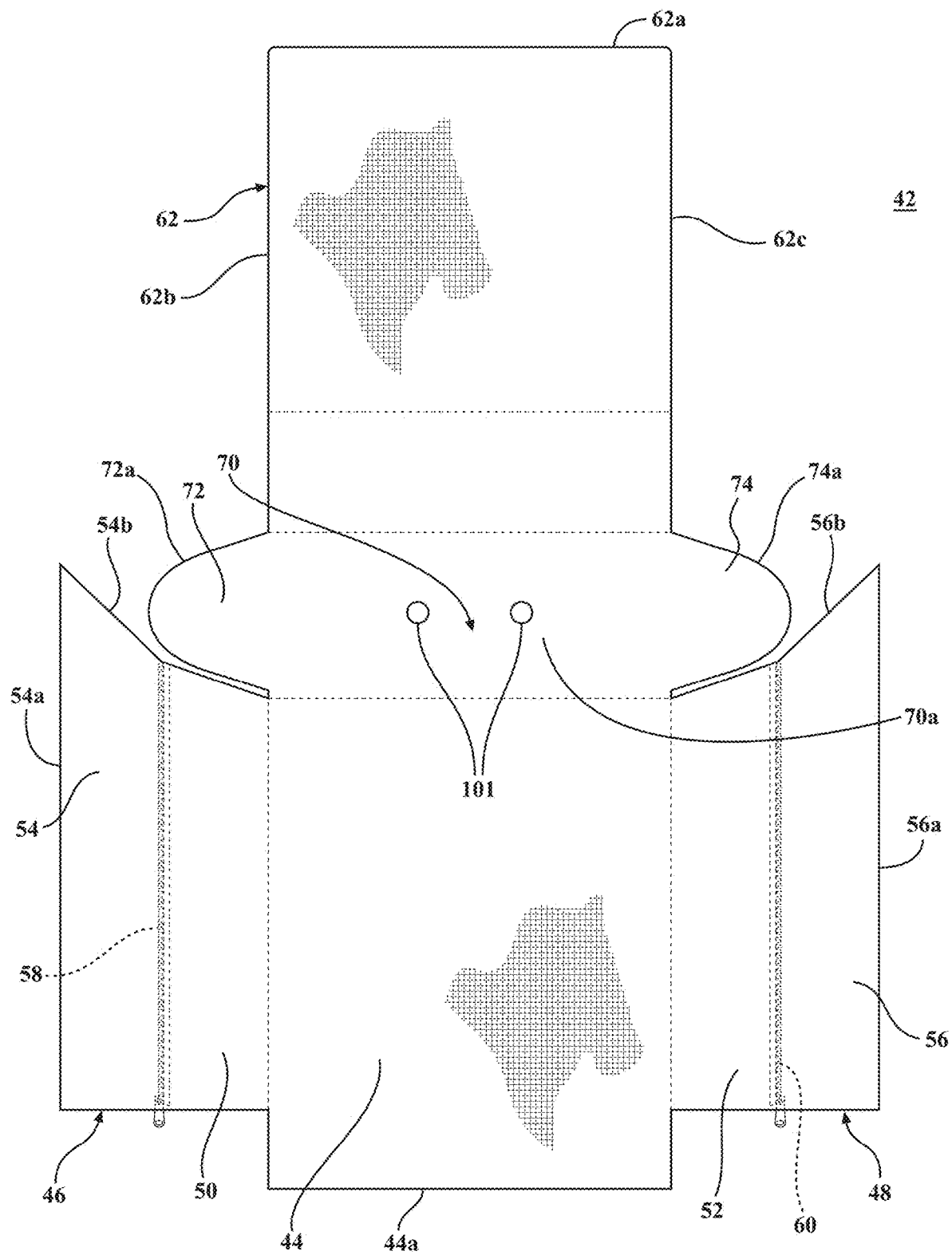
FIG. 3 is a schematic plan view of a base trim cover structured for covering the backrest of FIG. 2.

In one or more arrangements, backrest trim cover assembly 40 may include a base trim cover 42 structured to be applied over the backrest 100. FIG. 3 is a schematic plan view of a base trim cover 42 structured for covering the backrest of FIG. 2, shown laid out flat on a flat surface for purposes of illustration and description. In one or more arrangements, the base trim cover 42 may be formed from a mixture of different materials stitched or otherwise joined together. For example, second side bolster portion 54, first side bolster portion 56, and backrest center portion 62 may be formed from DuonX or a similar material. Other portions of the base trim cover 42 may be formed from materials such as fabric, polyurethane, PVC and/or leather.

In one or more arrangements, the base trim cover 42 may include a base trim cover rear portion 44 including a lower edge 44a. The base trim cover 42 may also have a first side portion 48 (in this case, a left side portion) extending from the base trim cover rear portion 44. The first side portion 48 may be structured to be wrappable along a respective first side S1 (FIG. 2) of the backrest 100. The first side portion 48 may have a first connecting portion 52 extending from the rear portion 44, and a first side bolster portion 56 extending from the first connecting portion 52. The first side bolster portion 56 may be structured to be wrappable over an associated first (or left) side bolster 107 of the backrest 100 to cover the first side bolster. The first side bolster portion 56 may also be structured to be securable to the backrest 100 along the backrest front face 100*f*.

Figure 5:
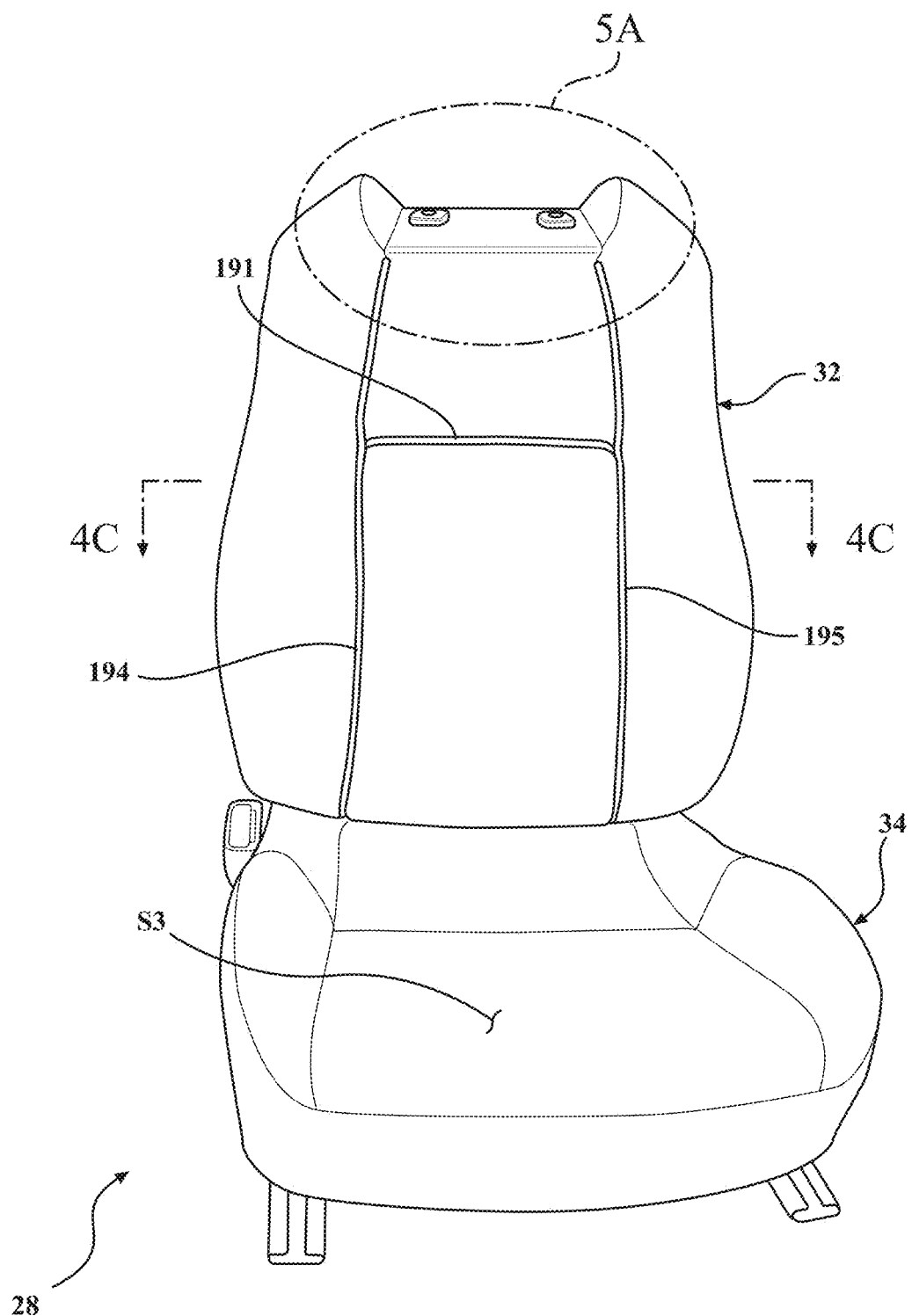
FIG. 5 is a schematic frontal view of the backrest of FIG. 2 covered by the base trim cover of FIG. 3 after application of the base trim cover to the backrest.
Figure 5A:
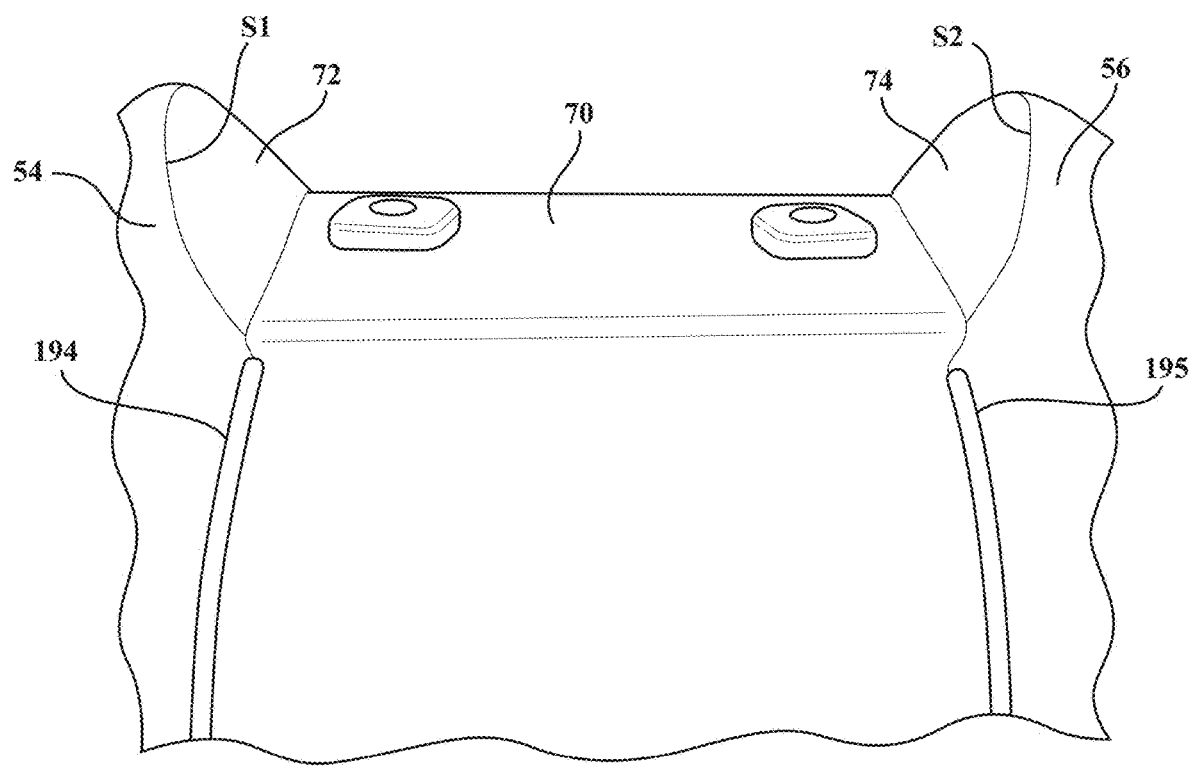
FIG. 5A is a schematic frontal detail view of an upper portion of the backrest of FIG. 5.

The first side portion 48 may have a side edge 56*a* structured to be securable to the backrest 100 along the backrest front face 100*f*. In one or more arrangements, the side edge 56*a* is located along the first side bolster portion 56. The first side portion side edge 56*a* may be structured to be securable to the padding along a trench 195 or seam (FIGS. 5, 5A) using suitable fasteners (e.g., hog-rings, EZ clips, hook and loop tape, arrow-hooks, stitching, etc.) and conventional upholstery securement methods. The first side portion 48 may have an upper edge 56*b* structured for attachment to an associated first side portion 74 of the headrest cover portion 70 (described in greater detail below).

In one or more arrangements, the first side portion 48 may include an outwardly-facing first zipper portion 60 attached to the first side portion 48 proximate a junction between first connecting portion 52 and the first side bolster portion 56. An "outwardly-facing zipper portion" may be a zipper portion attached so as to face away from the seat 28 when the base trim cover is applied to the backrest 100, so as to enable teeth of the zipper portion to be engaged with complementary teeth of a mating zipper portion by application of an associated slider and a pull tab, to bring together and mate the teeth of the zipper portions in a conventional manner. A "zipper portion" may be a portion of a zipper (e.g., a set of zipper teeth, a slider, etc.) operably connected to and/or structured to interact with another portion (i.e., a complementary, mating set of teeth) of the zipper.

The base trim cover 42 may also have a second side portion 46 (in this case, a right side portion) extending from the rear portion 44. The second side portion 46 may be structured to be wrappable along a respective second side S2 of the backrest. The second side portion 46 may have a second connecting portion 50 extending from the rear portion 44, and a second side bolster portion 54 extending from the second connecting portion 50. The second side bolster portion 54 may be structured to be wrappable over an associated second side bolster 109 of the backrest to cover the second side bolster. The second side bolster portion 54 may also be structured to be securable to the backrest 100 along the backrest front face 100*f*.

The second side portion 46 may also have a side edge 54*a* structured to be securable to the backrest 100 along the front face 100*f* of the backrest. In one or more arrangements, the side edge 54*a* is located along the second side bolster portion 54. The second side portion side edge 54*a* may be structured to be securable to the padding along a trench 194 or seam using suitable fasteners (e.g., hog-rings, EZ clips, hook and loop tape, arrow-hooks, stitching, etc.) and conventional upholstery securement methods. The second side portion 46 may have an upper edge 54*b* structured for attachment to an associated second side portion 72 of the headrest cover portion 70 (described in greater detail below).

In one or more arrangements, the second side portion 46 may include an outwardly-facing second zipper portion 58 attached to the second side portion proximate a junction between second connecting portion 50 and the second side bolster portion 54.

Referring to FIGS. 1 and 3, embodiments of the base trim cover 42 may have a headrest cover portion 70 extending from an upper edge of the base trim cover rear portion 44. The headrest cover portion 70 may be structured to be wrappable over the backrest headrest portion 118 from the rear face 100*r* of the backrest 100, and securable therealong to cover the headrest portion 118. The headrest cover portion 70 may have a headrest cover base portion 70*a* extending from the base trim cover rear portion 44. A headrest cover portion first side portion 74 may extend from the headrest cover base portion 70*a*, and a headrest cover portion second side portion 72 may extend from the headrest cover base portion 70*a* opposite the headrest cover first side portion 74. The headrest cover portion 70 may include holes 101 structured to accommodate supports for an associated headrest (not shown).

Referring to FIGS. 1 and 3, embodiments of the base trim cover 42 may have a backrest center portion 62 operably connected to the base trim cover rear portion 44. As used herein, "operably connected to" refers both to connections or attachments involving direct physical contact and also indirect physical contact. In one or more arrangements, the backrest center portion 62 may be attached to (and extend from) the headrest cover portion 70. The backrest center portion 62 may be structured to be wrappable over the backrest front face 100*f* and securable therealong to cover the backrest front face.

The backrest center portion 62 may include a bottom edge 62*a* structured to be securable to a bottom portion of the backrest 100 or to the backrest frame 32 below the level of an upper surface S3 (FIG. 1) of the seat bottom 34. The backrest center portion 62 may include a first side edge 62*c* and a second side edge 62*b* opposite the first side edge. The backrest center portion 62 may also be structured to be securable to the padding 36 along a trench 191 (FIG. 5) formed in the backrest 100, using suitable fasteners (e.g., hog-rings, EZ clips, hook and loop tape, arrow-hooks, stitching, etc.) and conventional upholstery securement methods. The trench 191 may separate the backrest front face 100*f* into the backrest upper portion 108 and the backrest lower portion 102.

Referring to FIGS. 1 and 3, embodiments of the trim cover assembly may include a removable trim cover 90 structured to be securable to the base trim cover 42 along the backrest 100 after the base trim cover 42 has been attached to the backrest, to cover a portion of the base trim cover 42. In one or more arrangements, the removable trim cover 90 may include a center portion 91, a first bolster cover portion 95 extending from the removable trim cover center portion 91, and a second bolster cover portion 94 extending from the removable trim cover center portion 91 opposite first bolster cover portion 95.

The removable trim cover first bolster cover portion 95 may be structured to be wrappable over a portion of the base trim cover first side bolster portion 56. The removable trim cover first bolster cover portion 95 may have a first side edge 93 with a zipper portion 90*b* extending therealong to enable the removable trim cover first bolster cover portion 95 to be zipped to the base trim cover first side bolster portion 56. The removable trim cover first bolster cover portion 95 may be structured to be securable to the padding 36 along the trench 195 using suitable fasteners (e.g., hog-rings, EZ clips, hook and loop tape, arrow-hooks, stitching, etc.) and conventional upholstery securement methods.

The removable trim cover second bolster cover portion 94 may be structured to be wrappable over the base trim cover second side bolster portion 54. The removable trim cover second bolster cover portion 94 may have a second side edge 92 with a zipper portion 90*a* extending therealong to enable the removable trim cover second bolster cover portion 94 to be zipped to the base trim cover second side bolster portion 54. The removable trim cover second bolster cover portion 94 may be structured to be securable to the padding along the trench 194 using suitable fasteners (e.g., hog-rings, EZ clips, hook and loop tape, arrow-hooks, stitching, etc.) and conventional upholstery securement methods.

FIGS. 1 and 4A-4C illustrate a method of attaching the base trim cover 42 and the removable trim cover 90 to a backrest sub-assembly including the backrest frame 32 and a desired padding 36 already applied to the backrest frame.

In a first step, the base trim cover rear portion 44 is applied to the rear face 100r of the backrest 100 in a position from which the base trim cover headrest cover portion 70 (FIG. 3) and base trim cover first and second side portions 48, 46 can be wrapped over respective side portions S1, S2 of the backrest into positions where they may be secured to the backrest.

Next, the base trim cover first and second side portions 48, 46 may be wrapped around respective sides S1, S2 of the backrest 100 and over the respective first and second side bolsters 107, 109 to the front face 100f of the backrest 100. The first side portion side edge 56a may then be secured to the padding 36 along trench 195 using suitable fasteners (e.g., hog-rings, EZ clips, hook and loop tape, arrow-hooks, stitching, etc.) and conventional upholstery securement methods. Also, the second side portion side edge 54a may be secured to the padding 36 along trench 194 using suitable fasteners (e.g., hog-rings, EZ clips, hook and loop tape, arrow-hooks, stitching, etc.) and conventional upholstery securement methods.

Next, headrest cover portion 70 may be wrapped over the top of the backrest 100 to cover the backrest headrest portion 118. Then the backrest center portion 62 may be wrapped over the backrest front face 100f to cover the front face.

Next, the upper bolster first end portion 114 may be covered by bringing together first side portion upper edge 56b with headrest cover portion first edge 74a and connecting these edges with stitching to form a seam. Also, the upper bolster second end portion 116 may be covered by bringing together second side portion upper edge 54b with headrest cover portion second edge 72a and connecting these edges with stitching to form a seam.

The backrest center portion 62 may then be attached to the padding 36 along trenches 195 and 194 using suitable fasteners (e.g., hog-rings, EZ clips, hook and loop tape, arrow-hooks, stitching, etc.) and conventional upholstery securement methods. The backrest center portion 62 may then be attached to the padding along trench 191 using suitable fasteners (e.g., hog-rings, EZ clips, hook and loop tape, arrow-hooks, stitching, etc.) and conventional upholstery securement methods. Bottom edge 62a of the backrest center portion 62 may then be attached to the backrest 100 or to the backrest frame 32 below the level of the upper surface S3 of the seat bottom 34, using a suitable attachment method. The base trim cover structures described herein allow attachment of the base trim cover to the backrest without use of zippers and listing wire.

Next, after application of the base trim cover 42 to the backrest 100, the removable trim cover 90 may be applied to the backrest 100 to cover portions of the base trim cover 42. To apply the removable trim cover 90, the removable trim cover center portion 91 may be positioned over a desired portion of the already-attached base trim cover rear portion 44. Then, the removable trim cover center portion 91 may be secured to the base trim cover 42 and backrest padding 36 along trenches 194 and 195 using suitable fasteners (e.g., hog-rings, EZ clips, hook and loop tape, arrow-hooks, stitching, etc.) and conventional upholstery securement methods.

Next, first side edge 93 of the removable trim cover 90 may be attached to the base trim cover 42 by zipping together zipper portions 90b and 60. Also, second side edge 92 of the removable trim cover 90 may be attached to the base trim cover 42 by zipping together zipper portions 90a and 58.

Figure 6:
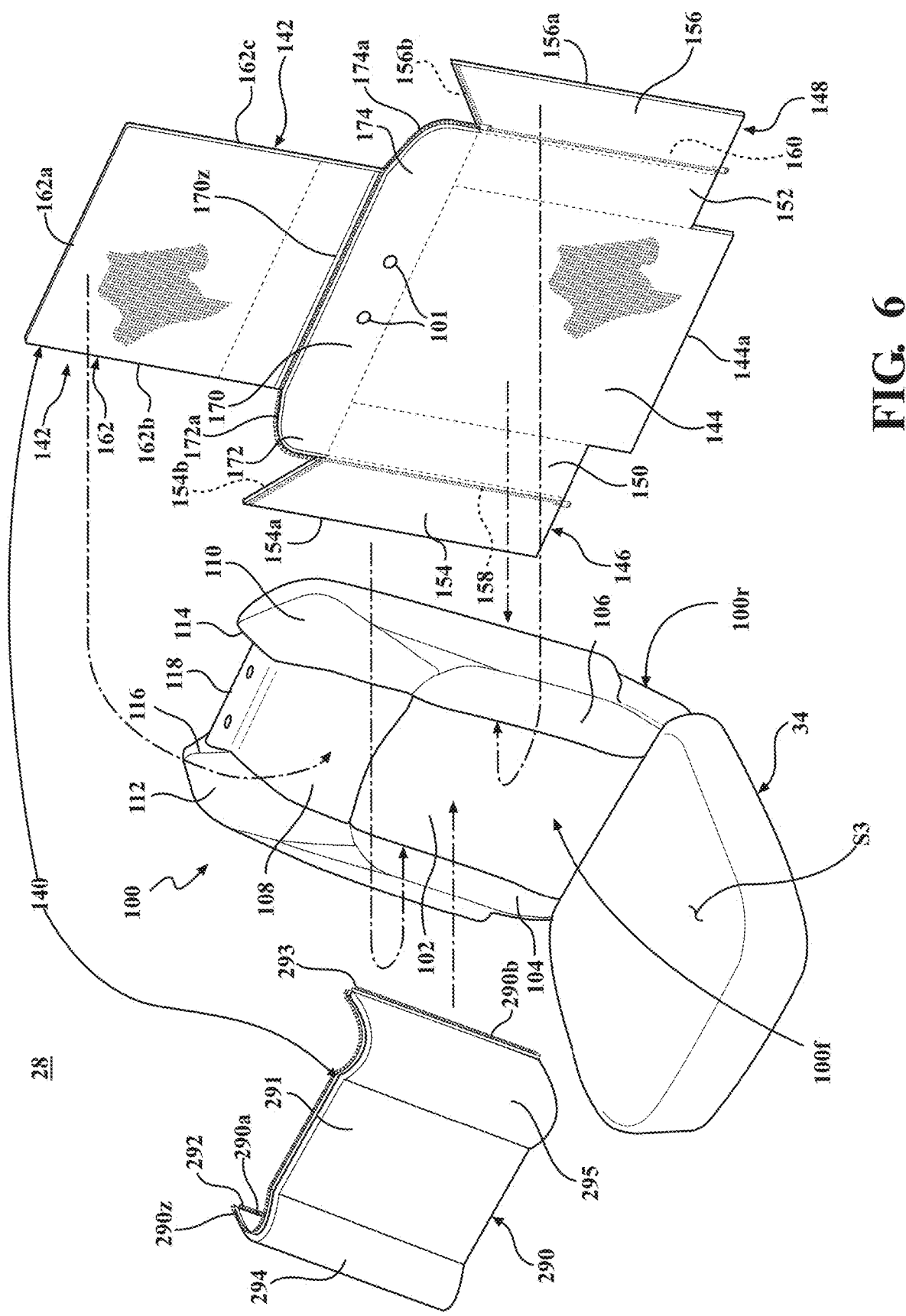
FIG. 6 is a schematic exploded perspective view of a vehicle seat incorporating a trim cover assembly in accordance with an alternative embodiment described herein.
Figure 7:
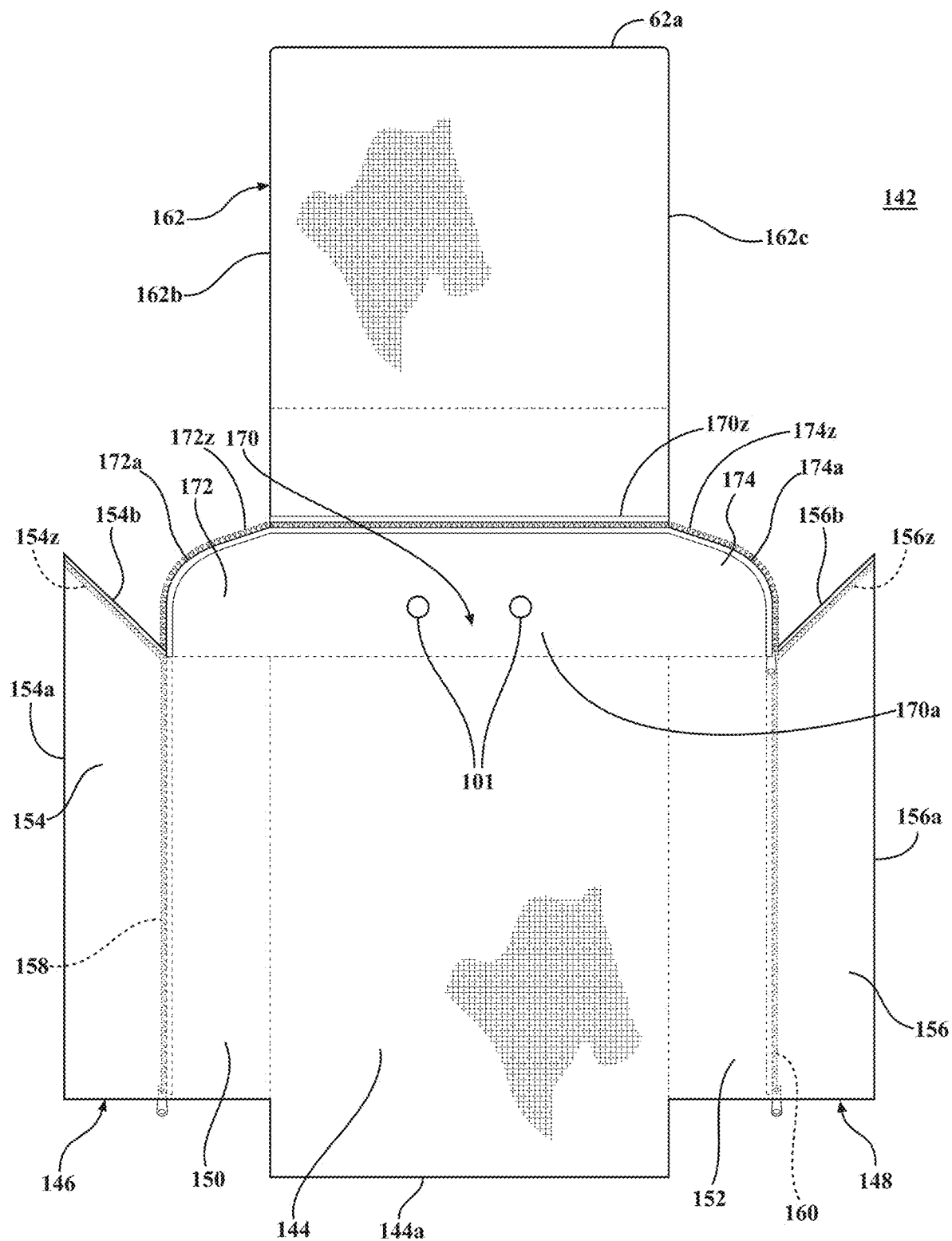
FIG. 7 is a schematic plan view of a base trim cover structured for covering the backrest of FIG. 2, in accordance with an alternative embodiment described herein.

FIG. 6 is a schematic exploded perspective view of a vehicle seat incorporating a trim cover assembly in accordance with an alternative embodiment described herein. FIG. 7 is a schematic plan view of a base trim cover 142 structured for covering the backrest of FIG. 2, in accordance with an alternative embodiment described herein. Referring to FIGS. 6 and 7, in alternative arrangements, the base trim cover 142 may include a base trim cover rear portion 144 including a lower edge 144a. The base trim cover 142 may also have a first side portion 148 (in this case, a left side portion) extending from the base trim cover rear portion 144. The first side portion 148 may be structured to be wrappable along a respective first side S1 (FIG. 2) of the backrest 100. The first side portion 148 may have a first connecting portion 152 extending from the rear portion 144, and a first side bolster portion 156 extending from the first connecting portion 152. The first side bolster portion 156 may be structured to be wrappable over an associated first (or left) side bolster 107 of the backrest 100 to cover the side bolster. The first side bolster portion 156 may also be structured to be securable to the backrest 100 along the backrest front face 100f.

The first side portion 148 may have a side edge 156a structured to be securable to the backrest 100 along the backrest front face 100f. In one or more arrangements, the side edge 156a is located along the first side bolster portion 156. The first side portion side edge 156a may be structured to be securable to the padding along trench 195 (FIGS. 5, 5A) using suitable fasteners (e.g., hog-rings, EZ clips, hook and loop tape, arrow-hooks, stitching, etc.) and conventional upholstery securement methods. The first side portion 148 may have an upper edge 156b structured for attachment to an associated first side portion 174 of the headrest cover portion 170. In certain arrangements, the upper edge 156b may have an outwardly-facing zipper portion 156z extending therealong to enable zipped attachment to a complementary outwardly-facing zipper portion 174z extending along edge 174a. In one or more arrangements, the first side portion 148 may also include an outwardly-facing first zipper portion 160 attached to the first side portion 148 proximate a junction between first connecting portion 152 and the first side bolster portion 156.

The base trim cover 142 may also have a second side portion 146 (in this case, a right side portion) extending from the rear portion 144. The second side portion 146 may be structured to be wrappable along a respective second side S2 of the backrest. The second side portion 146 may have a second connecting portion 150 extending from the rear portion 144, and a second side bolster portion 154 extending from the second connecting portion 150. The second side bolster portion 154 may be structured to be wrappable over an associated second side bolster 109 (FIG. 2) of the backrest 100 to cover the second side bolster. The second side bolster portion 154 may also be structured to be securable to the backrest 100 along the backrest front face 100f.

The second side portion 146 may also have a side edge 154a structured to be securable to the backrest 100 along the front face 100f of the backrest. In one or more arrangements, the side edge 154a is located along the second side bolster portion 154. The second side portion side edge 154a may be structured to be securable to the padding along a trench or seam 194 using suitable fasteners (e.g., hog-rings, EZ clips, hook and loop tape, arrow-hooks, stitching, etc.) and conventional upholstery securement methods. The second side portion 146 may have an upper edge 154b structured for attachment to an associated second side portion 172 of the headrest cover portion 170 (described in greater detail below). In certain arrangements, the upper edge 154b may have an outwardly-facing zipper portion 154z extending therealong to enable zipped attachment to a complementary outwardly-facing zipper portion 172z extending along edge 172a. In one or more arrangements, the second side portion 146 may also include an outwardly-facing second zipper portion 158 attached to the second side portion proximate a junction between second connecting portion 150 and the second side bolster portion 154.

Referring to FIGS. 6 and 7, embodiments of the base trim cover 142 may also have a headrest cover portion 170 extending from an upper edge of the base trim cover rear portion 144. The headrest cover portion 170 may be structured to be wrappable over the backrest headrest portion 118 from the rear face 100r of the backrest 100, and securable therealong to cover the headrest portion 118. The headrest cover portion 170 may have a headrest cover base portion 170a extending from the base trim cover rear portion 144. A headrest cover portion first side portion 174 may extend from the headrest cover base portion 170a, and a headrest cover portion second side portion 172 may extend from the headrest cover base portion 170a opposite the headrest cover first side portion 174. The headrest cover portion 170 may include holes 101 structured to accommodate supports for an associated headrest (not shown).

The base trim cover 142 may also include an outwardly-facing zipper portion 170z extending along an edge of the headrest cover portion 170, between zipper portions 174z and 172z and between headrest cover first side portion 174 and headrest cover second side portion 172. In particular arrangements, the zipper portions 158, 172z, 170z, 174z, and 160 are formed integrally or connected as a single, continuous zipper portion, and may have multiple sliders slidingly attached thereto, each slider being configured for enabling zipping engagement between an associated one of the zipper portions 158, 172z, 170z, 174z, and 160 and a complementary zipper portion.

Referring to FIGS. 6 and 7, embodiments of the base trim cover 142 may have a backrest center portion 162 operably connected to the base trim cover rear portion 144. In one or more arrangements, the backrest center portion 162 may be attached to (and extend from) the headrest cover portion 170. The backrest center portion 162 may be structured to be wrappable over the backrest front face 100f and securable therealong to cover the backrest front face. The backrest center portion 162 may include a bottom edge 162a structured to be securable to a bottom portion of the backrest 100 or to the backrest frame 32 below the level of an upper surface S3 (FIG. 1) of the seat bottom 34. The backrest center portion 162 may include a first side edge 162c and a second side edge 162b opposite the first side edge. The backrest center portion 162 may also be structured to be securable to the padding 36 along trench 191 (FIG. 5) formed in the backrest 100, using suitable fasteners (e.g., hog-rings, EZ clips, hook and loop tape, arrow-hooks, stitching, etc.) and conventional upholstery securement methods.

In one or more arrangements, during application of the trim cover assembly 140, the previously-described removable trim cover 90 may be zipped to zipper portions 158 and 160 in the manner previously described with respect to zipper portions 58 and 60. Referring to FIGS. 6 and 7, in an alternative arrangement of the removable trim cover, an additional zipper portion 290z may extend along an upper edge of the removable trim cover. The zipper portion 290z may be structured to be zippable to zipper portion 170z on base trim cover 142 to aid in attaching removable trim cover 290 to base trim cover 142. The removable trim cover 290 may otherwise be structured the same as removable trim cover 90, with a center portion 291, a first bolster cover portion 295 extending from the removable trim cover center portion 291, and a second bolster cover portion 294 extending from the removable trim cover center portion 291 opposite first bolster cover portion 295.

The removable trim cover first bolster cover portion 295 may be structured to be wrappable over a portion of the base trim cover first side bolster portion 156. The removable trim cover first bolster cover portion 295 may have a first side edge 293 with a zipper portion 290b extending therealong to enable the removable trim cover first bolster cover portion 295 to be zipped to the base trim cover first side bolster portion 156. The removable trim cover first bolster cover portion 295 may be structured to be securable to the padding 36 along the trench 195 using suitable fasteners (e.g., hog-rings, EZ clips, hook and loop tape, arrow-hooks, stitching, etc.) and conventional upholstery securement methods.

The removable trim cover second bolster cover portion 294 may be structured to be wrappable over the base trim cover second side bolster portion 154. The removable trim cover second bolster cover portion 294 may have a second side edge 292 with a zipper portion 290a extending therealong to enable the removable trim cover second bolster cover portion 294 to be zipped to the base trim cover second side bolster portion 154. The removable trim cover second bolster cover portion 294 may be structured to be securable to the padding along the trench 194 using suitable fasteners (e.g., hog-rings, EZ clips, hook and loop tape, arrow-hooks, stitching, etc.) and conventional upholstery securement methods.

The method of attaching the base trim cover 142 and the removable trim cover 290 to the backrest sub-assembly may be similar to the method of attaching the previously-described method of attaching the base trim cover 42 and the removable trim cover 90 to the backrest sub-assembly. In a first step, the base trim cover rear portion 144 is applied to the rear face 100r of the backrest 100 in a position from which the base trim cover headrest cover portion 170 (FIG. 7) and base trim cover first and second side portions 148, 146 can be wrapped over respective side portions S1, S2 of the backrest into positions where they may be secured to the backrest.

Next, the base trim cover first and second side portions 148, 146 may be wrapped around respective sides S1, S2 of the backrest 100 and over the respective first and second side bolsters 107, 109 to the front face 100f of the backrest 100. The first side portion side edge 156a may then be secured to the padding 36 along trench 195 using suitable fasteners (e.g., hog-rings, EZ clips, hook and loop tape, arrow-hooks, stitching, etc.) and conventional upholstery securement methods. Also, the second side portion side edge 154a may be secured to the padding 36 along trench 195 using suitable fasteners (e.g., hog-rings, EZ clips, hook and loop tape, arrow-hooks, stitching, etc.) and conventional upholstery securement methods.

Next, headrest cover portion 170 may be wrapped over the top of the backrest 100 to cover the backrest headrest portion 118. Then the backrest center portion 162 may be wrapped over the backrest front face 100f to cover the front face.

Next, the upper bolster first end portion 114 may be covered by bringing together first side portion upper edge 156b with headrest cover portion first edge 174a and connecting these edges by zipping together zipper portions 156z and 174z. Also, the upper bolster second end portion 116 may be covered by bringing together second side portion upper edge 154b with headrest cover portion second edge 172a and connecting these edges by zipping together zipper portions 154z and 172z.

The backrest center portion 162 may then be attached to the padding 36 along trenches 195 and 194 using suitable fasteners (e.g., hog-rings, EZ clips, hook and loop tape, arrow-hooks, stitching, etc.) and conventional upholstery securement methods. The backrest center portion 162 may then be attached to the padding along trench 191 using suitable fasteners (e.g., hog-rings, EZ clips, hook and loop tape, arrow-hooks, stitching, etc.) and conventional upholstery securement methods. Bottom edge 162a of the backrest center portion 162 may then be attached to the backrest 100 or to the backrest frame 32 below the level of the upper surface S3 of the seat bottom 34, using a suitable attachment method. The base trim cover structures described herein allow attachment of the base trim cover to the backrest without use of zippers and listing wire.

Next, after application of the base trim cover 142 to the backrest 100, the removable trim cover 290 may be applied to the backrest 100 to cover portions of the base trim cover 142. To apply the removable trim cover 290, the removable trim cover center portion 291 may be positioned over a desired portion of the already-attached base trim cover rear portion 144. Then, the removable trim cover center portion 291 may be secured to the base trim cover 142 and backrest padding 36 along trenches 194 and 195 using suitable fasteners (e.g., hog-rings, EZ clips, hook and loop tape, arrow-hooks, stitching, etc.) and conventional upholstery securement methods.

Next, first side edge 293 of the removable trim cover 290 may be attached to the base trim cover 142 by zipping together zipper portions 290b and 160. Also, second side edge 292 of the removable trim cover 290 may be attached to the base trim cover 142 by zipping together zipper portions 290a and 158. In arrangements including zipper portion 290z, this zipper portion may be zipped to base trim cover zipper portion 170z.

Figure 8A:
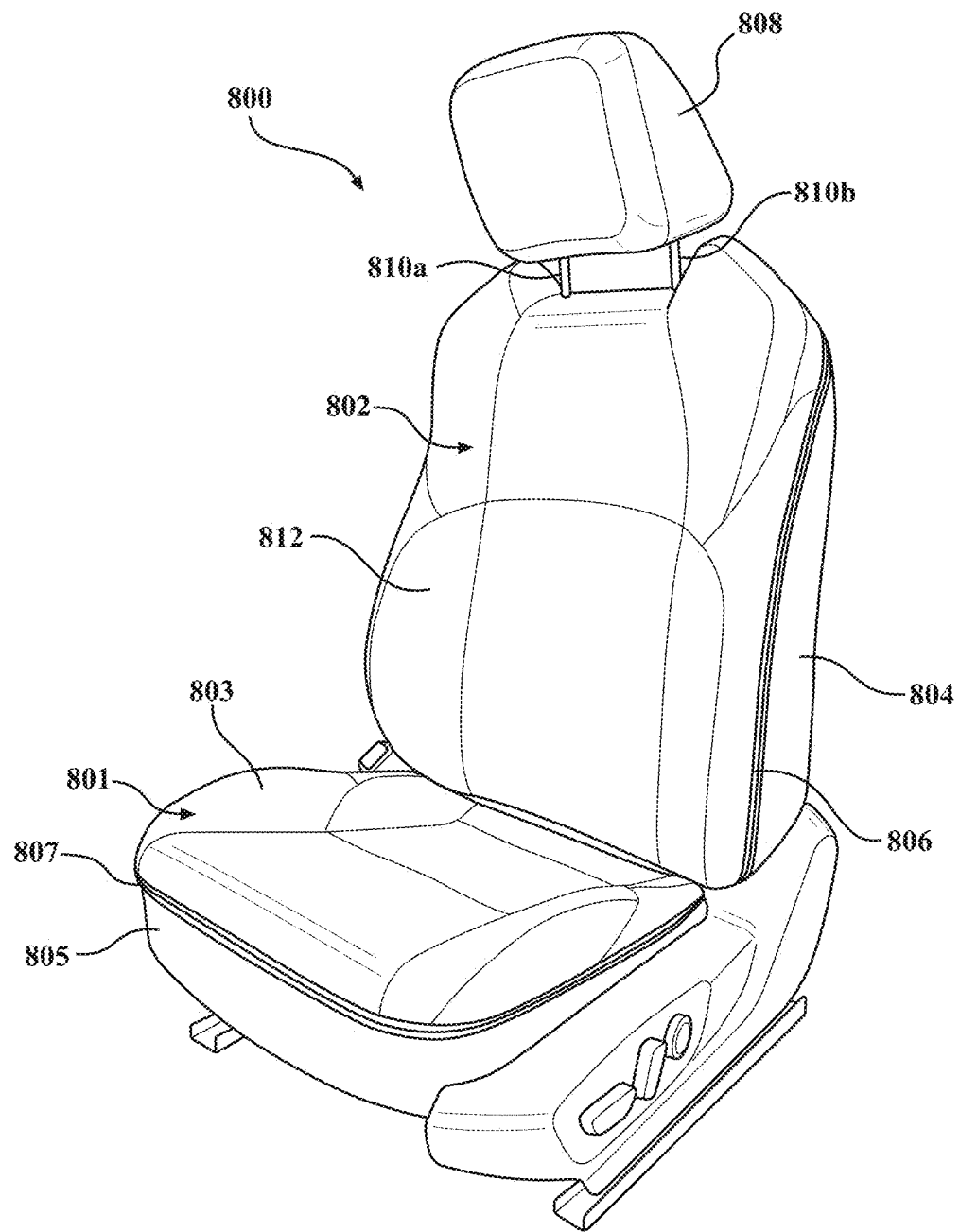
FIGS. 8A-8D are schematic perspective views of a vehicle seat incorporating a trim cover assembly in accordance with an embodiment described herein.
Figure 8B:
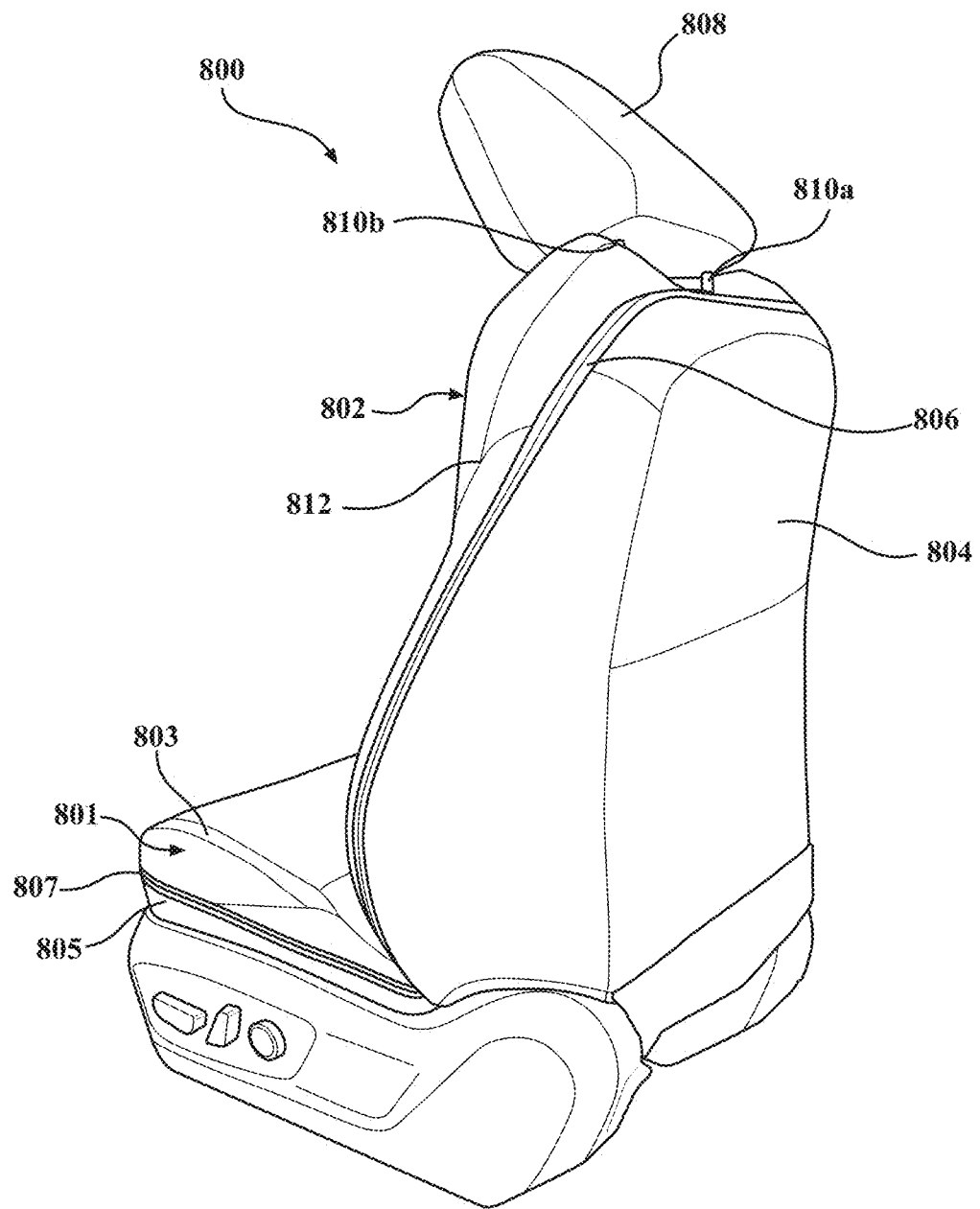
Figure 8C:
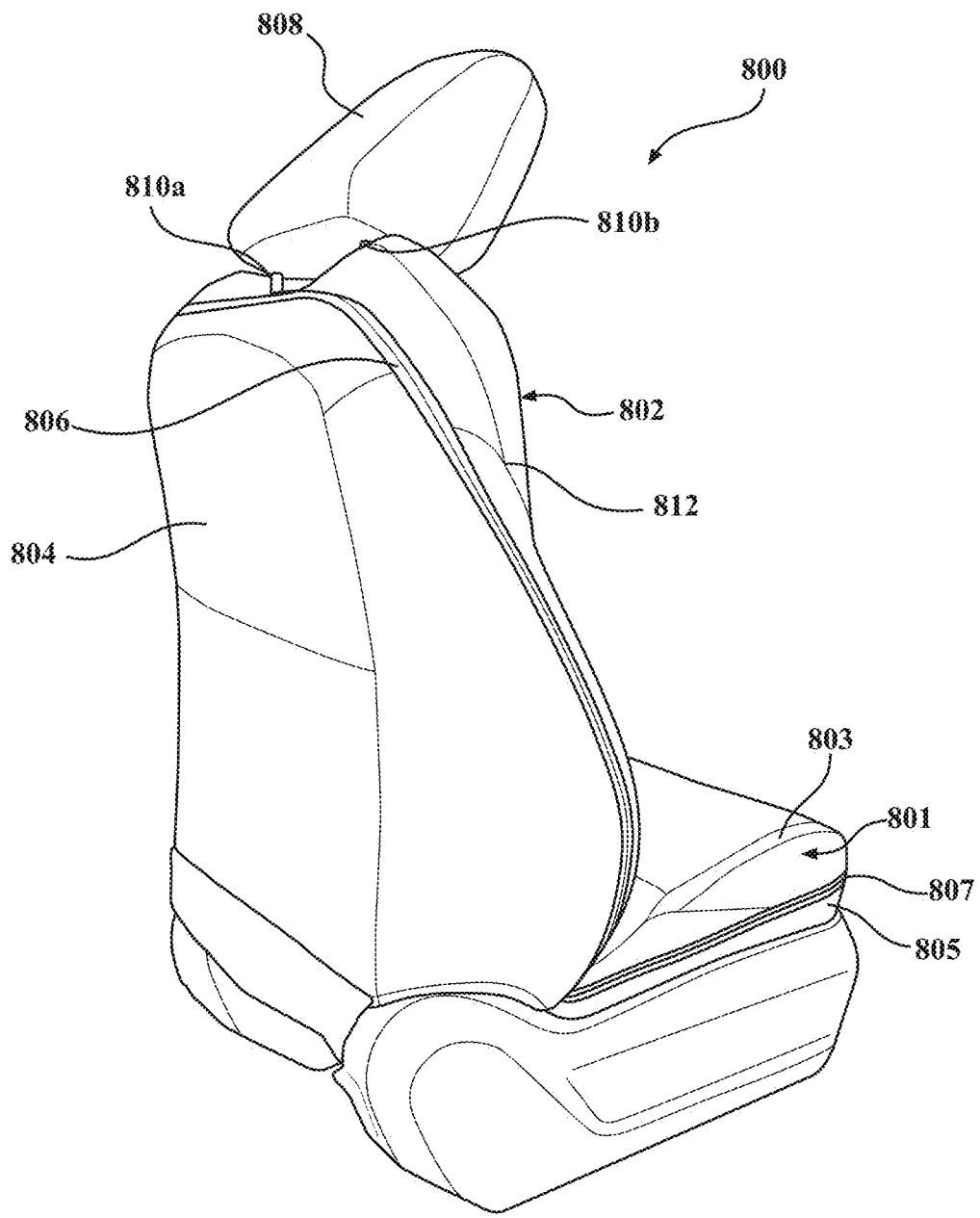
Figure 8D:
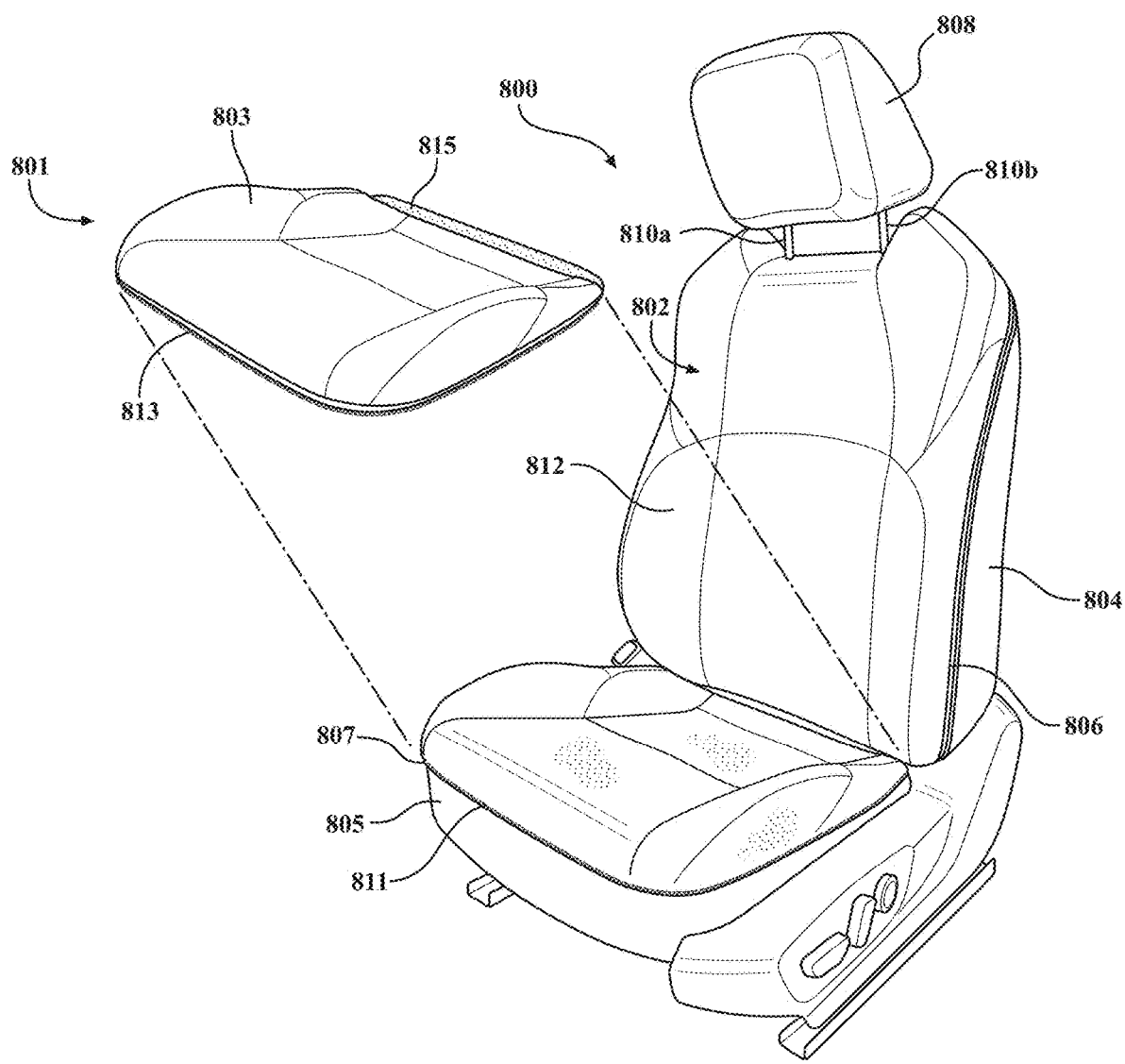

FIGS. 8A-8D are schematic perspective views of a vehicle seat 28 incorporating a trim cover assembly 800 in accordance with an embodiment described herein. Specifically, FIG. 8A is a schematic perspective view of a front face of the vehicle seat 28 with the trim cover assembly 800 disposed thereon, FIG. 8B is a schematic perspective view of a first side (e.g., outboard side) of the vehicle seat 28 with the trim cover assembly 800 disposed thereon, FIG. 8C is a schematic perspective view of a second side (e.g., inboard side) of the vehicle seat 28 with the trim cover assembly 800 disposed thereon, and FIG. 8D is a schematic perspective view with the removable seat cover 801 removed.

As described above, the vehicle seat 28 may include a seat portion and a backrest portion. The vehicle seat 28 may also include a headrest 808, against which a passenger may rest their head while operating or riding. The headrest 808 may also prevent unsafe movement of the passenger's head (e.g., whiplash), which may occur, for example, during an accident. As depicted in FIGS. 8A-8D, the headrest 808 may include headrest posts 810a and 810b that fit within headrest sleeves of the seat 28. The headrest posts 810a and 810b may vertically translate within the headrest sleeves, such that the headrest 808 is adjustable to different heights to accommodate occupants with different heights. Via any number of mechanisms, the headrest posts 810a and 810b may be held at a particular vertical position within an associated headrest sleeve.

Figure 9A:
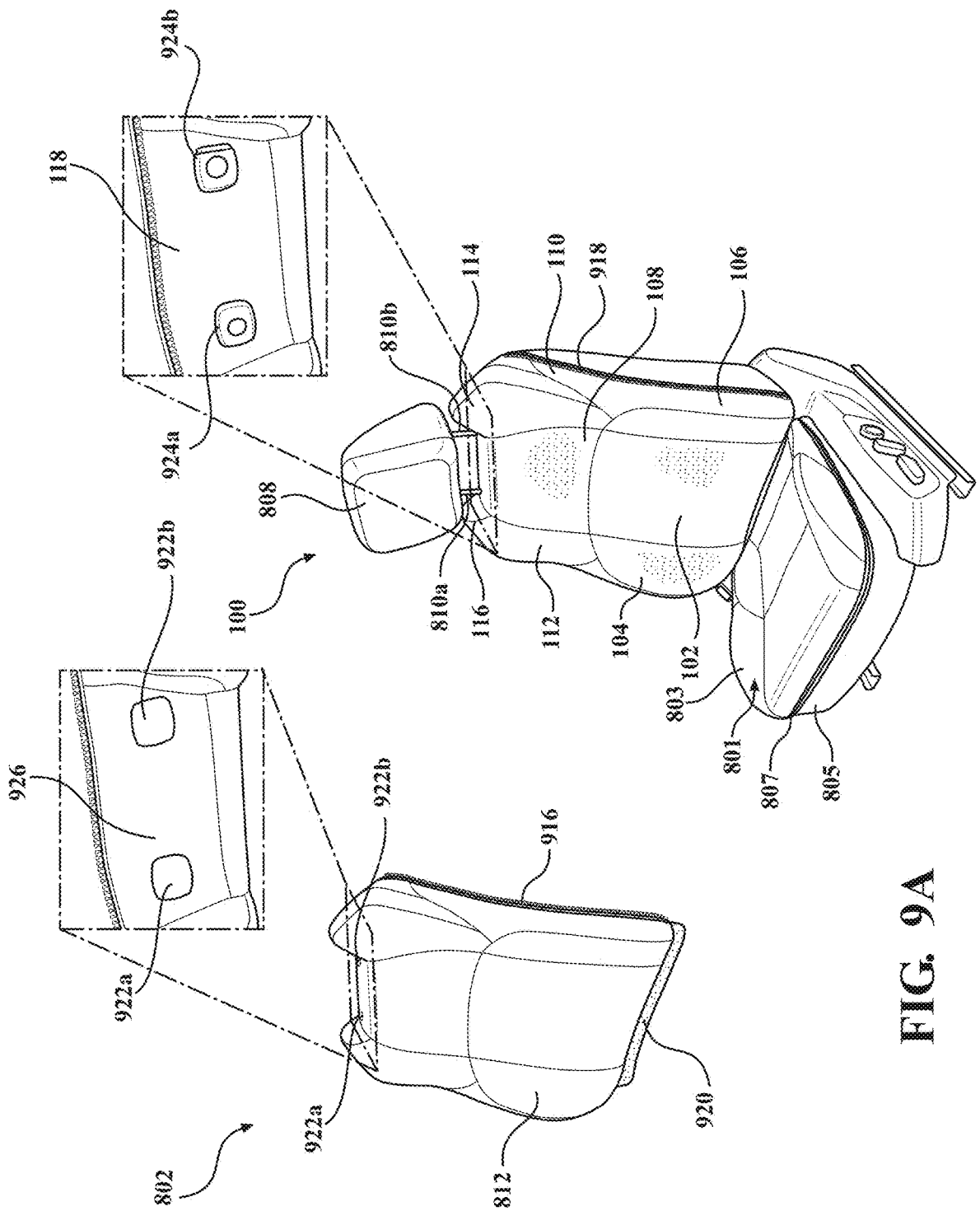
FIGS. 9A and 9B are schematic exploded perspective views of a front side and a rear side of a removable trim cover in accordance with an embodiment described herein.
Figure 9B:
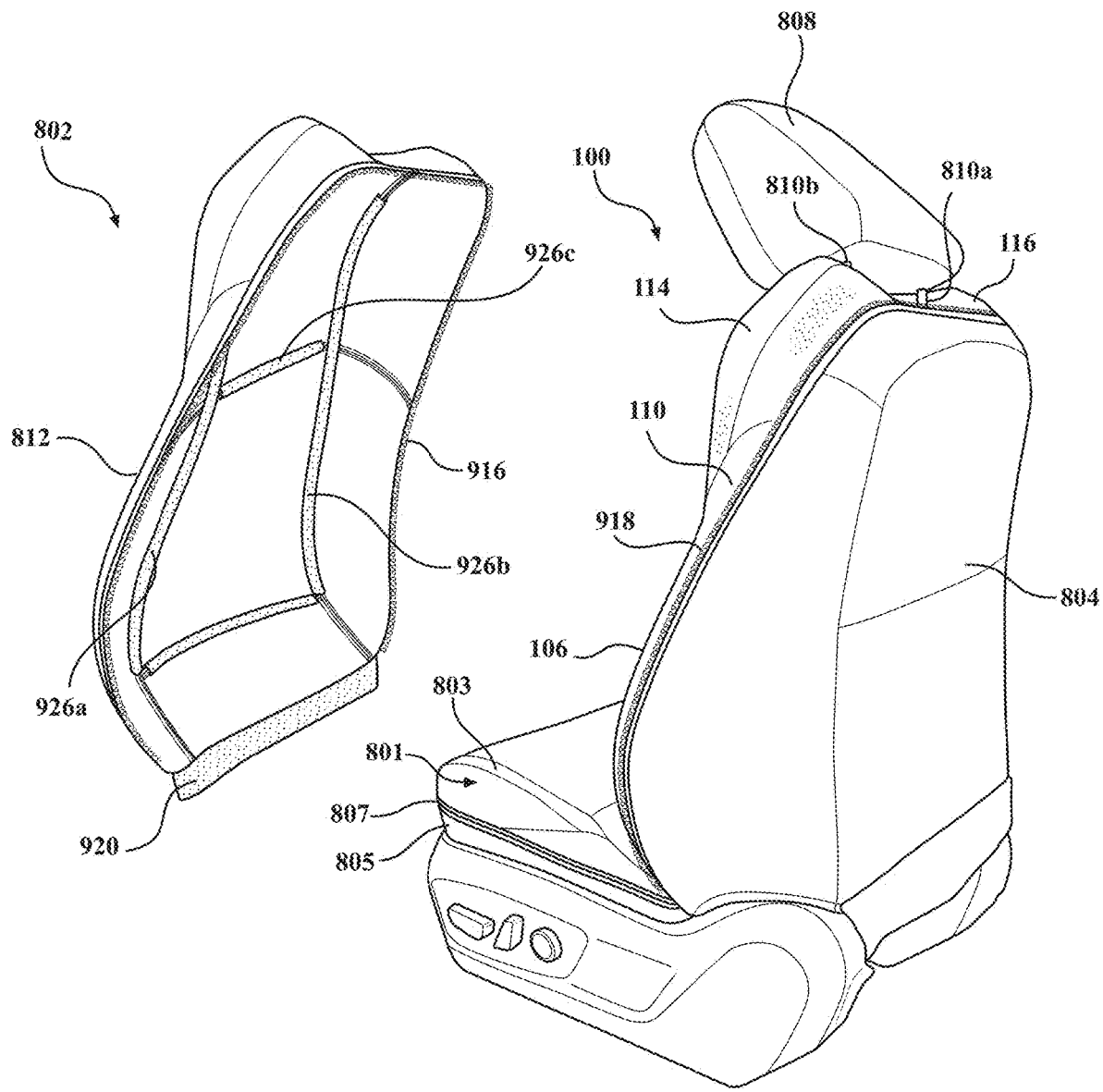
Figure 10A:
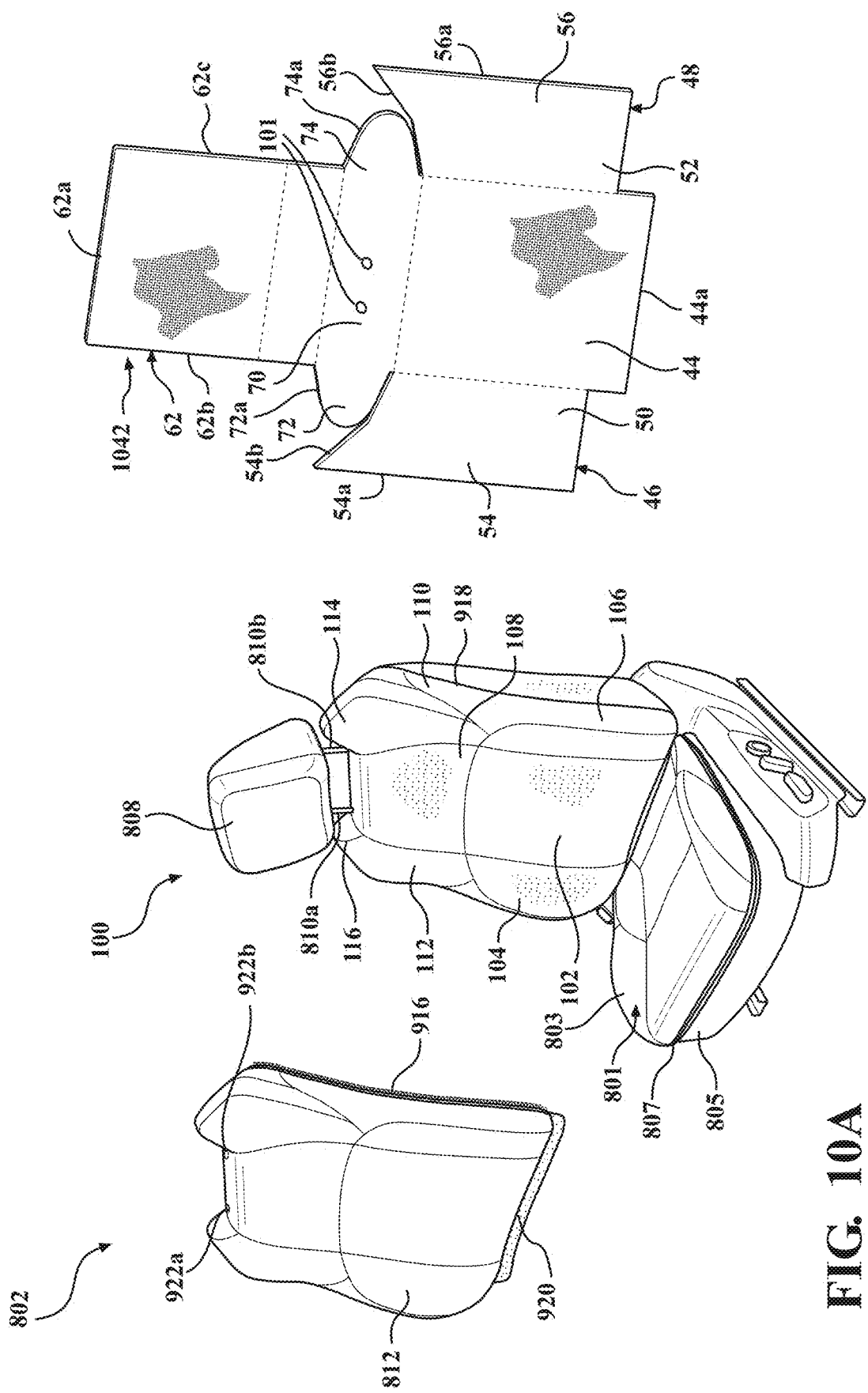
FIGS. 10A and 10B are schematic exploded perspective views of a front side and a rear side of a removable trim cover and a base trim cover in accordance with an embodiment described herein.
Figure 10B:
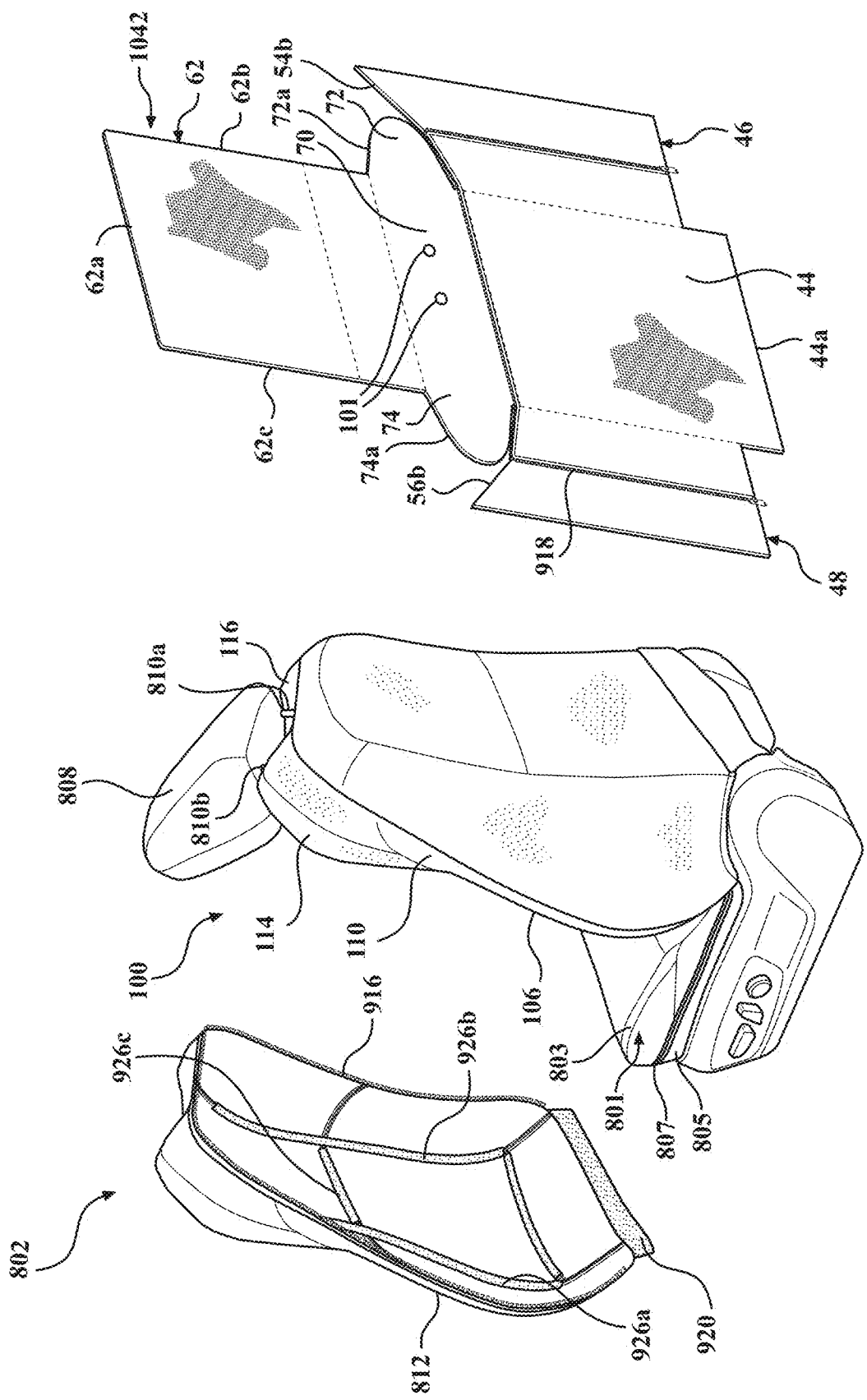

The trim cover assembly 800 may be made up of different sub-components. For example, the trim cover assembly 800 may include a removable trim cover 802, which may be affixable to a support substrate 804, which support substrate 804 may be either the backrest 100 itself as depicted in FIGS. 9A and 9B or a base trim cover as depicted in FIGS. 10A and 10B. The trim cover assembly 800 may also include a removable seat cover 801, which may be affixable to a seat bottom 34 or a base seat cover.

In either case, the removable trim cover 802 includes a material body 812 sized to cover a front face 100f of the backrest 100 of the seat 28. That is, as described above and as depicted in FIG. 1, the backrest 100 of the seat 28 may be divided into various portions including, but not limited to, a front face 100f, a rear face 100r, a left side bolster 107, a ride side bolster 109, a left upper bolster end portion 114, a centrally-positioned headrest portion 118, and a right upper bolster end portion 116. The material body 812 may be sized to cover the front face 100f and portions of the other regions of the backrest 100. Specifically, as depicted in FIGS. 8A-8D, the material body 812 may be sized to cover the lower portion 102 and the upper portion 108 of the front face 100f of the backrest 100, front-facing surfaces of the left side bolster 107, and front-facing surfaces of the right side bolster 109. The material body 812 may also be sized to cover the left upper bolster end portion 114, the centrally-positioned headrest portion 118, and the right upper bolster end portion 116.

Put another way, the material body 812 may include a center portion, a first bolster cover portion extending from the center portion, and a second bolster cover portion extending from the center portion opposite the first bolster cover portion.

Of particular note, as depicted in FIGS. 8A-8D, the material body 812 may extend behind a headrest portion 118 of the backrest 100. That is, the removable trim cover 802 may join to the support substrate 804 behind the headrest 808 (facing away from an occupant sitting in the seat 28), where the headrest portion 118 of the backrest 100 meets the rear face 100r of the backrest 100. Doing so ensures that the zipper 806, described in more detail below, is behind the headrest 808 and, therefore, out of sight and not in contact with an occupant of the seat 28. Moreover, the positioning of the zipper 806 behind the headrest portion 118 provides a continuous and fully customizable front surface uninterrupted by the zipper 806.

The material body 812 may be formed from various materials including, but not limited to, soft fabrics and other materials such as polyurethane, polyvinyl chloride (PVC), neoprene, and/or leather. While particular reference is made to particular materials from which the material body 812 may be formed, the material body 812 may be formed of other materials and/or combinations of these and other materials such as anti-abrasion material, neoprene, or any other material presently developed or yet to be developed that imparts a desired functionality.

The support substrate 804 may be sized to cover the rear face 100r and portions of the other regions of the backrest 100. Specifically, as depicted in FIGS. 8A-8D, the support substrate 804 may be sized to cover the rear face 100r of the backrest 100, side-facing surfaces of the left side bolster 107, and side-facing surfaces of the right side bolster 109. The support substrate 804 may also be formed of various materials such as fabric or other materials such as polyurethane, polyvinyl chloride (PVC), and/or leather. In one particular example, the support substrate 804 is a rigid material such as molded thermoplastic. While particular reference is made to particular materials from which the support substrate 804 may be formed, the support substrate 804 may be formed of other materials and/or combinations of these and other materials.

As described above, the removable trim cover 802 is attachable to the support substrate 804, whether the backrest 100 itself or a base trim cover, via a slide fastener, such as a zipper 806. In general, the zipper 806 includes separate but joinable mating structures. The first zipper portion includes a first set of teeth, and the second zipper portion includes a second set of teeth. Via action of a slide fastener of the zipper 806, the teeth are brought together and enmeshed to join the associated objects, in this case, the removable trim cover 802 and the support substrate 804. As such, the removable trim cover 802 includes a first zipper portion, disposed around a border of the material body 812. The first zipper portion is adapted to be joined with a second zipper portion affixed to the backrest 100, whether to the backrest 100 itself or to a base trim cover that overlays the backrest 100.

Specifically, as depicted in FIG. 8A, the zipper 806, and corresponding zipper portions on the removable trim cover 802 and the support substrate 804 join along an outboard side portion of the backrest 100, the outboard side portion of the backrest 100 being that portion that is adjacent to a door of the vehicle. The outboard side portion of the backrest 100 may refer to the left side bolster 107 for a driver seat and the right side bolster 109 for a passenger seat. As depicted in FIG. 8B, the zipper 806, and corresponding zipper portions on the removable trim cover 802 and support substrate 804 continue along the rear face 100r of the backrest 100 behind the headrest 808 and centrally-positioned headrest portion 118 of the backrest 100. That is, the central portion of the first zipper portion (on the removable trim cover 802) is adapted to be joined with a central portion of the second zipper portion (affixed to the support substrate 804) that is behind the headrest 808 of the seat 28.

As depicted in FIG. 8C, the zipper 806, and corresponding zipper portions on the removable trim cover 802 and the support substrate 804 continue along an inboard side portion of the backrest 100, the inboard side portion of the backrest 100 being that portion that is away from the door of the vehicle, and adjacent another seat, or center console of the vehicle. The inboard side portion of the backrest 100 may refer to the right side bolster 109 of a driver seat and the left side bolster 107 of a passenger seat. Thus, the zipper 806 and respective zipper portions extend along three edges of the associated joined component. In an example, the remaining edge (i.e., a bottom edge of the removable trim cover 802/material body 812) is joined to the backrest 100 via a different attachment mechanism, such as a hook and loop fastener, as described below. In this example, a user may attach the material body 812 to the backrest 100 by sliding the zipper 806 along a path from the outboard side, across the rear face 100r of the backrest 100, and along the inboard side of the backrest 100.

In an example, the trim cover assembly 800 includes a removable seat cover 801 sized to cover a top surface of a seat bottom 34 of the seat 28. As depicted in FIG. 1, the seat bottom 34 may be divided into various regions, including but not limited to a top region and various side regions. The removable seat cover 801 may be sized to cover the top region and portions of the other regions of the seat bottom 34. Specifically, as depicted in FIGS. 8A-8D, the removable seat cover 801 may be sized to cover the top region and top portions of each side region of the seat bottom 34.

As with the material body 812, the removable seat cover 801 may include a seat material body 803 that may be formed from various materials including, but not limited to, soft fabrics such as cloth or other materials such as polyurethane, polyvinyl chloride (PVC), neoprene and/or leather. While particular reference is made to particular materials from which the seat material body 803 may be formed, the seat material body 803 may be formed of other materials and/or combinations of these and other materials such as anti-abrasion material, neoprene, or any other material presently developed or yet to be developed that imparts a desired functionality.

As with the removable trim cover 802, the removable seat cover 801 may be affixed to a seat support substrate 805, which may be the seat bottom 34 itself or a base seat cover installed over the seat bottom 34.

The seat support substrate 805 may be sized to cover the lower portions of the side regions of the seat bottom 34. The seat support substrate 805 may also be formed of various materials such as fabric or another material such as polyurethane, polyvinyl chloride (PVC), and/or leather. In one particular example, the seat support substrate 805 is a rigid material such as molded thermoplastic. While particular reference is made to particular materials from which the seat support substrate 805 may be formed, the seat support substrate 805 may be formed of other materials and/or combinations of these and other materials.

As described above, the removable seat cover 801 is attachable to the seat support substrate 805, whether the seat bottom 34 itself or a seat base trim cover via a slide fastener, such as a seat zipper 807. That is, the removable seat cover 801 includes a first seat zipper portion 813, disposed around (e.g., sewn to or otherwise joined to) a border of the seat material body 803. The first zipper portion 813 is adapted to be joined with a second seat zipper portion 811 that is affixed to (e.g., sewn to or otherwise joined to) the seat support substrate 805, whether to the seat bottom 34 itself or to a seat base trim cover that overlays the seat bottom 34.

Specifically, as depicted in FIG. 8A, the seat zipper 807, and corresponding seat zipper portions 813 and 811 on the removable seat cover 801, and the seat support substrate 805 join along an outboard side portion of the seat bottom 34, the outboard side portion of the seat bottom 34 being that portion that is adjacent to a door of the vehicle. The outboard side portion of the seat bottom 34 may refer to the left side for a driver seat and the right side for a passenger seat. As depicted in FIG. 8A, the seat zipper 807, and corresponding zipper portions 813 and 811 on the removable seat cover 801 and seat support substrate 805 continue along the front face of the seat bottom 34. As depicted in FIG. 8C, the seat zipper 807, and corresponding zipper portions 813 and 811 on the removable seat cover 801 and the seat support substrate 805 continue along an inboard side portion of the seat bottom 34, the inboard side portion of the seat bottom 34 being that portion that is away from the door of the vehicle, and adjacent another seat, or center console of the vehicle. The inboard side portion of the seat bottom 34 may refer to the right side for a driver seat and the left side for a passenger seat. Thus, the seat zipper 807 and respective zipper portions 813 and 811 extend along three edges of the associated joined component.

In an example, the remaining edge (i.e., a back edge of the removable seat cover 801) is joined to the seat bottom 34 via a different attachment mechanism, such as a seat attachment device 815 disposed along a rear edge of the seat material body 803. The seat attachment device 815 is adapted to be joined with a mating attachment device on the seat 28. For example, the seat attachment device 815 may be one half of a hook-and-loop fastener strip (e.g., a strip with hooks or loops). A bottom edge of the backrest (i.e., a portion of the backrest 100 that meets a seat portion of the seat 28) may include the other half of the hook-and-loop fastener strip. Accordingly, after aligning and placing the removable seat cover 801 on the seat bottom 34, a user may join the two zipper portions 811 and 813 via a slider and may join the seat attachment device 815 to the corresponding attachment device on the backrest 100 to join the removable seat cover 801 to the seat 28.

In this example, a user may attach the removable seat cover 801 to the seat bottom 34 by sliding the seat zipper 807 along a path from the outboard side, across the front face of the seat bottom 34, and along the inboard side of the seat bottom 34.

FIGS. 9A and 9B are schematic exploded perspective views of a front side (FIG. 9A) and a rear side (FIG. 9B) of a removable trim cover 802 of the trim cover assembly 800. As described above, the removable trim cover 802 is sized to cover a front face 100f of the backrest 100, front-facing surfaces of the left side bolster 107, and front-facing surfaces of the right side bolster 109. The material body 812 is also sized to cover the left upper bolster end portion 114, the centrally-positioned headrest portion 118, and the right upper bolster end portion 116. In the example depicted in FIGS. 9A and 9B, the removable trim cover 802 attaches directly to the backrest 100, whereas in the example depicted in FIGS. 10A and 10B, the removable trim cover 802 attaches to a base trim cover that envelopes cushions of the backrest 100.

FIGS. 9A and 9B also depict the first zipper portion 916 that is attached to (e.g., sewn to or otherwise joined to) edges of the material body 812 and that is adapted to be joined with the second zipper portion 918 that is attached to (e.g., sewn to or molded into) the backrest 100, specifically to an outboard side surface, a top backside surface, and an inboard side surface of the backrest. As described above, a central portion of the first zipper portion 916 is adapted to be joined with a central portion of the second zipper portion 918 that is behind the headrest 808 of the seat 28.

In the example depicted in FIGS. 9A and 9B, the removable trim cover 802 includes an attachment device 920 disposed along a bottom edge of the material body 812. The attachment device 920 is adapted to be joined with a mating attachment device on the bottom surface of the backrest 100. For example, the attachment device 920 may be one half of a hook-and-loop fastener strip (e.g., a strip with hooks or a strip with loops). A bottom edge of the backrest (i.e., a portion of the backrest 100 that meets a seat portion of the seat 28) may include the other half of the hook-and-loop fastener strip. Accordingly, after aligning and placing the removable trim cover 802 on the backrest 100, a user may join the two zipper portions 916 and 918 via a slider and may join the attachment device 920 to the corresponding attachment device on the backrest 100 to join the removable trim cover 802 to the backrest 100.

In an example, the removable trim cover 802 also includes a component that further ensures proper alignment of the removable trim cover 802 to the backrest 100. Specifically, the material body 812 has apertures 922a and 922b that form a headrest guide. The headrest guide extends through a thickness of the material body 812 and is adapted to align with headrest sleeves in the backrest 100.

In general, the backrest 100 may include headrest sleeves that receive the headrest posts 810a and 810b and facilitate the vertical translation of such as described above. The apertures 922a and 922b may be adapted to align with these headrest sleeves. Specifically, the headrest sleeves may include headrest sleeve grommets 924a and 924b that receive the headrest posts 810a and 810b. The apertures 922a and 922b may be made of an elastically deformable material and may have a smaller diameter than the diameter of the headrest sleeve grommets 924a and 924b. As such, the apertures 922a and 922b stretch and deform around the headrest sleeve grommets 924a and 924b to ultimately sit under the headrest sleeve grommets 924a and 924b. Specifically, a portion 926 of the material body 812 that includes the headrest guide (i.e., the apertures 922a and 922b) and that is adapted to be disposed under the headrest 808, may be formed of an elastically deformable material, which material may stretch under an applied force and return to an original shape when the applied force is removed.

During installation, a user may stretch the portion 926 of the material body 812. Under this applied force, the apertures 922a and 922b are enlarged such that the headrest sleeve grommets 924a and 924b may pass through the enlarged apertures 922a and 922b. With the headrest sleeve grommets 924a and 924b inserted through the enlarged apertures 922a and 922b, the user releases the portion 926 such that the apertures 922a and 922b return to their pre-stretched diameter beneath the headrest sleeve grommets 924a and 924b. In this example, the apertures 922a and 922b sit between the headrest sleeve grommets 924a and 924b and the cushion of the backrest 100. Given that the apertures 922a and 922b are smaller than the headrest sleeve grommets 924a and 924b in an unstressed state, the apertures 922a and 922b are obscured beneath the headrest sleeve grommets 924a and 924b. While FIGS. 9A and 9B depict a particular form for the apertures 922a and 922b (e.g., with a particular size and edge appearance), the apertures 922a and 922b may take a variety of forms, including having a slit shape and/or having an embroidered edge.

In an example, this portion 926 of the material body 812 may be formed of a polyurethane, PVC, leather, knit, or woven material that exhibits greater elastic deformation than other portions of the material body 812. Other portions of the material body 812 may be formed of another material, such as those mentioned above (e.g., woven natural or synthetic fabrics such as cloth, polyurethane, PVC, and/or leather) that have less elastic deformation than the portion 926 of the material body 812 that houses the apertures 922a and 922b. During manufacturing, the elastic portion 926 may be sewn or otherwise joined to other portions of the material body 812.

FIG. 9B is a schematic exploded perspective view of a back side of a removable trim cover 802 of the trim cover assembly 800. As described above, the removable trim cover 802 includes a first zipper portion 916 that mates with a second zipper portion 918 on the backrest 100 to affix the removable trim cover 802 to the seat 28. In an example, the removable trim cover 802 includes additional components to further affix the removable trim cover 802 to the seat 28. Specifically, even with the peripheral attachment system (i.e., the zipper 806), the material body 812 may slide across the front face 100f of the backrest 100.

Accordingly, in an example, the removable trim cover 802 further includes supplemental disengageable connection components 926a, 926b, and 926c on a cushion-facing surface of the material body 812. In general, the supplemental disengageable connection components 926a, 926b, and 926c are adapted to connect to corresponding backrest disengageable connection components to affix the material body 812 to the backrest 100. For simplicity, a few instances of the supplemental disengageable connection components 926a, 926b, and 926c, are indicated with reference numbers. However, the removable trim cover 802 may include additional instances of the supplemental disengageable connection components. Moreover, while FIG. 9B depicts a specific number of supplemental disengageable connection components 926a, 926b, and 926c in particular locations, the supplemental disengageable connection components 926a, 926b, and 926c may be positioned at different locations on the cushion-facing surface of the material body 812.

The supplemental disengageable connection components 926a, 926b, and 926c may take various forms. For example, the supplemental disengageable connection components 926a, 926b, and 926c may be halves of a hook-and-loop fastener. As a specific example, the supplemental disengageable connection components 926a, 926b, and 926c may include strips on which hooks of a hook-and-loop fastener system are disposed. These strips may be joined to strips affixed to the support substrate 804 (i.e., the backrest itself or the base trim cover) on which loops of the hook-and-loop fastener system are disposed.

In one example, the supplemental disengageable connection components 926a, 926b, and 926c, when joined to the corresponding backrest disengageable connection components, are at least partially disposed within trenches between cushions of the backrest 100. That is, as described above, the padding of the backrest 100 may be defined by various cushions that are separated from one another via trenches 191, 194, and 195. The backrest disengageable connection components may be disposed within these trenches 191, 194, and 195. The supplemental disengageable connection components 926a, 926b, and 926c, when coupled to the backrest disengageable connection components, are similarly disposed within the trenches 191, 194, and 195.

To affix the removable trim cover 802 to the backrest 100, a user may first position the apertures 922a and 922b over and then underneath the headrest sleeve grommets 924a and 924b as described above. The user may then mate the supplemental disengageable connection components 926a, 926b, and 926c to the backrest disengageable connection components by pressing such in along the trenches 191, 194, and 195 in the cushions of the backrest 100. The user may then join the periphery of these components via the respective zipper portions 916 and 918.

In the examples depicted in FIGS. 9A-12B, the removable trim cover 802 includes an attachment device 920 disposed along a bottom edge of the material body 812. In this example, the attachment device 920 is adapted to be joined with a mating attachment device on a bottom surface of the backrest 100 or an edge of the base trim cover 1042. For example, the attachment device 920 may be one half of a hook-and-loop fastener strip (e.g., a strip with hooks or a strip with loops). A bottom edge of the backrest (i.e., a portion of the backrest 100 that meets a seat portion of the seat 28), a lower edge 44a of the base trim cover rear portion 44, or a bottom edge 62a of the backrest center portion 62 may include the other half of the hook-and-loop fastener strip. Accordingly, after aligning and placing the removable trim cover 802 on the backrest 100, a user may join the two zipper portions 916 and 918 via a slider and may join the attachment device 920 to the corresponding attachment device on the backrest 100 or base trim cover to join the removable trim cover 802 to the backrest 100.

The supplemental disengageable connection components 926a, 926b, and 926c, along with the zipper 806, attachment device 920, and headrest guide, ensure that the removable trim cover 802 remains in place over the backrest 100 and does not translate due to relative motion between the occupant and the seat, as may occur when the passenger enters or exits the vehicle or slides across the seat responsive to centrifugal force as may be experienced when navigating a turn at high speeds. That is, these connection components ensure that the removable trim cover 802 remains in place after installation and during use. Thus, the present removable trim cover 802 is securely, but removably, attached to the backrest 100, which secure and straightforward attachment facilitates the repair, removal, and/or replacement of the fabric portion of a vehicle seat by a consumer.

FIGS. 10A and 10B are schematic exploded perspective views of a front side (FIG. 10A) and a rear side (FIG. 10B) of a removable trim cover 802 and a removable seat cover 801 of the trim cover assembly 800. As described above, in the example depicted in FIGS. 9A and 9B, the removable trim cover 802 is attached directly to the backrest 100. In the example depicted in FIGS. 10A and 10B, the removable trim cover 802 is attachable to a base trim cover 1042 that envelops cushions of the backrest 100. That is, the first zipper portion 916 is adapted to be joined with a second zipper portion 918 that is disposed on a base trim cover 1042 that envelopes the cushions of the backrest 100. Note that in this example, the base trim cover 1042 may be applied to the backrest 100 while the backrest 100 is detached from the seat bottom 34.

As described above, the base trim cover 1042 may be formed from a mixture of different materials stitched or otherwise joined together. For example, the second side bolster portion 54, the first side bolster portion 56, and the backrest center portion 62 may be formed from Duon® or a similar material. Other portions of the base trim cover 1042 may be formed from materials such as fabric, polyurethane, PVC and/or leather.

As described above, the base trim cover 1042 may include a base trim cover rear portion 44 including a lower edge 44a, and a first side portion 48 extending from the base trim cover rear portion 44. The first side portion 48 may have an upper edge 56b structured for attachment to an associated first side portion 74 of the headrest cover portion 70 extending from an upper edge of the base trim cover rear portion 44. The base trim cover 42 may also have a second side portion 46 extending from the rear portion 44. The second side portion 46 may have an upper edge 54b structured for attachment to an associated second side portion 72 of the headrest cover portion 70. A headrest cover portion first side portion 74 may extend from the headrest cover base portion 70a, and a headrest cover portion second side portion 72 may extend from the headrest cover base portion 70a opposite the headrest cover first side portion 74. The headrest cover portion 70 may include holes 101 structured to accommodate supports for an associated headrest 808. Specifically, the holes 101 may be wrapped over and underneath headrest sleeve grommets 924a and 924b of the backrest 100.

The base trim cover 1042 may further include a backrest center portion 62 attached to (and extending from) the headrest cover portion 70. The backrest center portion 62 may include a bottom edge 62a structured to be securable to a bottom portion of the backrest 100 or to the backrest frame below the level of an upper surface. The backrest center portion 62 may include a first side edge 62c and a second side edge 62b opposite the first side edge. As described above, the base trim cover 1042 is wrapped around the backrest 100, with portions thereof to be covered by the removable trim cover 802.

FIG. 10B is a schematic exploded perspective view of the back side of a removable trim cover 802 and a base trim cover 1042 of the trim cover assembly 800. As described above, the base trim cover 1042 may include an outwardly-facing second zipper portion 918. An "outwardly-facing zipper portion" may be a zipper portion attached so as to face away from the seat 28 when the base trim cover 1042 is applied to the backrest 100 so as to enable teeth of the second zipper portion 918 to be engaged with complementary teeth of a mating first zipper portion 916 on the removable trim cover 802 by application of an associated slider and a pull tab, to bring together and mate the teeth of the zipper portions in a conventional manner. A "zipper portion" may be a portion of a zipper (e.g., a set of zipper teeth, a slider, etc.) operably connected to and/or structured to interact with another portion (i.e., a complementary, mating set of teeth) of the zipper. As depicted in FIG. 10B, the first zipper portion 916 and the second zipper portion 918 may be formed on three edges (e.g., an outboard edge, top edge, and inboard edge) of the removable trim cover 802 and the base trim cover 1042, respectively.

To affix the removable trim cover 802 to the base trim cover 1042, a user may first position the apertures 922a and 922b over and underneath the headrest sleeve grommets 924a and 924b as described above. The user may then mate the supplemental disengageable connection components 926a, 926b, and 926c to the backrest disengageable connection components of the base trim cover 1042 by pressing such in along the trenches 191, 194, and 195 in the cushions of the backrest 100. The user may then join the periphery of these components via the respective zipper portions 916 and 918.

Figure 11A:
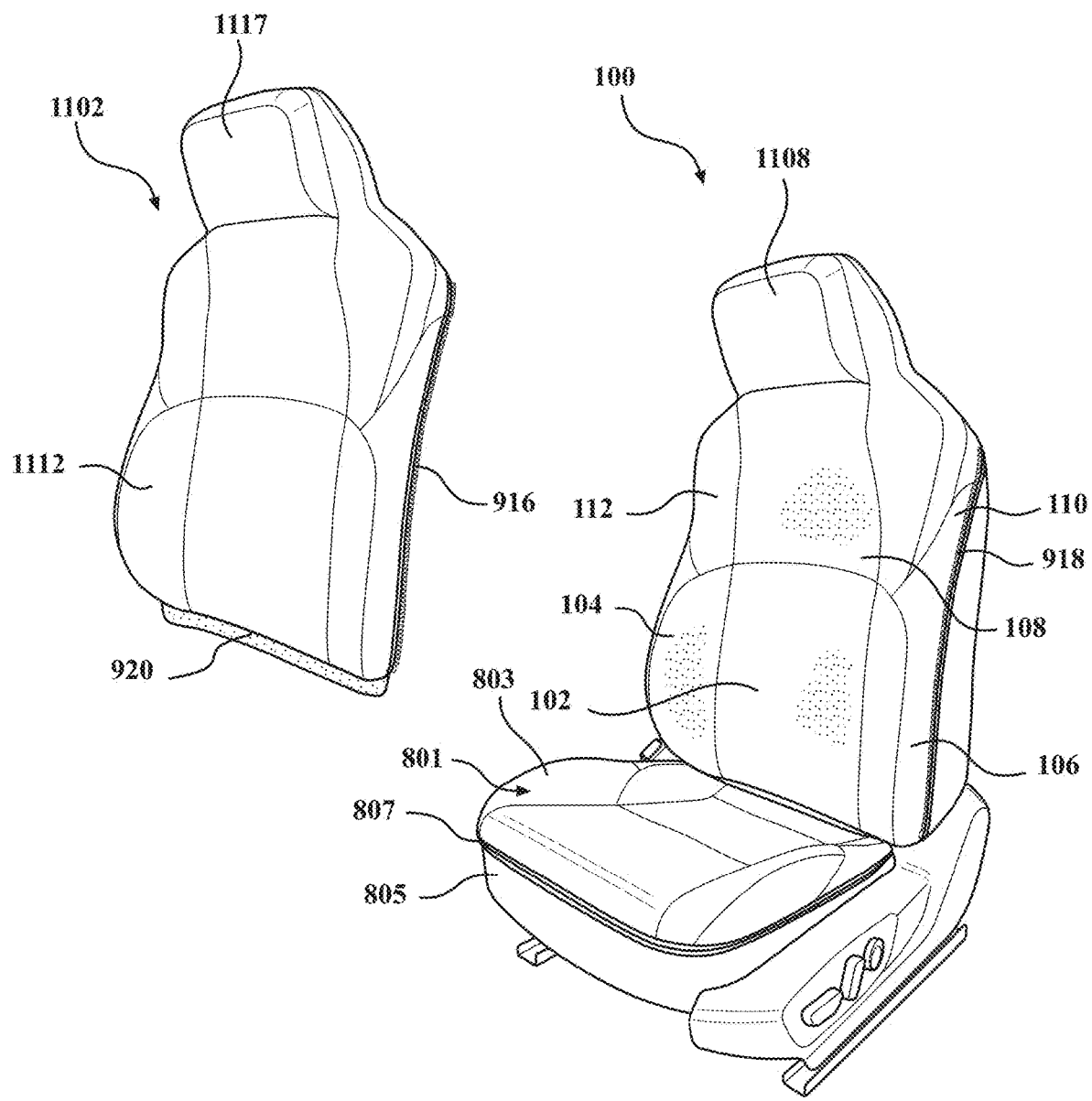
FIGS. 11A and 11B are schematic exploded perspective views of a front side and a rear side of a removable trim cover that covers a headrest in accordance with an embodiment described herein.
Figure 11B:
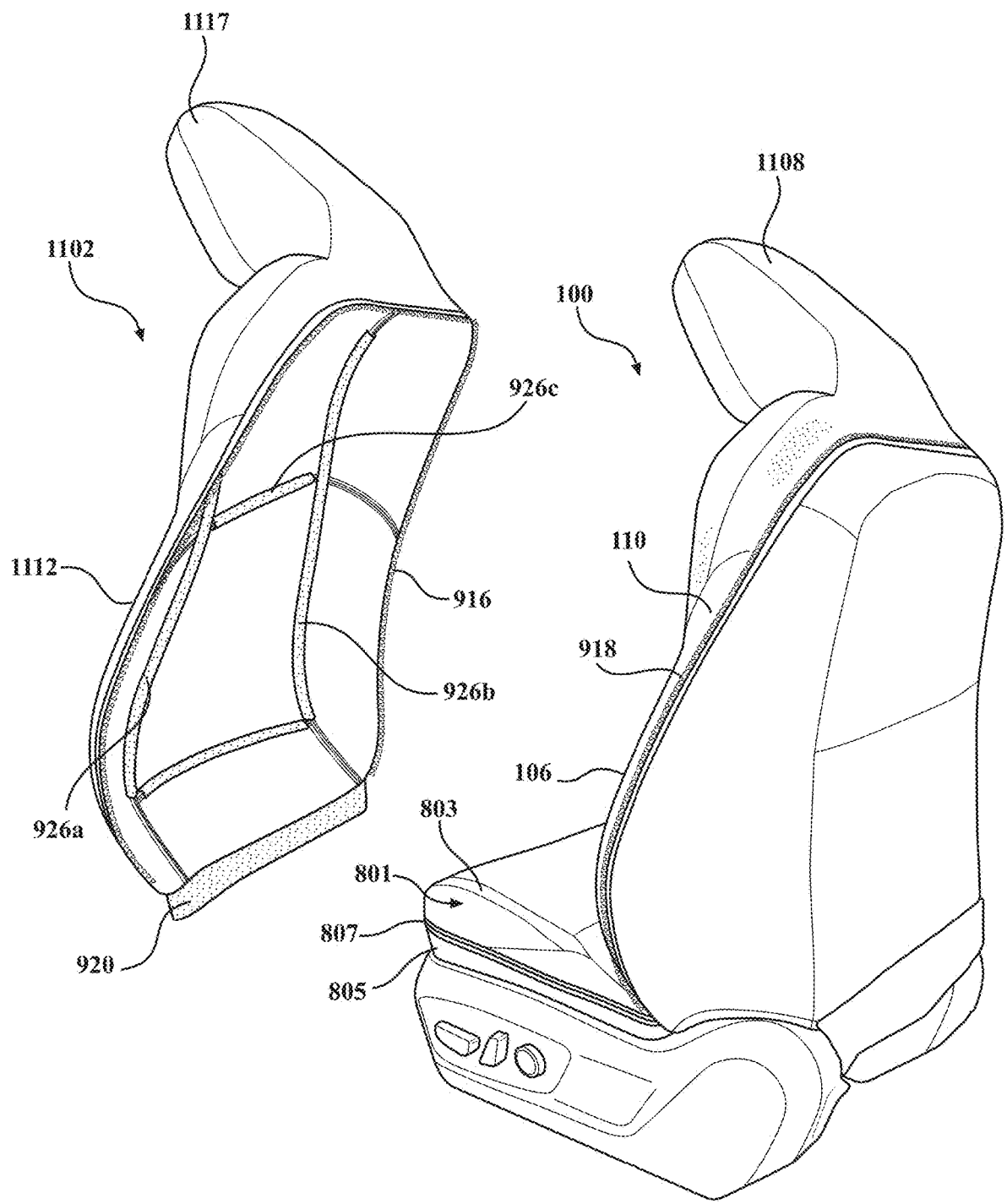

FIGS. 11A and 11B are schematic exploded perspective views of a front side (FIG. 11A) and a rear side (FIG. 11B) of a removable trim cover 1102 that covers a headrest 1108 of the seat. That is, in addition to covering a front face 100f of the backrest 100, front-facing surfaces of the left side bolster 107, and front-facing surfaces of the right side bolster 109, the material body 1112 includes a headrest portion 1117 that is sized to cover a headrest 1108 of the seat 28. That is, while FIGS. 8A-8D depict an adjustable headrest 808, some seats 28 may include a fixed and integrated headrest 1108. In this example, it may be desirable for the integrated headrest 1108 to be covered simultaneously with the front face 100f of the backrest 100. Accordingly, the material body 1112 may include an integrated headrest portion 1117. Doing so may provide a single continuous aesthetic across the removable trim cover 1102.

Accordingly, in the example depicted in FIGS. 11A-12B, the material body 1112 includes a portion, i.e., a headrest portion 1117, that extends over the front, rear, and side surfaces of the integrated headrest 1108 of the seat. In an example, the headrest portion 1117 of the material body 1112 may be formed of the same material as the rest of the material body 1112 (e.g., the portion that covers the front face 100f of the backrest). In other examples, the headrest portion 1117 may be formed of a different material. In either example, the material body 1112 with the integrated headrest portion 1117 may have a continuous pattern across the surface.

Figure 12A:
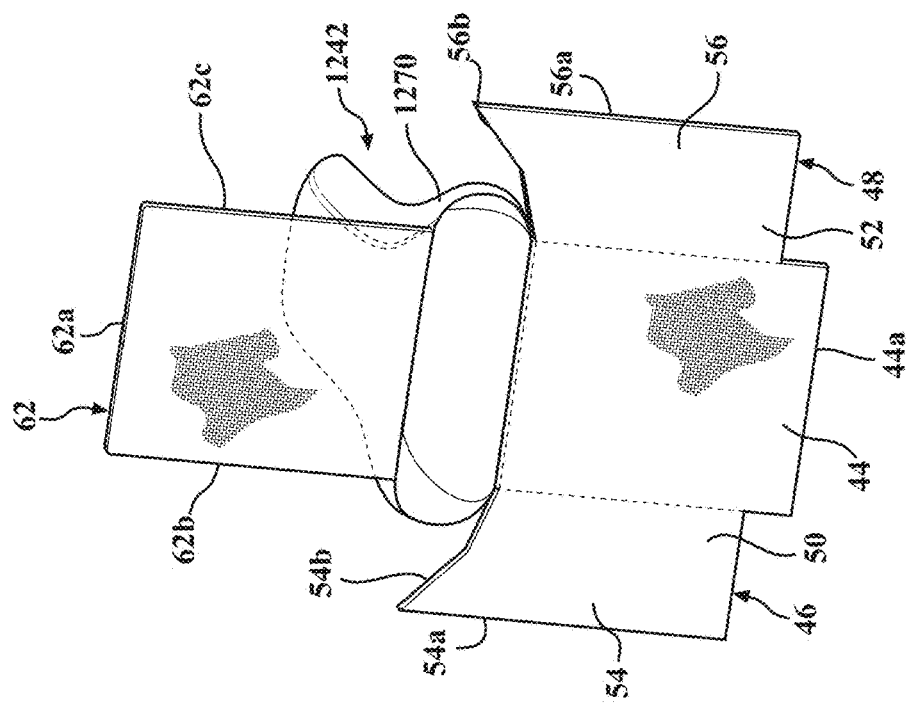
FIGS. 12A and 12B are schematic exploded perspective views of a front side and a rear side of a removable trim cover that covers a headrest and a base trim cover in accordance with an embodiment described herein.
Figure 12A:
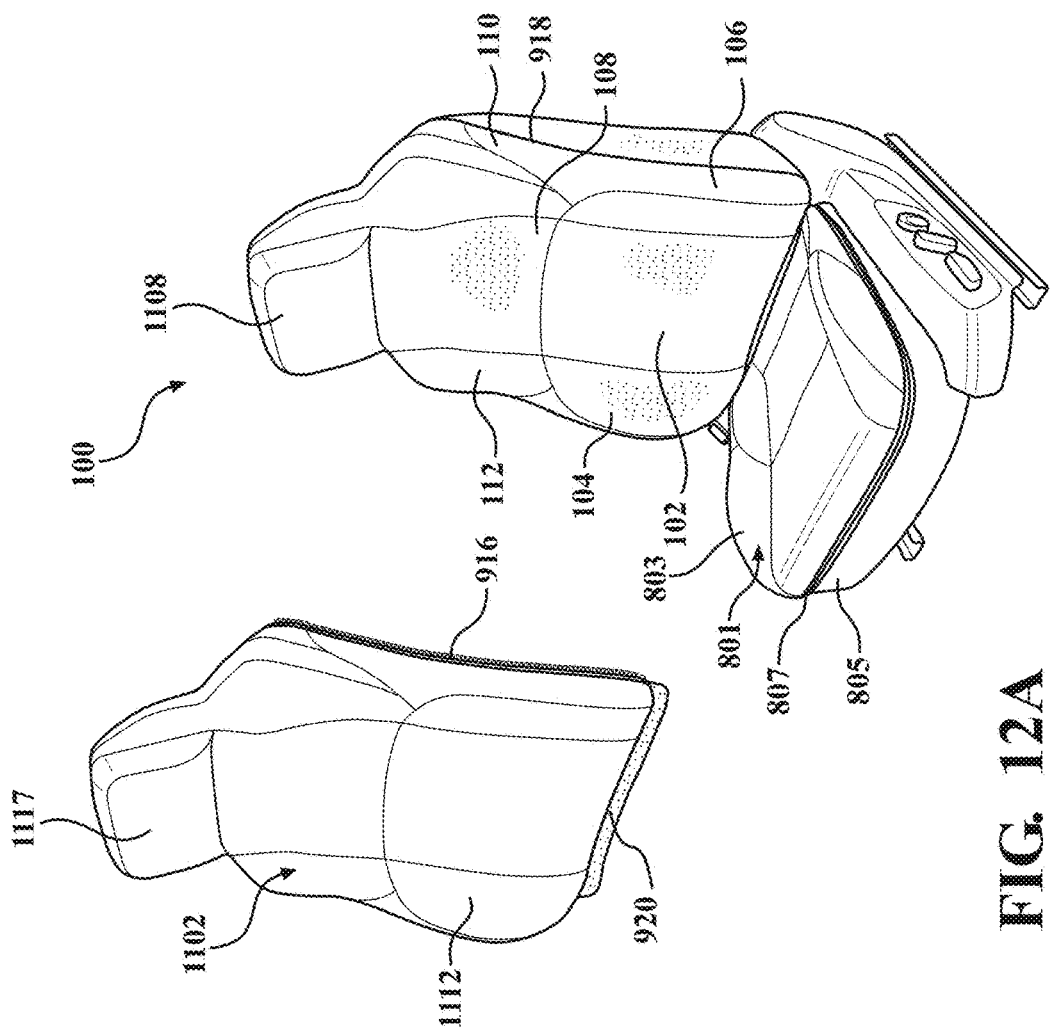
Figure 12B:
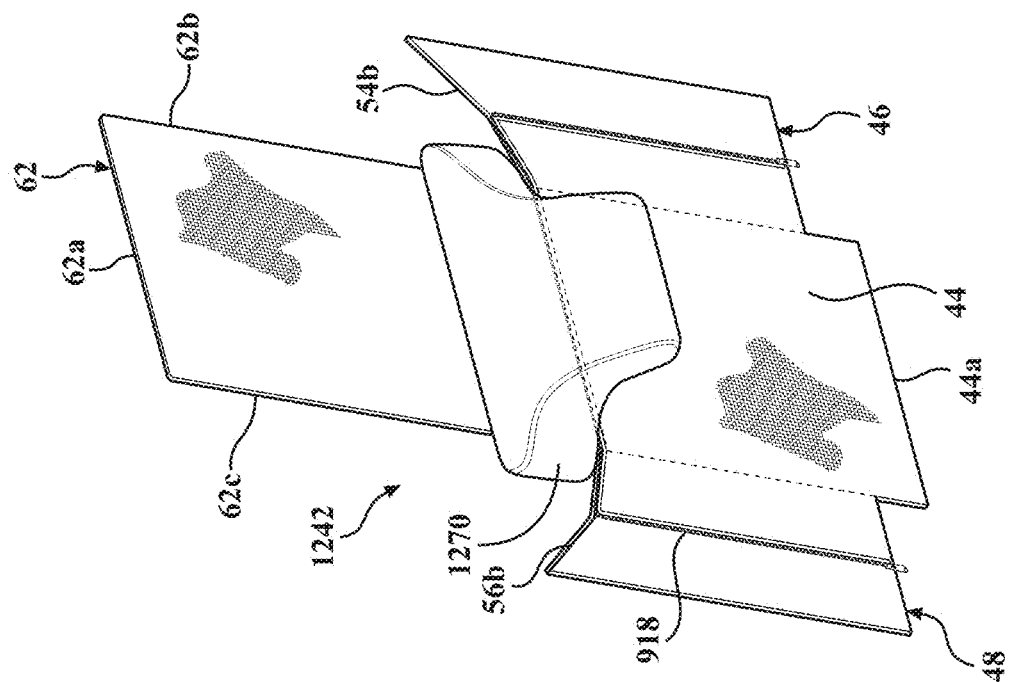
Figure 12B:
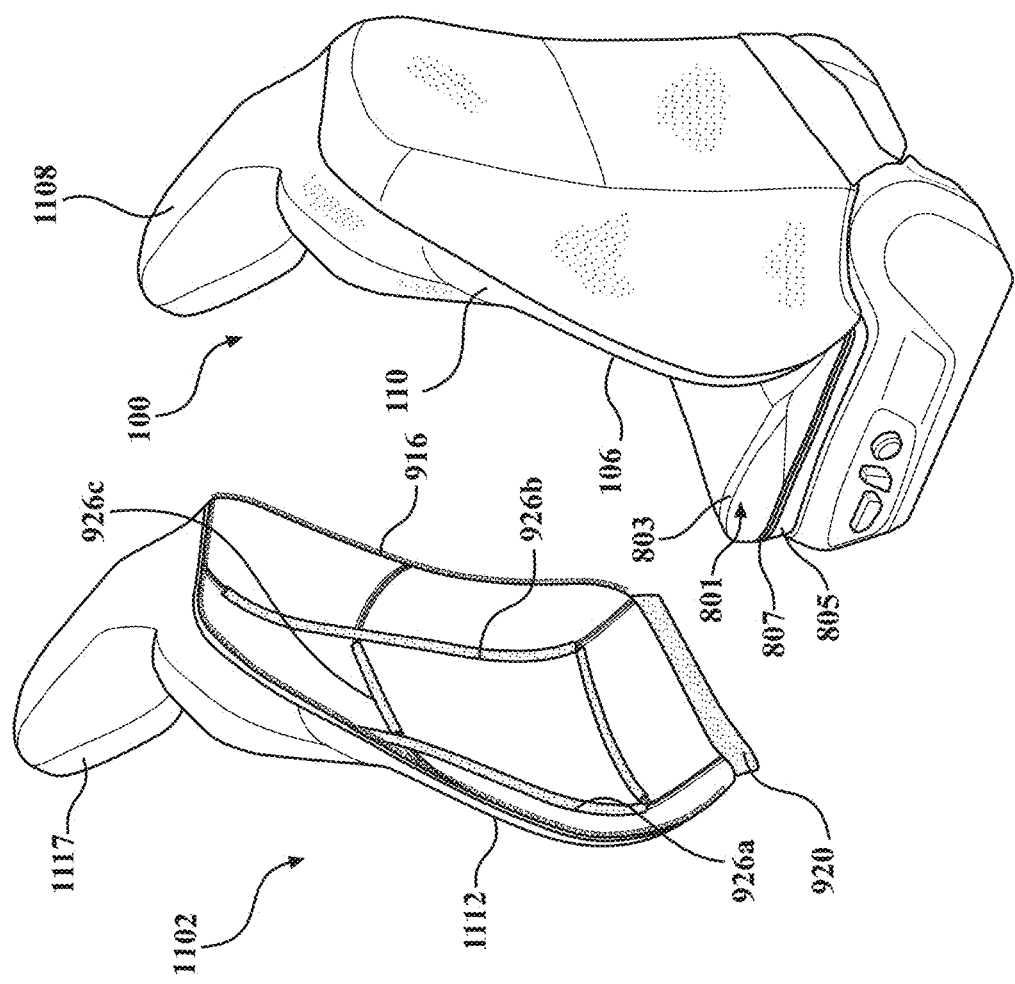

In the example depicted in FIGS. 11A and 11B, the removable trim cover 1102 attaches directly to the backrest 100, whereas in the example depicted in FIGS. 12A and 12B, the removable trim cover 1102 attaches to a base trim cover that envelopes cushions of the backrest 100.

FIGS. 11A and 11B also depict the first zipper portion 916 that is attached to (e.g., sewn to or otherwise joined to) edges of the material body 1112 and that is adapted to be joined with the second zipper portion 918 that is attached to (e.g., sewn to or molded into) the backrest 100, specifically to an outboard side surface, a top backside surface, and an inboard side surface of the backrest. As described above, a central portion of the first zipper portion 916 is adapted to be joined with a central portion of the second zipper portion 918 that is behind the headrest 808 of the seat 28.

As described above, in an example depicted in FIGS. 11A and 11B, the removable trim cover 1102 includes the attachment device 920 disposed along a bottom edge of the material body 1112 that is adapted to be joined with a mating attachment device on a bottom surface of the backrest 100.

In this example, the removable trim cover 1102 does not include the apertures 922a and 922b as the headrest portion 1117 extends over, rather than underneath, a headrest 808. During installation, a user may stretch the headrest portion 1117 of the removable trim cover 1102 over the headrest 808 of the seat 28.

FIG. 11B is a schematic exploded perspective view of the back side of a removable trim cover 1102 that includes an integrated headrest portion 1117 of the trim cover assembly. As described above, the removable trim cover 1102 includes a first zipper portion 916 that mates with a second zipper portion 918 on the backrest 100 to affix the removable trim cover 1102 to the seat 28.

In the example depicted in FIG. 11B, the removable trim cover 1102 further includes supplemental disengageable connection components 926a, 926b, and 926c on a cushion-facing surface of the material body 1112, as described above. For simplicity, a few instances of the supplemental disengageable connection components 926a, 926b, and 926c, are indicated with reference numbers. However, the removable trim cover 1102 may include additional supplemental disengageable connection components.

In this example, the headrest portion 1117 may register or align the removable trim cover 1102 to the backrest 100. That is, to affix the removable trim cover 1102 to the backrest 100, a user may first position the headrest portion 1117 over a headrest 1108 of the seat 28. The user may then mate the supplemental disengageable connection components 926a, 926b, and 926c to the backrest disengageable connection components by pressing such in along the trenches 191, 194, and 195 in the cushions of the backrest 100. The user may then join the periphery of these components via the respective zipper portions 916 and 918.

FIGS. 12A and 12B are schematic exploded perspective views of a front side (FIG. 12A) and a rear side (FIG. 12B) of a removable trim cover 1102 that covers an integrated headrest 1108 of the seat 28 and a base trim cover 1242 of the trim cover assembly 800. As described above, in the example depicted in FIGS. 11A and 11B, the removable trim cover 1102 is attached directly to the backrest 100. In the example depicted in FIGS. 12A and 12B, the removable trim cover 1102 is attachable to a base trim cover 1242 that envelops the cushions of the backrest 100. That is, the first zipper portion 916 is adapted to be joined with a second zipper portion 918 that is disposed on a base trim cover 1042 that envelopes the cushions of the backrest 100.

As described above, the base trim cover 1242 may be formed from a mixture of different materials stitched or otherwise joined together. For example, the second side bolster portion 54, the first side bolster portion 56, and the backrest center portion 62 may be formed from Duon® or a similar material. Other portions of the base trim cover 1242 may be formed from materials such as fabric, polyurethane, PVC and/or leather.

As described above, the base trim cover 1242 may include a base trim cover rear portion 44 including a lower edge 44a, and a first side portion 48 extending from the base trim cover rear portion 44. The first side portion 48 may have an upper edge 56b structured for attachment to an associated first side portion of the headrest cover portion 1270 extending from an upper edge of the base trim cover rear portion 44. The base trim cover 42 may also have a second side portion 46 extending from the rear portion 44. The second side portion 46 may have an upper edge 54b structured for attachment to an associated second side portion of the headrest cover portion 1270. As depicted in FIGS. 12A and 12B, the headrest cover portion 1270 may be sized to cover the integrated headrest 1108 of the vehicle seat 28.

The base trim cover 1242 may further include a backrest center portion 62 attached to (and extending from) the headrest cover portion 1270. The backrest center portion 62 may include a bottom edge 62a structured to be securable to a bottom portion of the backrest 100 or to the backrest frame below the level of an upper surface. The backrest center portion 62 may include a first side edge 62c and a second side edge 62b opposite the first side edge. As described above, the base trim cover 1242 is wrapped around the backrest 100, with portions thereof to be covered by the removable trim cover 1102.

FIG. 12B is a schematic exploded perspective view of the back side of a removable trim cover 1102 with a headrest portion 1117 and a base trim cover 1242 of the trim cover assembly. As described above, the base trim cover 1242 may include an outwardly-facing second zipper portion 918. An "outwardly-facing zipper portion" may be a zipper portion attached so as to face away from the seat 28 when the base trim cover 1042 is applied to the backrest 100 so as to enable teeth of the second zipper portion 918 to be engaged with complementary teeth of a mating first zipper portion 916 on the removable trim cover 1102 by application of an associated slider and a pull tab, to bring together and mate the teeth of the zipper portions in a conventional manner. A "zipper portion" may be a portion of a zipper (e.g., a set of zipper teeth, a slider, etc.) operably connected to and/or structured to interact with another portion (i.e., a complementary, mating set of teeth) of the zipper. As depicted in FIG. 12B, the first zipper portion 916 and the second zipper portion 918 may be formed on three edges (e.g., an outboard edge, top edge, and inboard edge) of the removable trim cover 1102 and the base trim cover 1042, respectively.

To affix the removable trim cover 1102 to the base trim cover 1242, a user may first position the headrest portion 1117 over the headrest 1108 as described above. The user may then mate the supplemental disengageable connection components 926a, 926b, and 926c to the backrest disengageable connection components of the base trim cover 1042 by pressing such in along the trenches 191, 194, and 195 in the cushions of the backrest 100. The user may then join the periphery of these components via the respective zipper portions 916 and 918.

Figure 13:
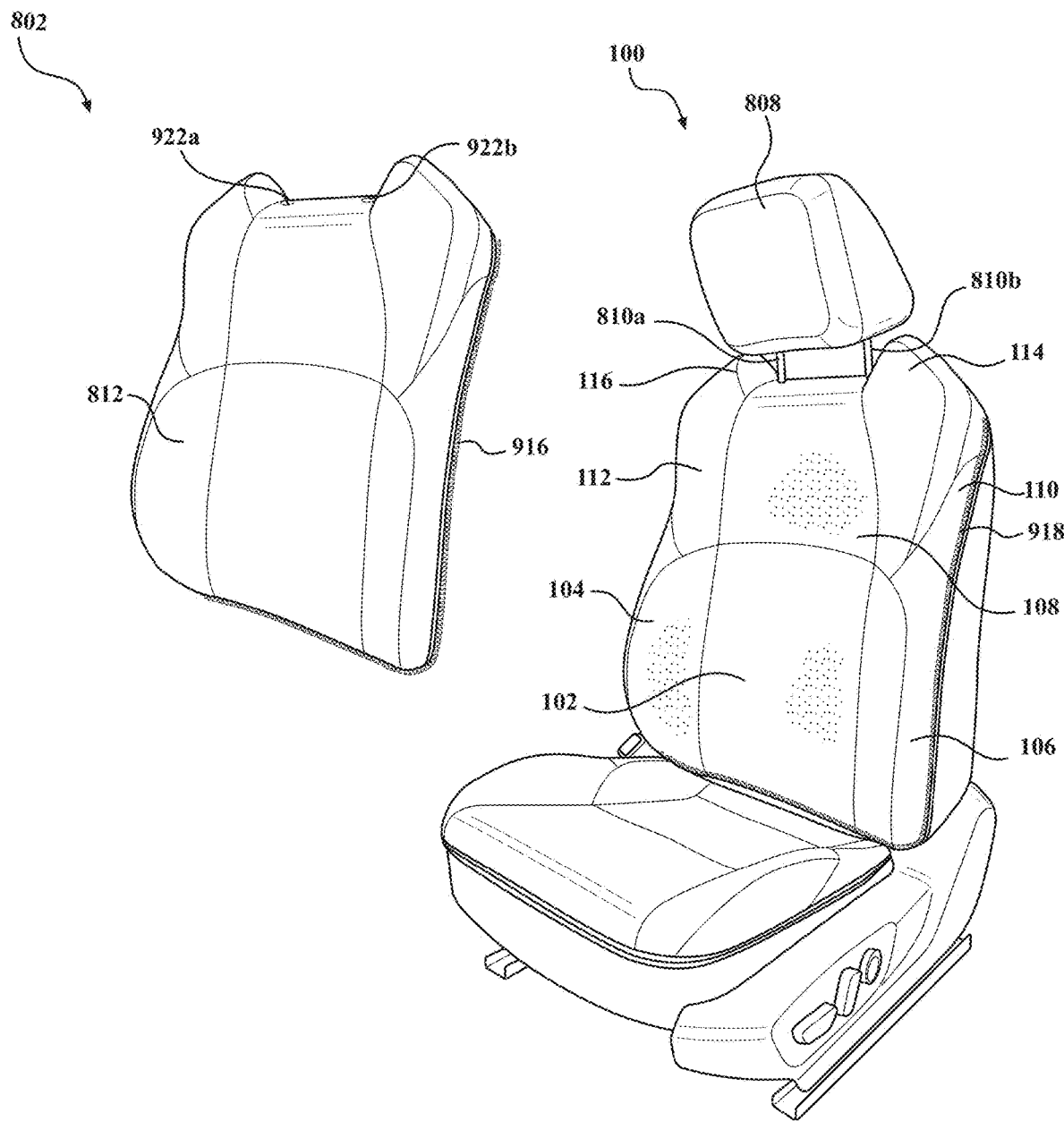
FIG. 13 is a schematic exploded perspective view of a front side of a removable trim cover in accordance with an embodiment described herein.

FIG. 13 is a schematic exploded perspective view of a front side of a removable trim cover 802 of the trim cover assembly 800 in accordance with an embodiment described herein. In the example depicted in FIG. 13, the zipper 806 is perimetric. That is, the first zipper portion 916 is disposed around four edges of the removable trim cover 802. Put another way, the first zipper portion 916 may be a perimetric zipper portion disposed around a full boundary of the material body 812. This perimetric first zipper portion 916 may be adapted to be joined with the second zipper portion 918, which may be affixed to an outboard side surface, a top backside surface, an inboard side surface (as depicted in FIGS. 8A-8D), as well as a bottom surface of the backrest 100, the bottom surface being that surface of the backrest 100 that is adjacent a seat bottom 34 of the seat 28. Note that while FIG. 13 depicts a perimetric zipper on a removable trim cover 802 that does not cover a headrest, a removable trim cover 1102 that includes a headrest portion 1117 that covers an integrated headrest 1108 may similarly include a perimetric zipper.

Figure 14A:
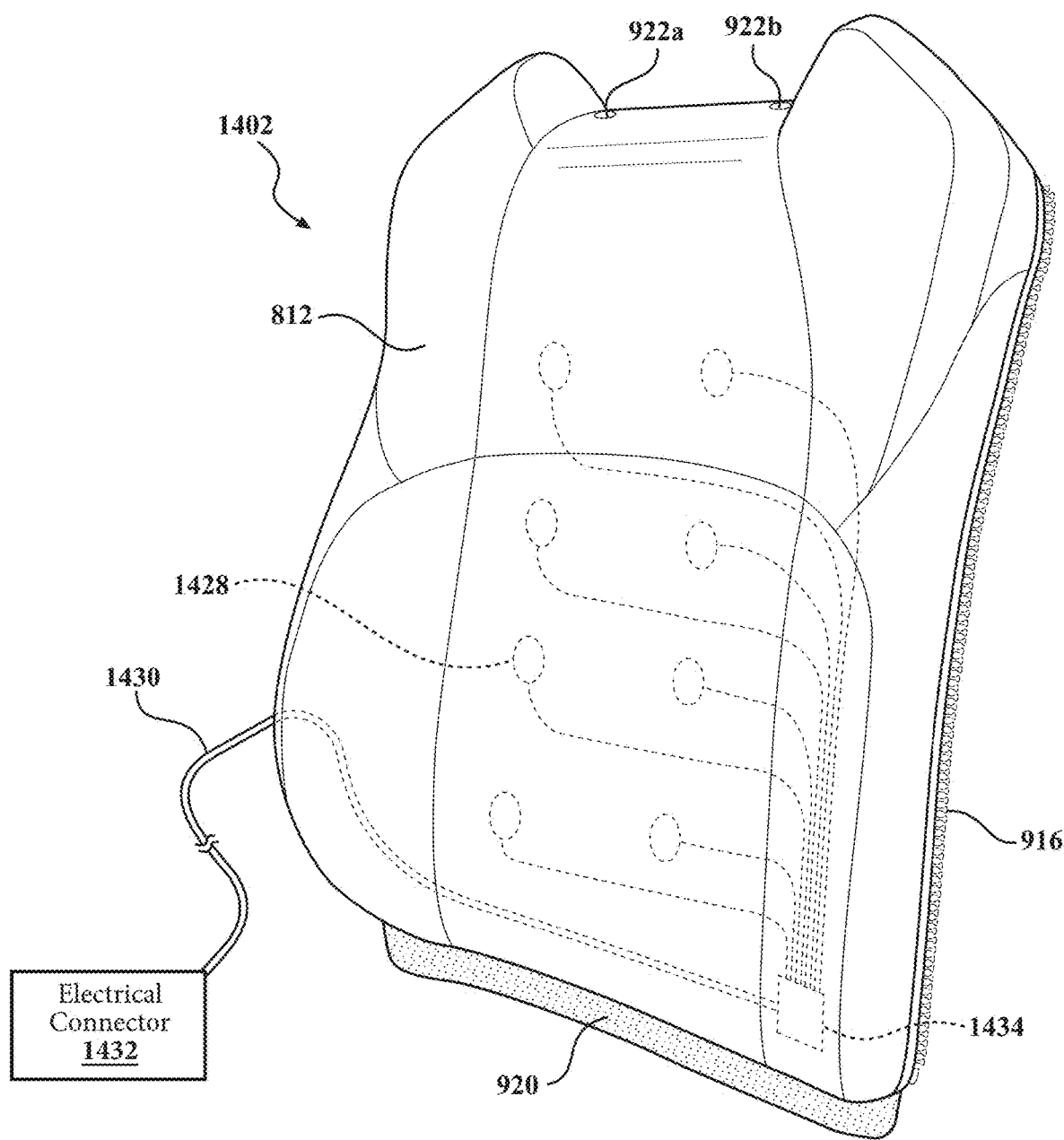
FIGS. 14A and 14B are schematic perspective views of removable cushion covers with occupant sensors in accordance with an embodiment described herein.
Figure 14B:
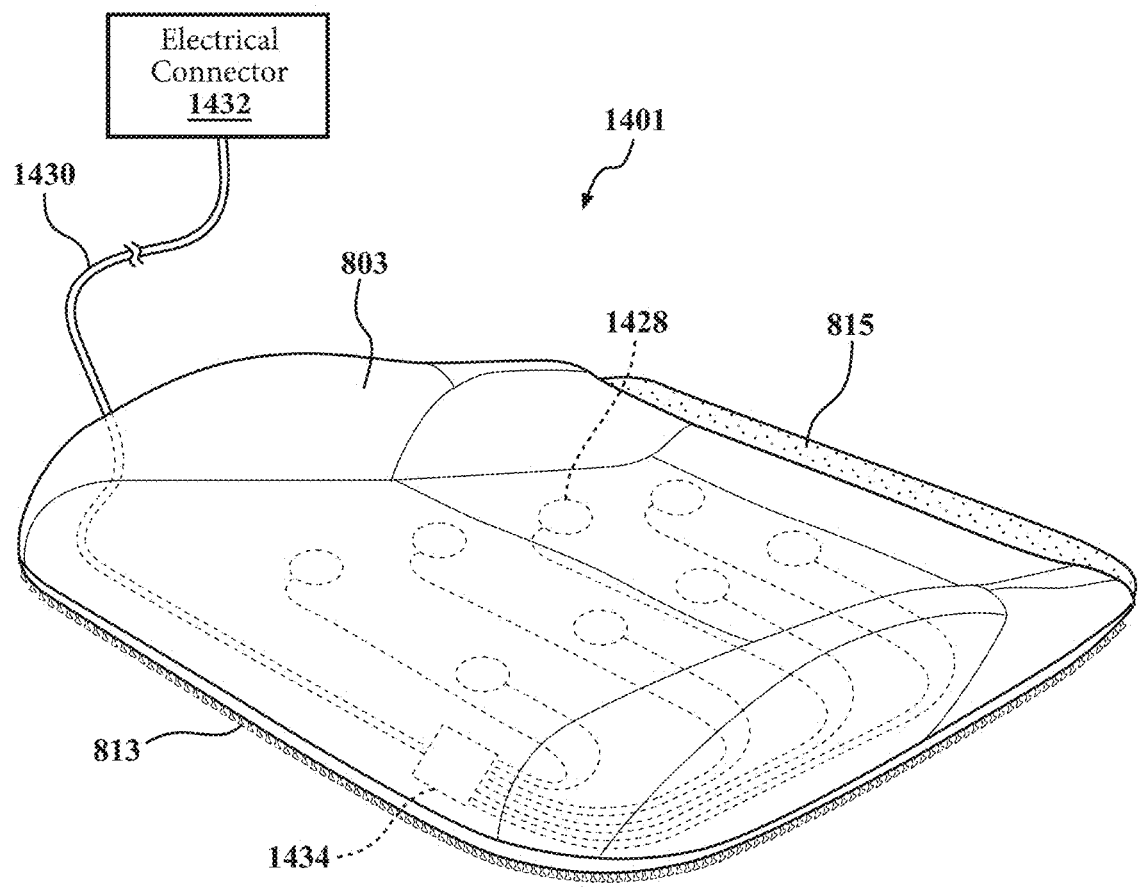

FIGS. 14A and 14B are schematic perspective views of a removable trim cover 1402 and a removable seat cover 1401 with occupant sensors 1428 in accordance with an embodiment described herein. As described above, the removable trim cover 1402 and/or a removable seat cover 1401 may include a material cover sized to cover an occupant-facing surface of a cushion. For example, the material body 812 may be sized to cover the front surface of a cushion of a backrest 100 of the seat, as depicted in FIG. 14A, while a removable seat cover 1401 includes a seat material body 803 sized to cover the top surface of a cushion of a bottom 34 of the seat 28, as depicted in FIG. 14B. In either case, the removable trim cover 1402 and/or the removable seat cover 1401 may be removably attached to the backrest 100 and a seat bottom 34, respectively of a vehicle seat 28 via the first zipper portions 916 and 813, the attachment devices 920 and 815, respectively, each of which mate with corresponding features on a backrest 100, a base trim cover 1042, a seat bottom 34, or a base seat cover respectively.

In an example, the removable trim cover 1402, the removable seat cover 1401, or both covers may further include an accessory component integrated with the material body 812 and seat material body 803, respectively. The accessory component may take a variety of forms. In one particular example, the accessory component is an electrical accessory. In this example, the removable trim cover 1402 and/or the removable seat cover 1401 may include an electrical cable 1430 coupled to an electrical connector 1432 that connects the electrical accessory component to a power source of a vehicle in which the removable trim cover 1402 and/or the removable seat cover 1401 is disposed. For example, the electrical connector may be a 12-volt connector adapted to be inserted into and draw power from a 12-volt (V) socket in the vehicle. While particular reference is made to a particular type of electrical connector (e.g., a 12 V connector), the electrical connector 1432 may be of various types that are connectable to an associated vehicle power supply. For example, the electrical connector may be connectable to a wiring harness of the vehicle below the seat 28.

The type of electrical accessory component may also vary. For example, the electrical accessory may include a number of occupant sensors 1428, as depicted in FIGS. 14A and 14B. For simplicity, in FIGS. 14A and 14B, a single instance of an occupant sensor 1428 is indicated with a reference number. The occupant sensors 1428 may be of various types and may collect information about an occupant in the vehicle. For example, the occupant sensors 1428 may be pressure sensors from which the movement/position of an occupant may be detected. Vehicle systems may use collected data to alter the driving environment. For example, based on the output of the occupant sensors 1428, a system may determine that a passenger is tired. Based on this determination, a notification may be provided to the user, or a remedial measure may be executed. In this example, the removable trim cover 1402 and/or the removable seat cover 1401 may further be equipped with a controller 1434, such as a wireless transceiver, to transmit the collected data to a system that processes the sensor output.

Figure 15A:
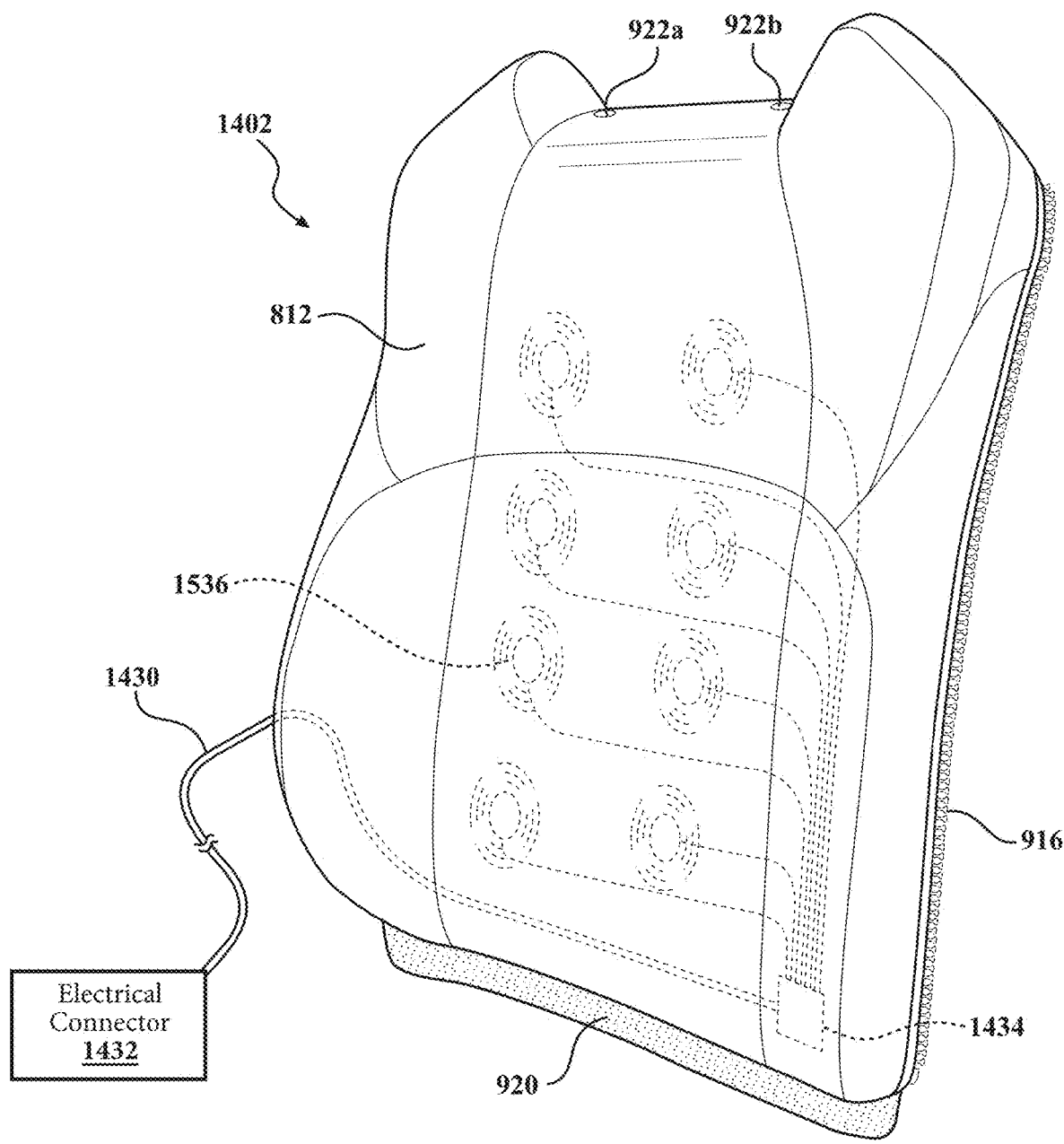
FIGS. 15A and 15B are schematic perspective views of removable cushion covers with feedback devices in accordance with an embodiment described herein.
Figure 15B:
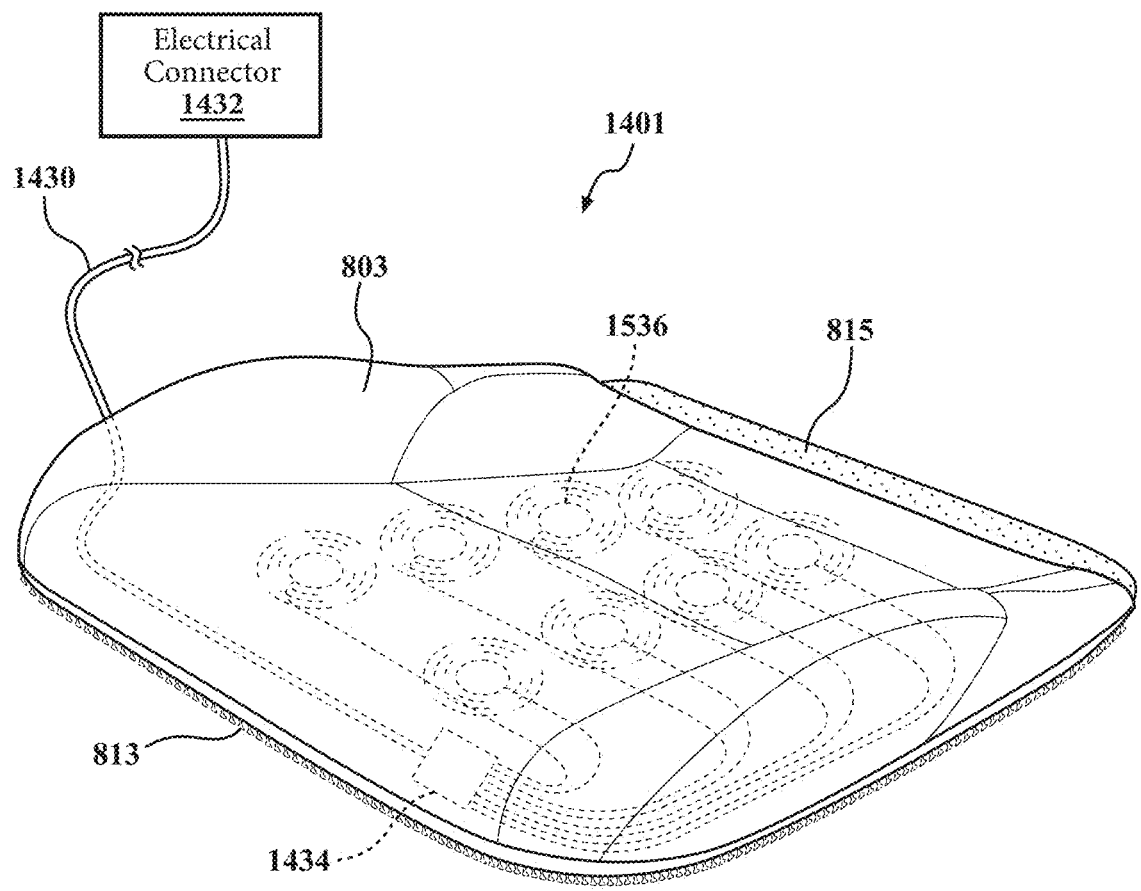

In another example, the electrical accessory may include a number of output devices 1536, as depicted in FIGS. 15A and 15B. For simplicity, in FIGS. 15A and 15B, a single instance of an output device 1536 is indicated with a reference number. The output devices may take different forms. In one example, the output devices 1536 may be haptic pads that vibrate to provide a notification/feedback to an occupant. For example, the system may generate feedback to the passenger via the haptic pads to notify the driver of a dangerous driving environment. In another example, the output device 1536 may be a massaging device that massages an occupant of the vehicle. In either example, the removable trim cover 1402 and/or the removable seat cover 1401 may further be equipped with a controller 1434 through which a user may modify the operational settings for the output devices (e.g., a massaging intensity, mode, and/or duration). The controller 1434 may also include a transceiver, such as a wireless transceiver, to receive a trigger for haptic feedback.

Figure 16A:
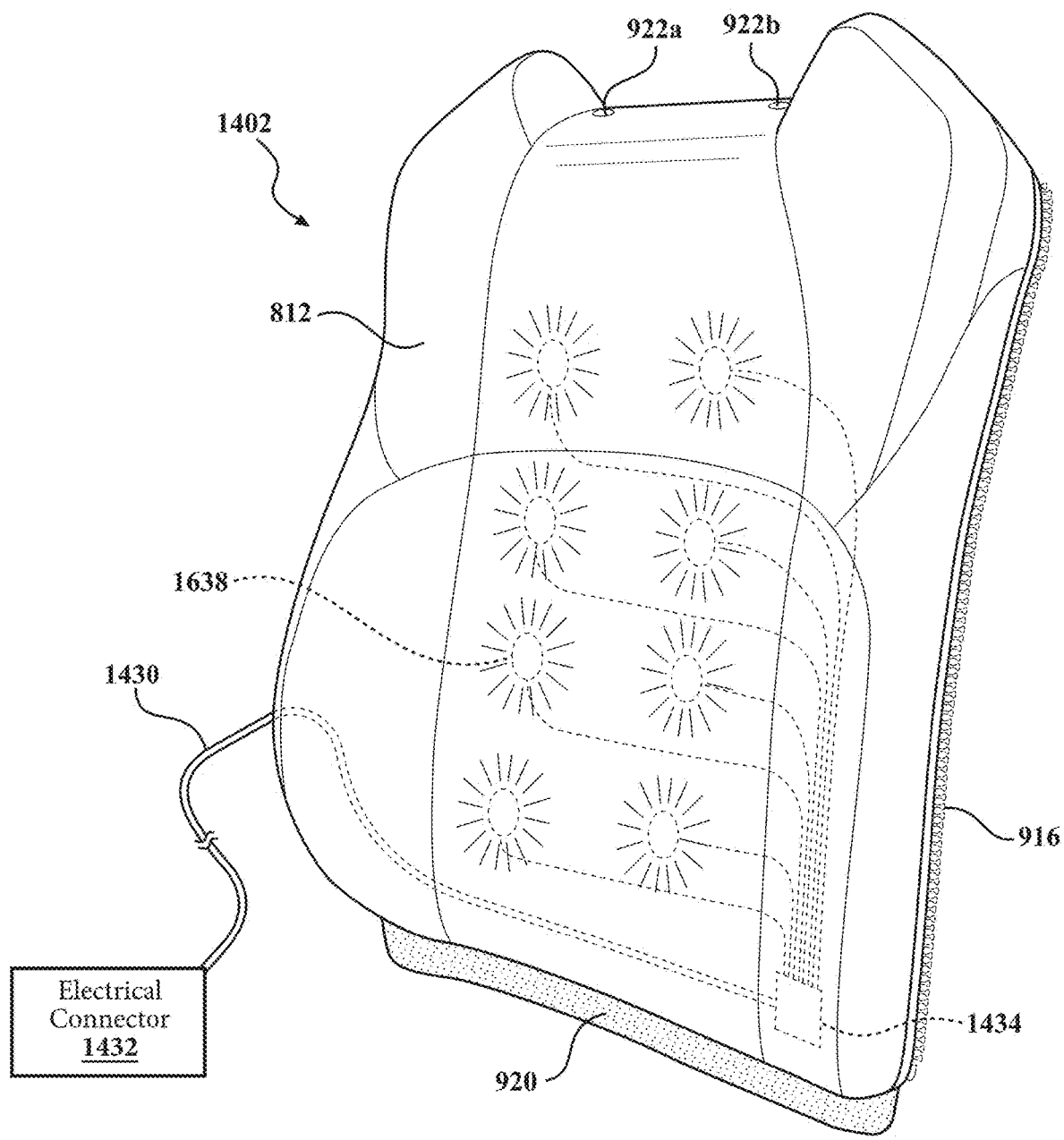
FIGS. 16A and 16B are schematic perspective views of removable cushion covers with heating devices in accordance with an embodiment described herein.
Figure 16B:
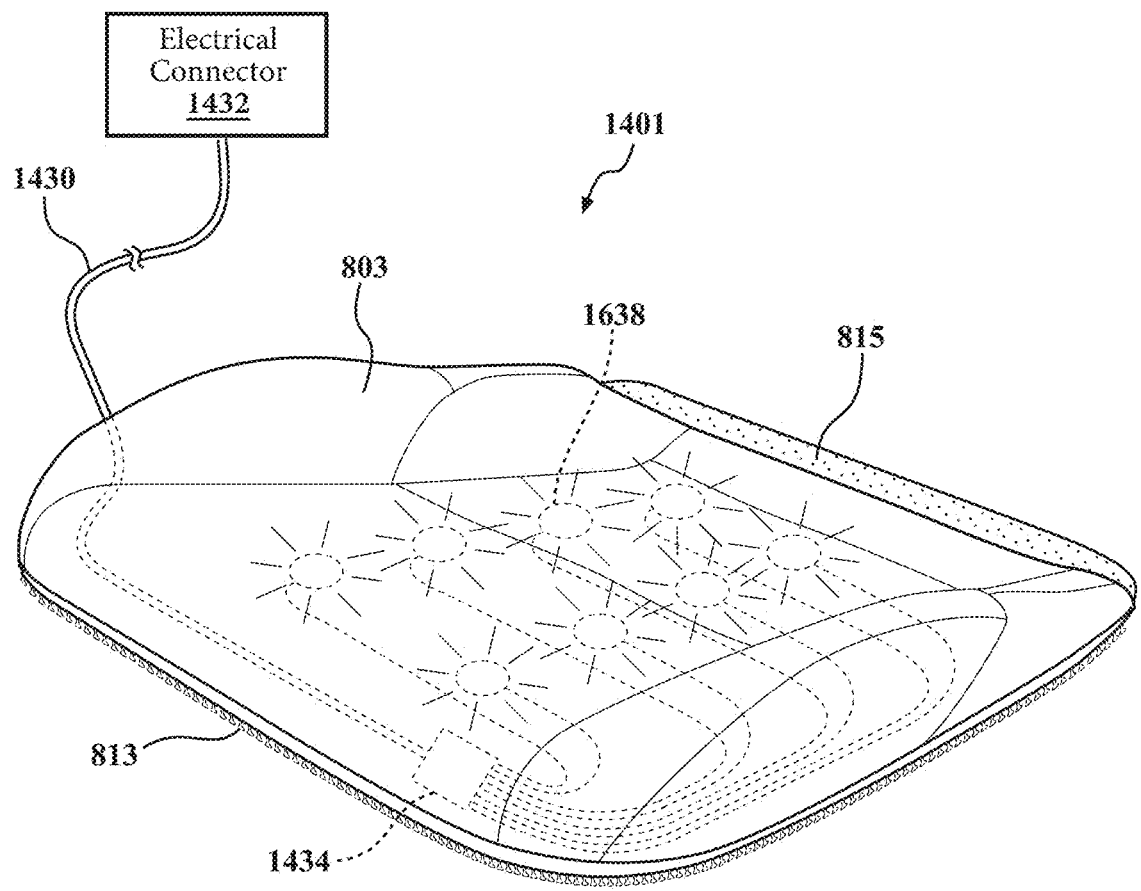

In another example, the electrical accessory may include a number of heating devices 1638, as depicted in FIGS. 16A and 16B. For simplicity, in FIGS. 16A and 16B, a single instance of a heating device 1638 is indicated with a reference number. In this example, the removable trim cover 1402 and/or the removable seat cover 1401 may further be equipped with a controller 1434 through which a user may modify the operational settings for the heating devices 1638 (e.g., a heating intensity and/or duration).

Figure 17A:
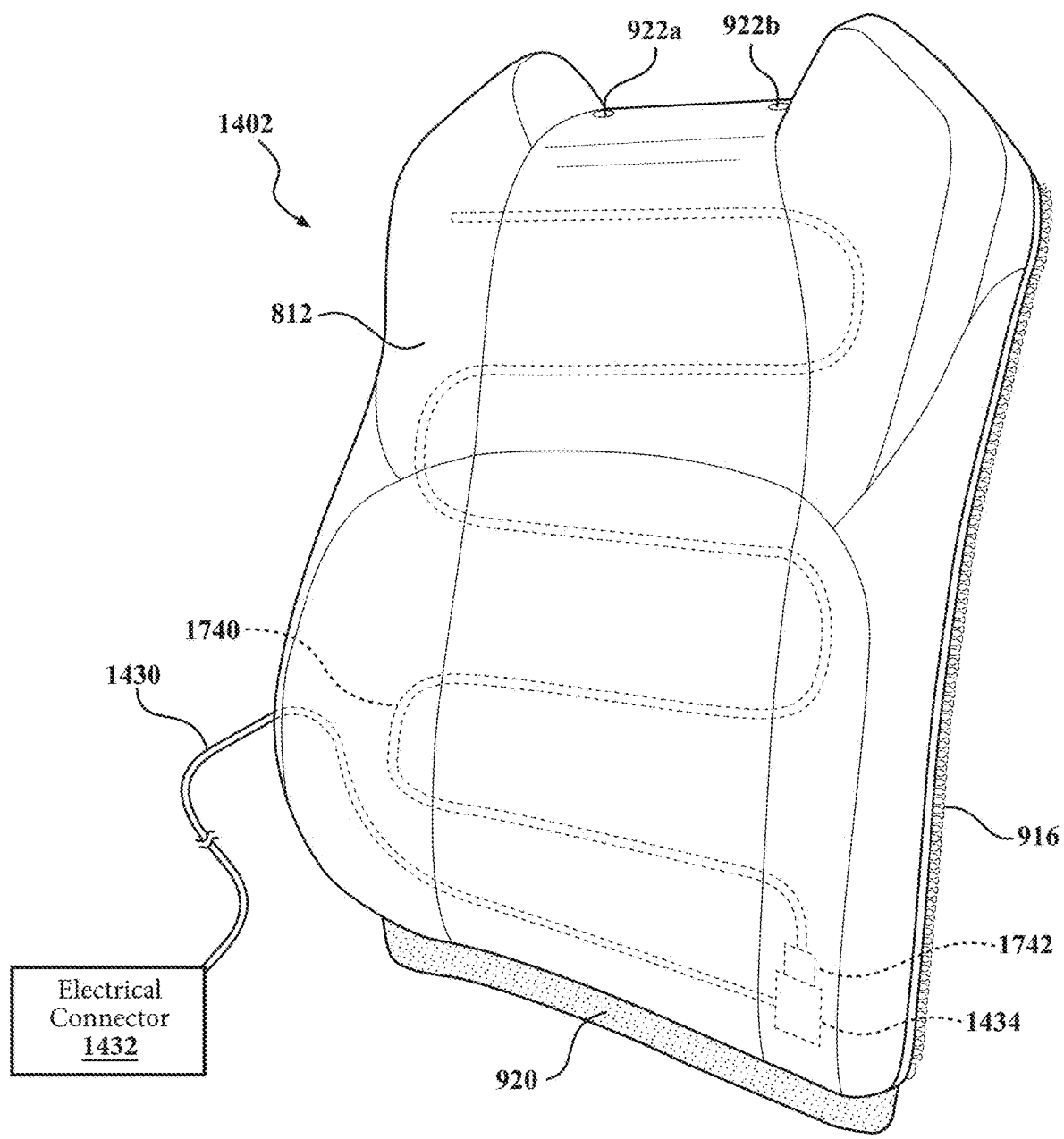
FIGS. 17A and 17B are schematic perspective views of removable cushion covers with an electric air pump and an air channel in accordance with an embodiment described herein.
Figure 17B:
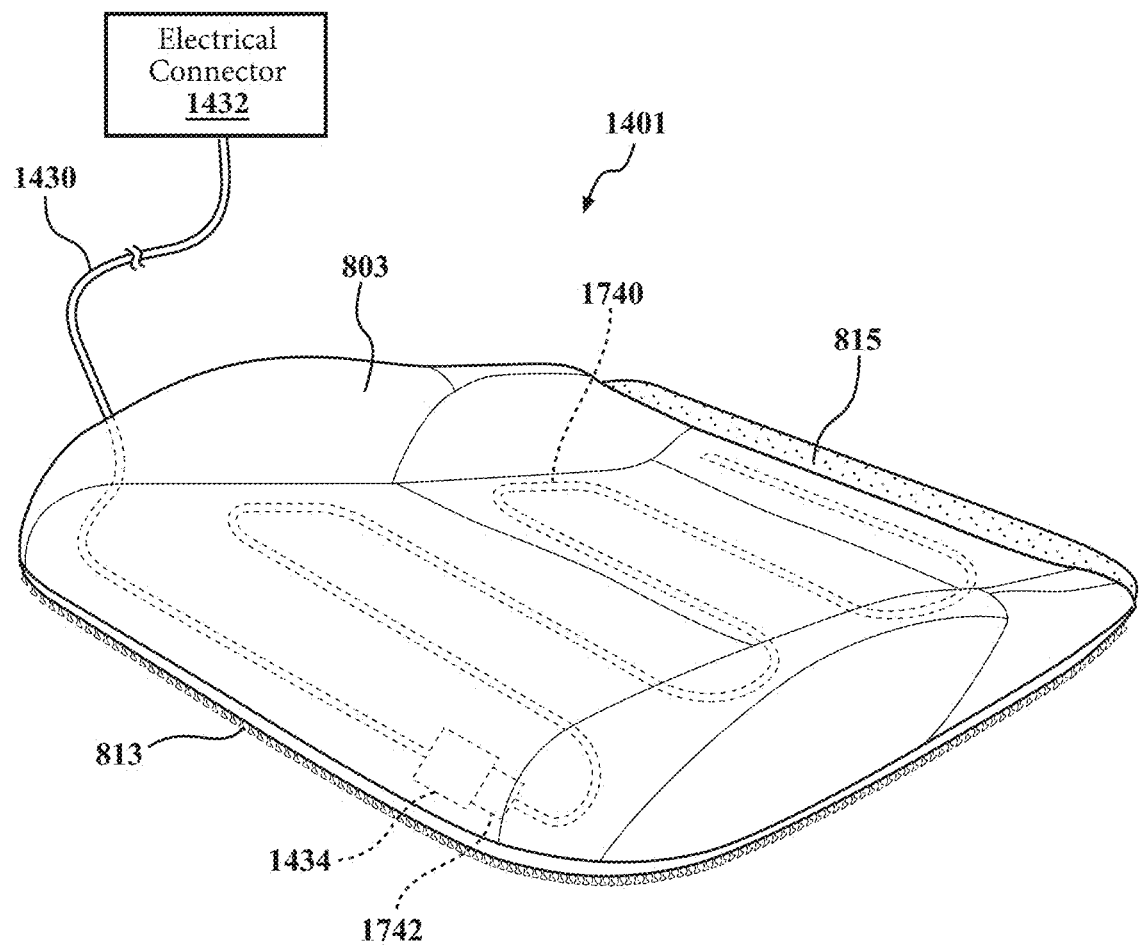

In another example, the electrical accessory may include an electric air pump 1742 to drive air through a channel 1740 formed in the material body 812 or seat material body 803, as depicted in FIGS. 17A and 17B. That is, a channel 1740 may be formed on the cushion-facing surface of the material body 812 and/or the cushion-facing surface of the seat material body 803. The channel 1740 may be formed of an air-permeable material or have perforations throughout, such that air pumped by the electric air pump 1742 may vent from the channel 1740 through the ventilated material body 812 and/or ventilated seat material body 803 to the occupant sitting in the seat 28. In this example, the removable trim cover 1402 and/or the removable seat cover 1401 may further be equipped with a controller 1434, through which a user may modify the operational settings for the electric air pump 1742, such as the intensity and duration of cooling.

In other examples, the electric air pump 1742 may pump air through the channel 1740 for other purposes. For example, the air may be pumped into channels 1740 in pulses to effectuate a massaging effect. That is, the inflation and deflation of the channel 1740 may deform the removable trim cover 1402 and/or the removable seat cover 1401 in a cyclic pattern, which may generate a massaging effect. Note that while FIGS. 17A and 17B depict a single channel 1740 in a particular orientation, in other embodiments, multiple channels 1740 in different orientations may be presented, for example, to provide a specific massaging effect/pattern.

Figure 18A:
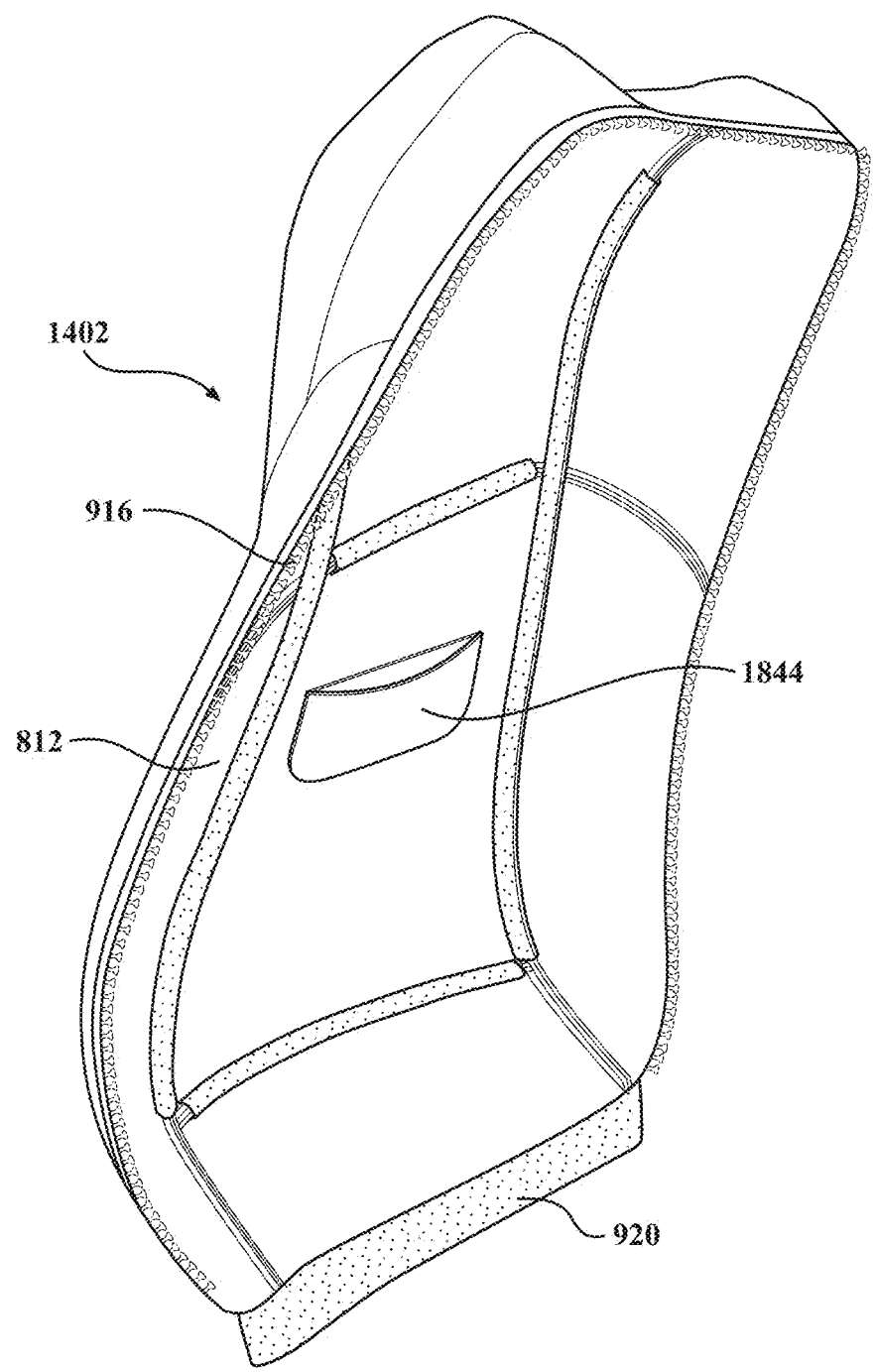
FIGS. 18A and 18B are schematic perspective views of removable cushion covers with a storage pocket in accordance with an embodiment described herein.
Figure 18B:
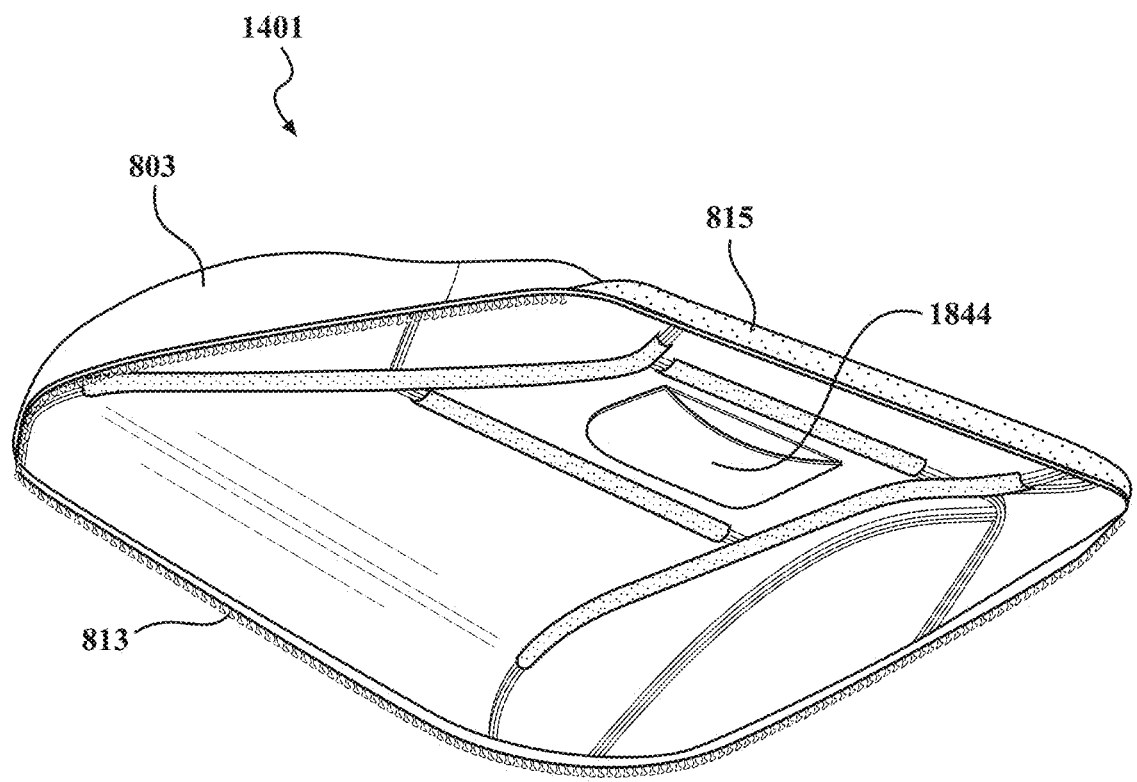

FIGS. 18A and 18B are schematic perspective views of a removable trim cover 1402 and the removable seat cover 1401 with a storage pocket 1844 in accordance with an embodiment described herein. As described above, the accessory component may be an electrical component. In another example, the accessory component is not electrical. For example, as depicted in FIGS. 18A and 18B, the accessory component may be a storage pocket 1844 formed on a cushion-facing surface of the material body 812 and/or the seat material body 803. In this storage pocket 1844, an individual may store items, such as items of value, which may be hidden from the view of malicious parties or passersby. For example, an individual may store a phone, watch, or money in the storage pocket 1844 when the vehicle is unattended. A passerby looking in the vehicle or who breaks into the vehicle may not see or be aware of the existence of the storage pocket 1844, such that the contents of the storage pocket 1844 may be safeguarded.

In an example, the storage pocket 1844 may be sewn into the cushion-facing surface of the material body 812 or seat material body 803. In another example, the storage pocket 1844 may be a separate component that is otherwise affixed to the cushion-facing surface of the material body 812 or the seat material body 803, for example, via an adhesive. In some examples, the storage pocket 1844 may be closeable. For example, the storage pocket 1844 may have a lid that is closed, for example, via magnetic attachment, hook-and-loop fastener, or a zipper.

Figure 19A:
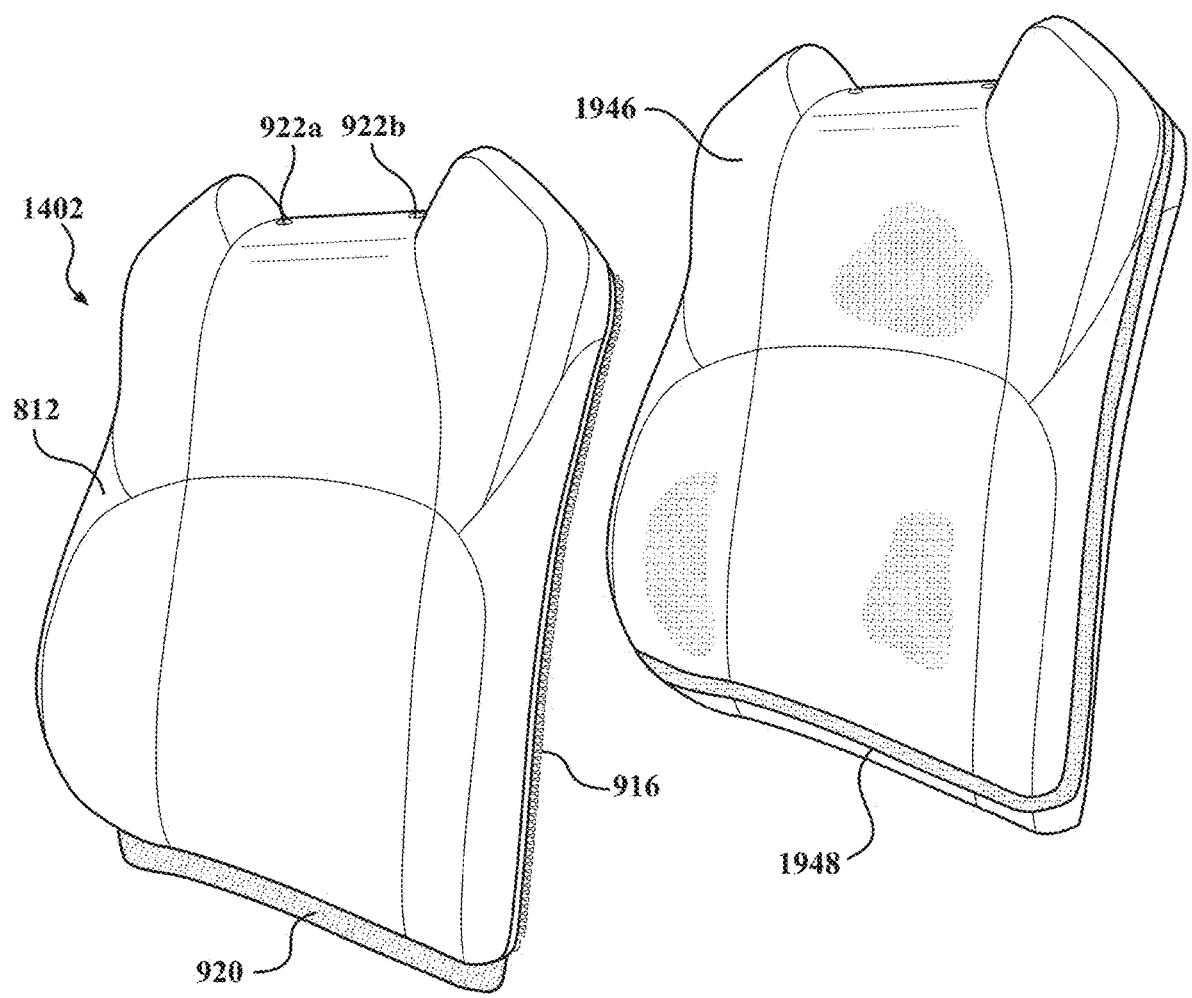
FIGS. 19A and 19B are schematic perspective views of removable cushion covers with a mid-layer accessory in accordance with an embodiment described herein.
Figure 19B:
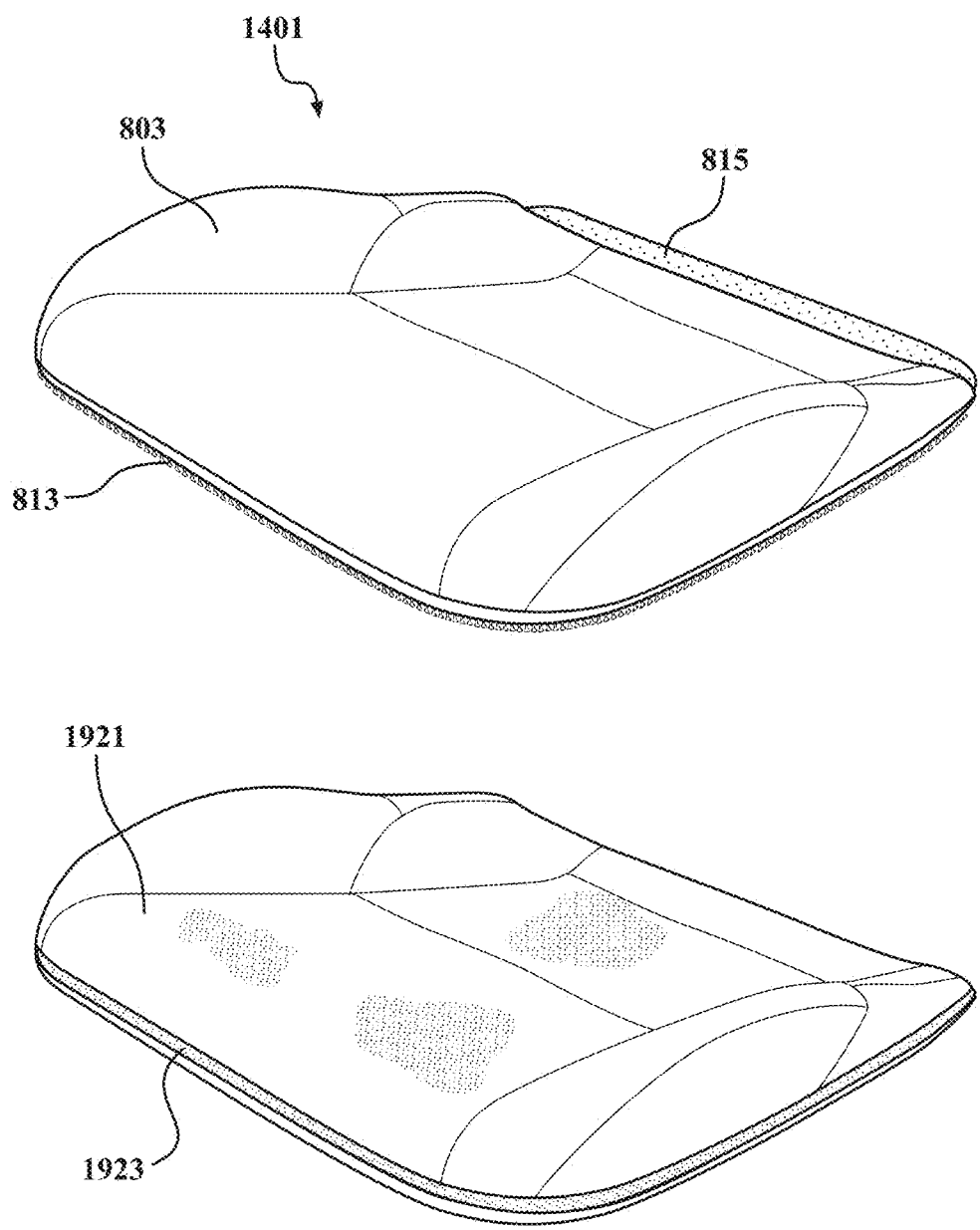

FIGS. 19A and 19B are schematic perspective views of a front surface of a removable trim cover 1402 and the removable seat cover 1401 with a mid-layer 1946 and 1921 accessory in accordance with an embodiment described herein. FIGS. 19A and 19B depict another example of a non-electrical accessory component. In the example depicted in FIG. 19A, the accessory component is a material cover-shaped mid-layer 1946 disposed between the backrest 100 and the material body 812. In the example depicted in FIG. 19B, the accessory component is a seat material cover-shaped mid-layer 1921 disposed between the seat bottom 34 and the seat material body 803. The mid-layers 1946 and 1921 may form a barrier between the material body 812/seat material body 803 and the cushions of the backrest 100/seat bottom 34 to, for example, prevent spilled liquid, debris, or other contaminants from reaching the backrest 100/seat bottom 34. For example, the mid-layers 1946 and 1921 may be formed of a material that is impervious to liquid. Such a material may be ill-suited for an occupant contact surface. However, as a barrier, it may preserve the integrity of the cushions. For example, the cushions may absorb liquid or otherwise be liquid impermeable. A liquid impermeable mid-layer 1946 and 1921 may prevent contaminants spilled on the material body 812/seat material body 803 from penetrating the backrest and seat cushions.

In an example, the mid-layers 1946 and 1921 are selectively removable from the material body 812/seat material body 803, for example, via hook-and-loop fasteners 1948 and 1923 disposed around the edge(s) of the respective mid-layers 1946 and 1921. Doing so may allow the material body 812 or seat material body 803 to be removed for various reasons. For example, the material body 812 and seat material body 803 may include perforations for ventilation and comfort. When soiled, the perforations may become clogged. A selectively removable mid-layer 1946 and 1921 may allow an individual to access the rear side of the material body 812 and seat material body 803 to clean such. In another example, a selectively removable mid-layer 1946 and 1921 may allow for repair and/or replacement of the material body 812/seat material body 803 and/or the mid-layers 1946 and 1921 separately from the other component.

In an example, the hook-and-loop fasteners 1948 and 1923 may be found on any number of edges of the respective material body 812 or seat material body 803. For example, the hook-and-loop fasteners 1948 and 1923 may be formed on four edges of the material body 812 or seat material body 803 (i.e., a top edge, an outboard side edge, an inboard side edge, and a bottom edge). In another example, the hook-and-loop fasteners 1948 and 1923 may be formed on a subset of the edges. In this example, those edges not joined via hook-and-loop fasteners 1948 and 1923 may be sewn to or otherwise joined together. As such, a selectively removable mid-layer 1946 and 1921 may provide access to the backside of a material body 812 or seat material body 803, as may be desired for several reasons.

Figure 20A:
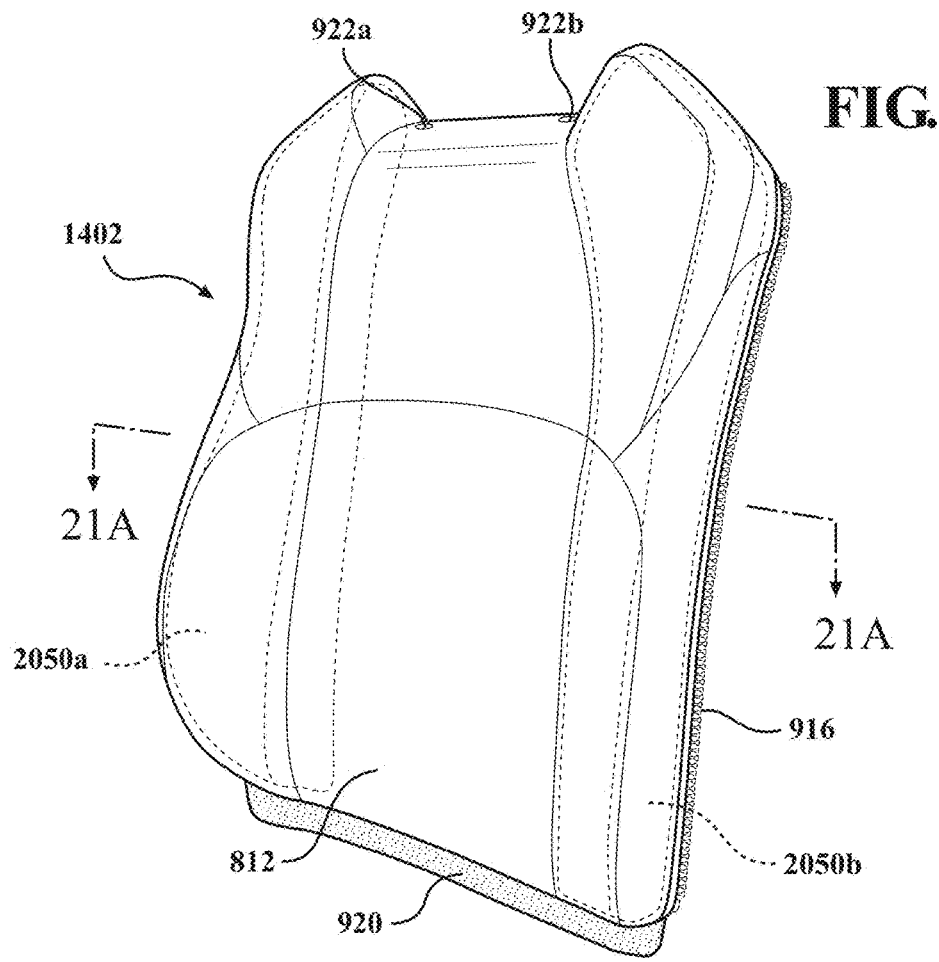
FIGS. 20A and 20B are schematic perspective views of removable cushion covers with a removable bolster in accordance with an embodiment described herein.
Figure 20B:
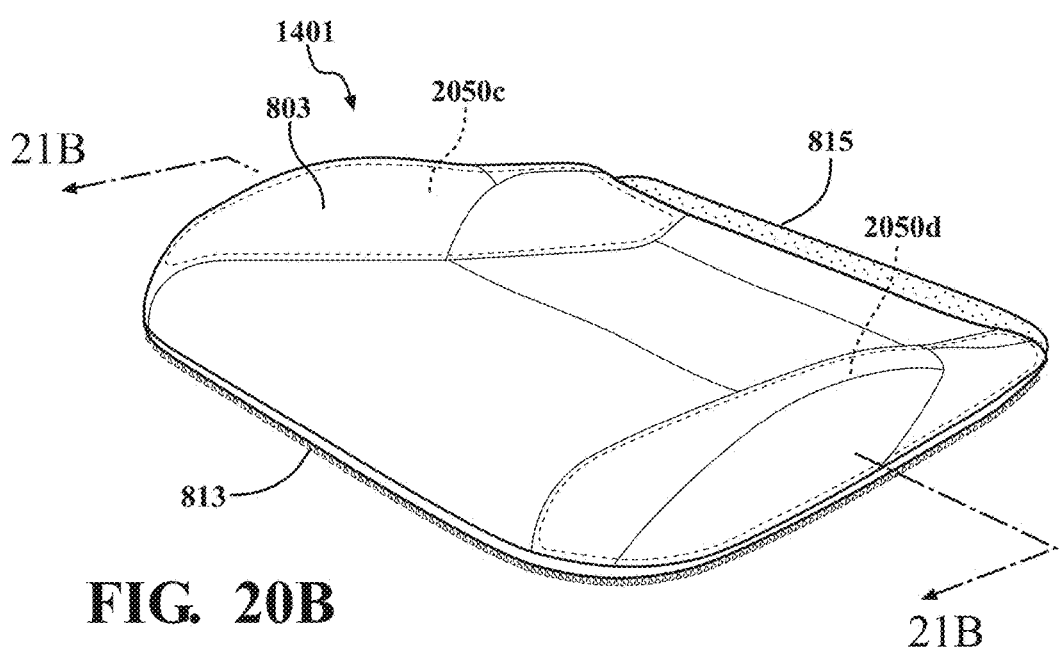

FIGS. 20A and 20B are schematic perspective views of a removable trim cover 1402 and the removable seat cover 1401 with removable bolsters 2050a, 2050b, 2050c, and 2050d in accordance with an embodiment described herein. Specifically, the removable trim cover 1402 includes removable trim bolsters 2050a and 2050b, and the removable seat cover 1401 includes removable seat bolsters 2050c and 2050d. In the example depicted in FIGS. 20A and 20B, the accessory component(s) are bolsters 2050a, 2050b, 2050c, and 2050d formed on a cushion-facing surface of the respective material body 812 or seat material body 803. That is, the removable trim cover 1402 and/or the removable seat cover 1401 may include a support structure to provide extra cushion for a passenger, for example, to keep the passenger generally centered and/or to prevent unnecessary or undesirable side-to-side motion. The bolsters 2050a, 2050b, 2050c, and 2050d are depicted in dashed lines in FIGS. 20A-21B to indicate their position on an interior surface (facing the cushion as opposed to facing the occupant) of the material body 812 and seat material body 803. While FIGS. 20A-21B depict particular bolsters 2050a, 2050b, 2050c, and 2050d having particular shapes and sizes, differently shaped and/or sized bolsters 2050a, 2050b, 2050c, and 2050d may be included herein and affixed to the cushion-facing surface of the material body 812 or the seat material body 803.

Figure 22A:
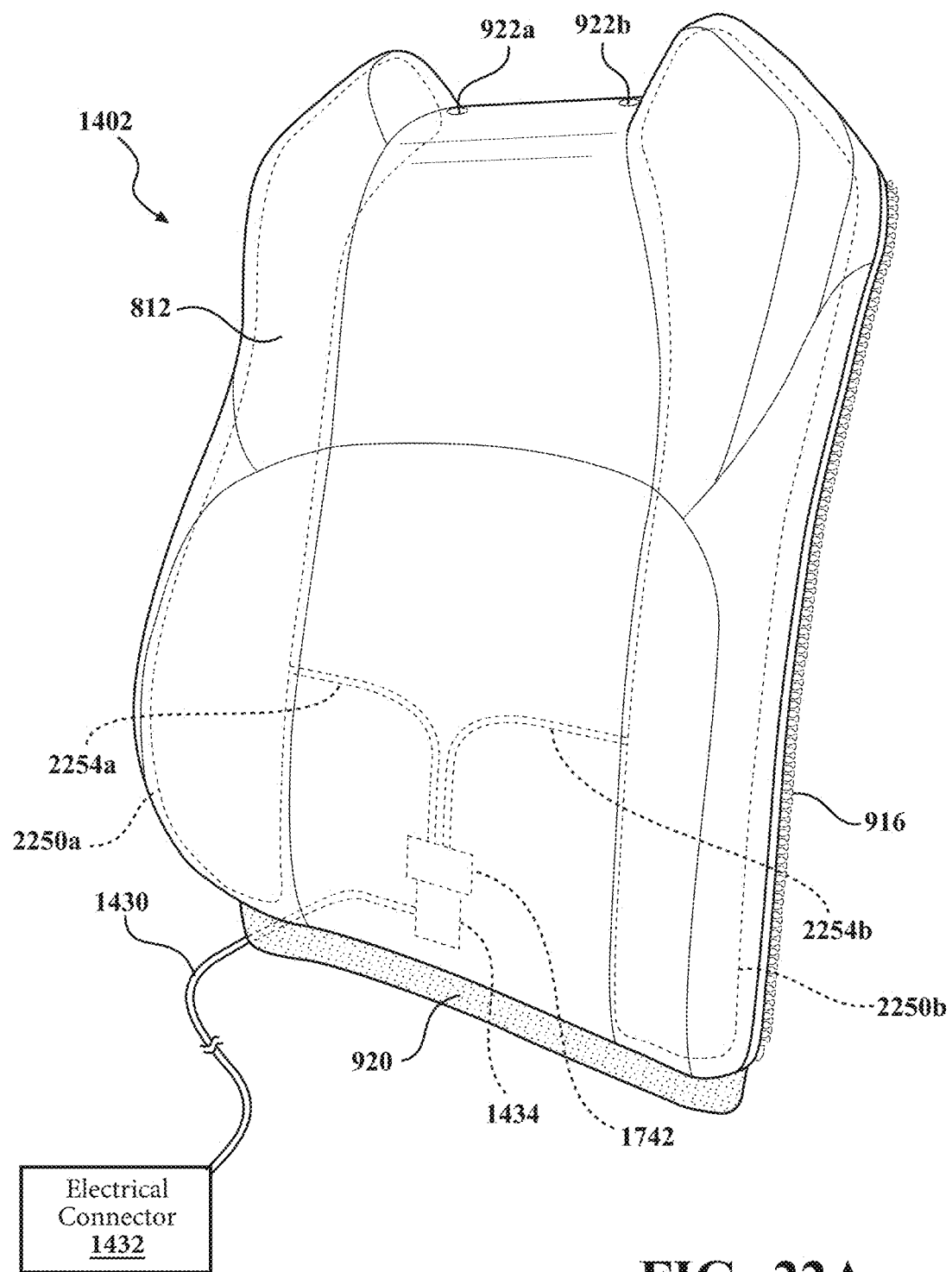
FIGS. 22A and 22B are schematic perspective views of removable cushion covers with an electric air pump and inflatable bolster supports in accordance with an embodiment described herein.
Figure 22B:
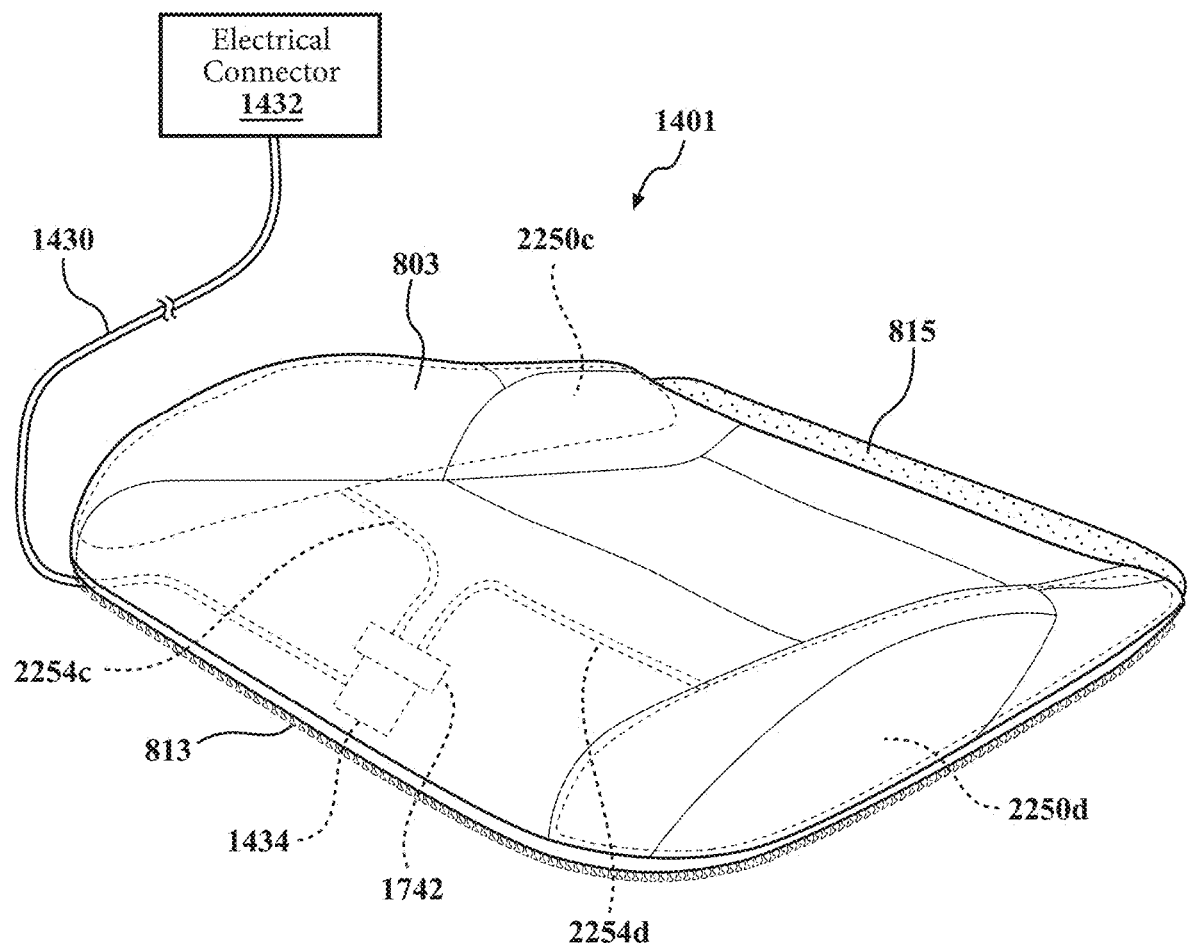

The bolsters 2050a, 2050b, 2050c, and 2050d may be of various types. For example, the bolsters 2050a, 2050b, 2050c, and 2050d may be foam bolsters. In another example, the bolsters 2050a, 2050b, 2050c, and 2050d may be inflatable bolsters. In this example, as depicted in FIGS. 22A and 22B, the removable trim cover 1402 and/or the removable seat cover 1401 may include an electric air pump 1742 to selectively inflate/deflate the inflatable bolsters. In yet another example, the bolsters 2050a, 2050b, 2050c, and 2050d may be gel-based bolsters.

Figure 21A:
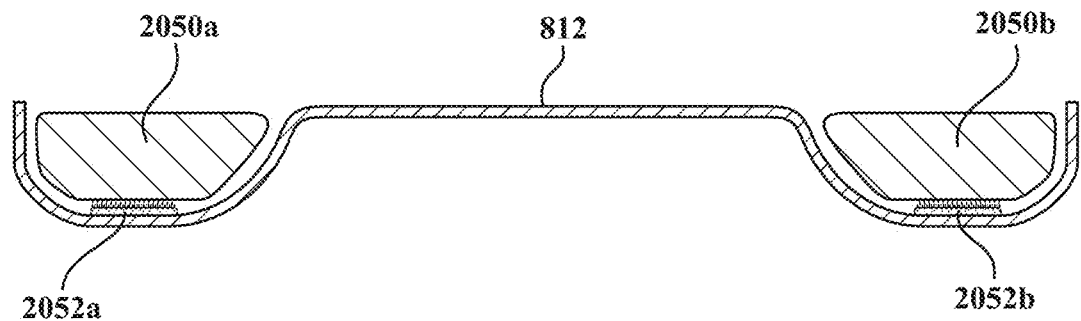
FIGS. 21A and 21B are schematic plan cross-sectional views of the removable cushion covers of FIGS. 20A and 20B, respectively.
Figure 21B:
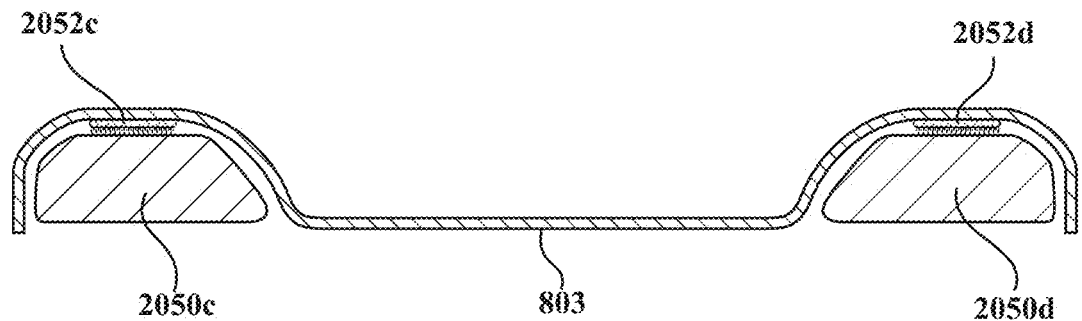

In any example, the bolsters 2050a, 2050b, 2050c, and 2050d may be removable from the respective material body 812 or seat material body 803. That is, the trim bolsters 2050a and 2050b may include attachment devices 2052a and 2052b to selectively attach the trim bolsters 2050a and 2050b to the backrest-facing surface of the material body 812, and the seat bolsters 2050c and 2050d may include attachment devices 2052c and 2052d to selectively attach the seat bolsters 2050c and 2050d to the bottom-facing surface of the seat material body 803. For example, the attachment devices 2052a, 2052b, 2052c, and 2052d may be hook-and-loop fasteners, as depicted in FIGS. 21A and 21B, which are cross-sectional views of the removable trim cover 1402 and the removable seat cover 1401, respectively depicted in FIGS. 20A and 20B. While particular reference is made to hook-and-loop type attachment devices, the attachment devices 2052a, 2052b, 2052c, and 2052d may take other forms, such as magnetic or zipper-type attachment devices. In any case, the bolsters 2050a, 2050b, 2050c, and 2050d may be selectively removed from the respective material body 812 or seat material body 803 to facilitate repair and/or replacement of the material body 812/seat material body 803 and/or the bolsters 2050a, 2050b, 2050c, and 2050d.

FIGS. 21A and 21B depict cross-sectional views of the removable trim cover 1402 of FIGS. 20A and 21B, specifically taken along the lines 21A-21A and 21B-21B, respectively. As depicted in FIGS. 21A and 21B, the bolsters 2050a, 2050b, 2050c, and 2050d are separate from the padding of the backrest 100 and/or the seat bottom 34 and are attached to an interior (i.e., cushion-facing) surface of the material body 812 or seat material body 803. Accordingly, a backrest 100 or seat bottom 34 that may otherwise not have the contours provided by bolsters 2050a, 2050b, 2050c, and 2050d may be supplemented with such.

FIGS. 22A and 22B are schematic perspective views of a removable trim cover 1402 and a removable seat cover 1401 with an electric air pump 1742 and inflatable bolsters 2250a, 2250b, 2250c, and 2250d. Specifically, the removable trim cover 1402 includes inflatable trim bolsters 2250a and 2250b, and the removable seat cover 1401 includes inflatable seat bolsters 2250c and 2250d. The electric air pump 1742 drives air through the inflatable bolsters 2250a, 2250b, 2250c, and 2250d formed in the material body 812 or seat material body 803 through respective air conduits 2254a, 2254b, 2254c, and 2254d. Upon inflation, the inflatable bolsters 2250a, 2250b, 2250c, and 2250d may provide additional bolster support and/or lumbar support based on where the inflatable bolsters 2250a, 2250b, 2250c, and 2250d are positioned. While FIGS. 22A and 22B depict the inflatable bolsters 2250a, 2250b, 2250c, and 2250d in a particular position, i.e., on lateral sides of the removable trim cover 1402 and/or the removable seat cover 1401, these inflatable bolsters 2250a, 2250b, 2250c, and 2250d may be located at other regions.

In this example, the removable trim cover 1402 and removable seat cover 1401 may further be equipped with a controller 1434, through which a user may modify the operational settings for the electric air pump 1742, such as the intensity and size of the inflatable bolsters 2250a, 2250b, 2250c, and 2250d. In this example, the removable trim cover 1402 and/or the removable seat cover 1401 may include an electrical cable 1430 coupled to an electrical connector 1432 that connects the electrical accessory component to a power source of a vehicle in which the removable trim cover 1402 and/or the removable seat cover 1401 is disposed.

Figure 23:
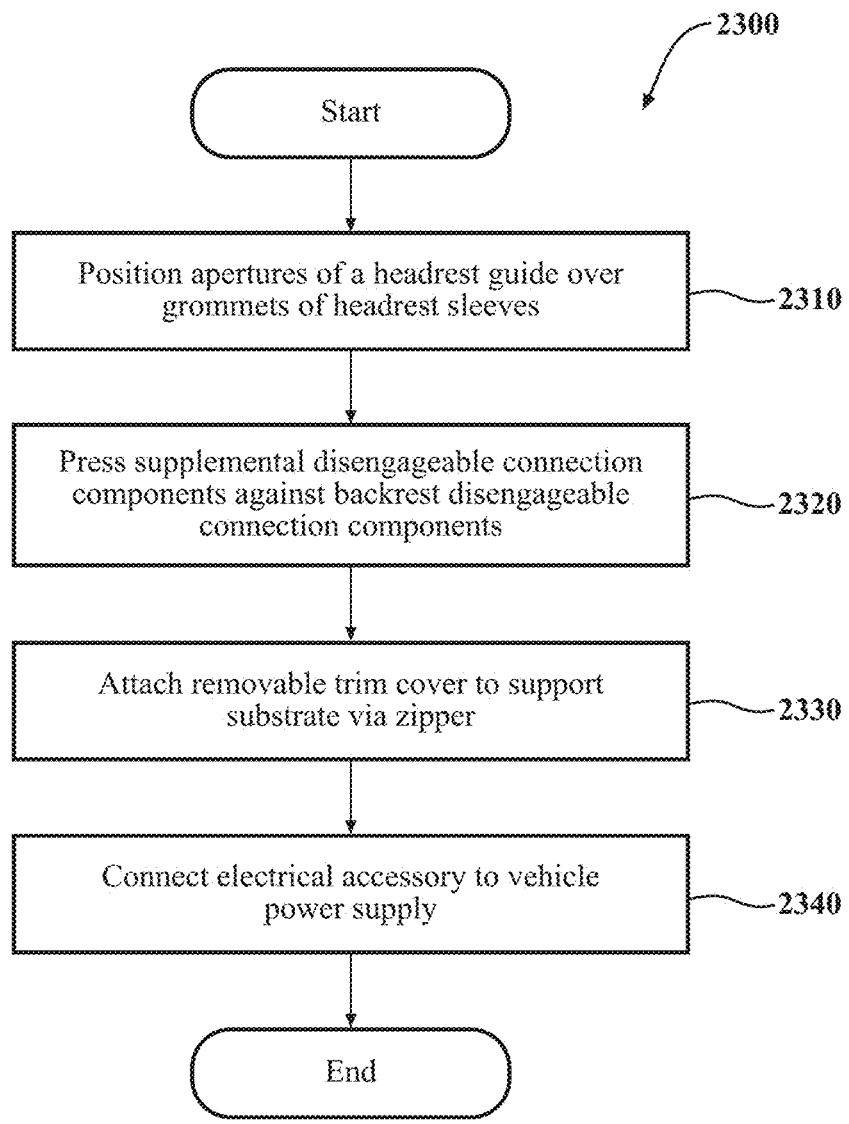
FIG. 23 is a flowchart depicting a method of installing a removable trim cover in accordance with an embodiment described herein.

FIG. 23 is a flowchart depicting a method 2300 of installing a removable trim cover 802 in accordance with an embodiment described herein. As described above, at 2310, a user positions the apertures 922a and 922b formed on the material body 812 around the headrest sleeve grommets 924a and 924b of the headrest sleeves. That is, the apertures 922a and 922b are formed in a panel (i.e., portion 926) of the removable trim cover 802 that is elastically deformable such that the smaller diameter apertures 922a and 922b may be stretched to fit over the headrest sleeve grommets 924a and 924b. When the stretching force is removed after the apertures 922a and 922b have been passed over the headrest sleeve grommets 924a and 924b, the apertures 922a and 922b return to their pre-stretched diameter, obscured by the larger-sized headrest sleeve grommets 924a and 924b.

At 2320, supplemental disengageable connection components 926a, 926b, and 926c are pressed against the backrest disengageable connection components (whether such are attached directly to the backrest 100 or the base trim cover 1042). As described above, each supplemental and backrest disengageable connection component may include one half of a hook-and-loop fastener system. As such, by pressing such together in the trenches 191, 194, and 195 of the backrest 100, the user engages the hooks and loops to retain the removable trim cover 802 in place. At 2330, the user may further secure the removable trim cover 802 to the support substrate 804 (i.e., the backrest 100 or the base trim cover 1042) via the zipper 806. That is, the user may join the first zipper portion 916 to the second zipper portion 918 and advance the zipper slider to enmesh the teeth of the corresponding zipper portions to join the removable trim cover 802 to the support substrate 804.

In some examples, as described above, the removable trim cover 1402 includes an accessory component, which may be an electrical component. At 2340, a user may connect the electrical accessory component to a vehicle power supply. For example, a user may connect an electrical connector 1432 (such as a 12-V connector) into a corresponding socket in the vehicle to power the electrical accessory. In another example, the user may connect another type of electrical connector to the vehicle power supply, for example, via a wiring harness of the vehicle below the seat 28.

Figure 24:
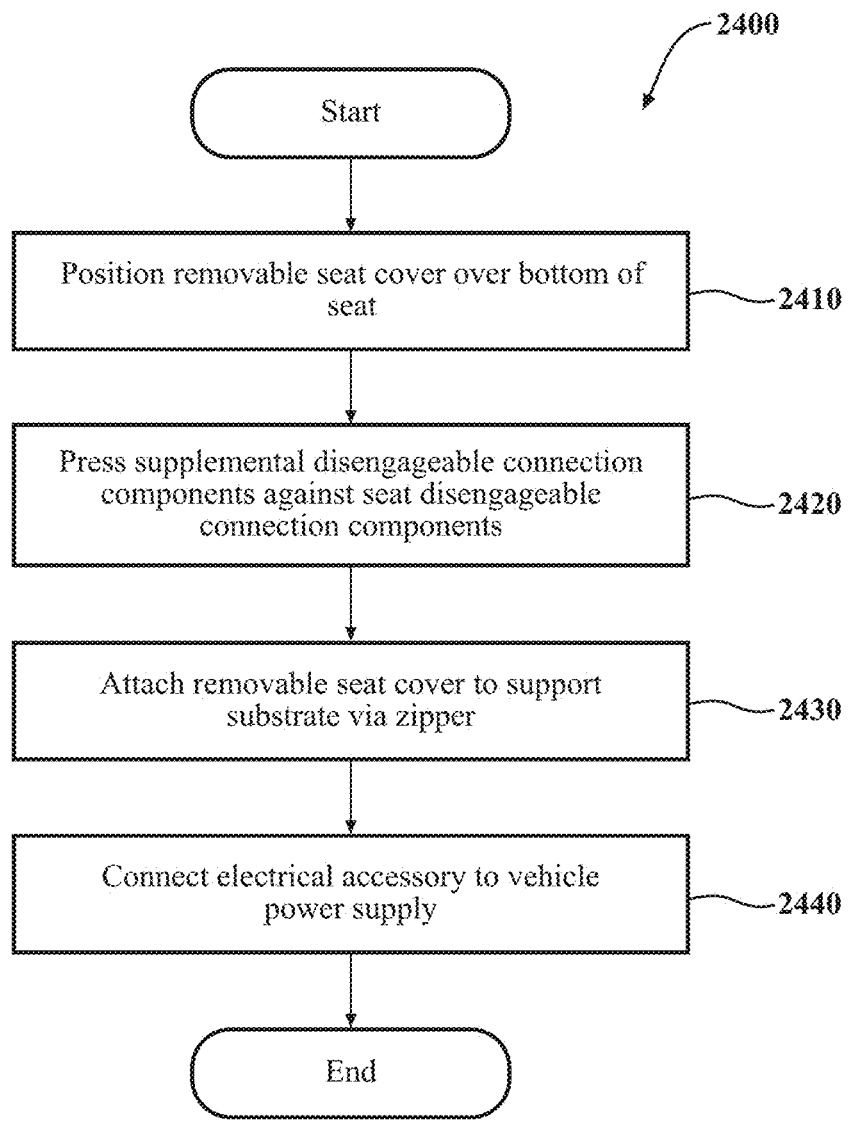
FIG. 24 is a flowchart depicting a method of installing a removable seat cover in accordance with an embodiment described herein.

FIG. 24 is a flowchart depicting a method 2400 of installing a removable seat cover 801 in accordance with an embodiment described herein. At 2410, a user positions the removable seat cover 801 over the seat bottom 34. Specifically, the user positions the removable seat cover 801 over the top surface of the seat bottom 34.

At 2420, supplemental disengageable connection components 926a, 926b, and 926c are pressed against the seat disengageable connection components (whether such are attached directly to the seat bottom 34 or the base seat cover). As described above, each supplemental and backrest disengageable connection component may include one half of a hook-and-loop fastener system. As such, by pressing them together in the trenches of the seat bottom 34, the user engages the hooks and loops to retain the removable seat cover 801 in place. At 2430, the user may further secure the removable seat cover 801 to the seat support substrate 805 (i.e., the seat bottom 34 or the base seat cover) via the seat zipper 807. That is, the user may join the seat first zipper portion 813 to the seat second zipper portion 811 and advance the slider of the zipper to enmesh the teeth of the corresponding zipper portions to join the removable seat cover 801 to the seat support substrate 805.

In some examples, as described above, the removable seat cover 1401 includes an accessory component, which accessory component may be an electrical component. At 2440, a user may connect the electrical accessory component to a vehicle power supply. For example, a user may connect an electrical connector 1432 (such as a 12-V connector) into a corresponding socket in the vehicle to power the electrical accessory. In another example, the user may connect another type of electrical connector to the vehicle power supply, for example, via a wiring harness of the vehicle below the seat 28.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A removable trim cover, comprising:
a material body sized to cover a front face of a backrest of a seat, the material body having apertures forming a headrest guide that is adapted to align with headrest sleeves in the backrest; and
a first zipper portion, disposed around a border of the material body, adapted to be joined with a second zipper portion that is disposed on a base trim cover that envelops cushions of the backrest.

2. The removable trim cover of claim 1, wherein:
the first zipper portion is adapted to be joined with the second zipper portion that is affixed to an outboard side surface, a top backside surface, and an inboard side surface of the base trim cover; and
a central portion of the first zipper portion is adapted to be joined with a central portion of the second zipper portion that is behind a headrest of the seat.

3. The removable trim cover of claim 1, wherein a headrest portion of the material body that is around the headrest guide and that is adapted to be disposed under a headrest, is formed of an elastically deformable material that is different from material of other portions of the material body.

4. The removable trim cover of claim 3, wherein the elastically deformable material is adapted to stretch and deform over headrest sleeve grommets on the backrest.

5. The removable trim cover of claim 1, further comprising supplemental disengageable connection components on a cushion-facing surface of the material body, the supplemental disengageable connection components are adapted to connect to corresponding backrest disengageable connection components to affix the material body to the base trim cover.

6. The removable trim cover of claim 5, wherein the supplemental disengageable connection components, when joined to the corresponding backrest disengageable connection components, are adapted to be at least partially disposed within trenches between cushions of the backrest.

7. The removable trim cover of claim 1, wherein:
the first zipper portion is a perimetric zipper portion disposed around a full boundary of the material body; and
the first zipper portion is adapted to be joined with the second zipper portion that is affixed to an outboard side surface, a top backside surface, an inboard side surface, and a bottom surface of the base trim cover.

8. The removable trim cover of claim 1, further comprising an attachment device disposed along a bottom edge of the material body, adapted to be joined with a mating attachment device on a bottom edge of a backrest center portion of a base trim cover or a lower edge of a rear portion of the base trim cover.

9. A removable trim cover, comprising:
a material body sized to cover a front face of a backrest of a seat and a headrest of the seat; and
a first zipper portion, disposed around a border of the material body, adapted to be joined with a second zipper portion that is disposed on a base trim cover that envelops cushions of the backrest, a central portion of the first zipper portion is adapted to be joined with a central portion of the second zipper portion that is behind the headrest of the seat.

10. The removable trim cover of claim 9, wherein the first zipper portion is adapted to be joined with the second zipper portion that is affixed to an outboard side surface, a top backside surface, and an inboard side surface of the backrest base trim cover.

11. The removable trim cover of claim 9, further comprising supplemental disengageable connection components on a cushion-facing surface of the material body, the supplemental disengageable connection components are adapted to connect to corresponding backrest disengageable connection components to affix the material body to the base trim cover.

12. The removable trim cover of claim 11, wherein the supplemental disengageable connection components, when joined to the corresponding backrest disengageable connection components, are adapted to be at least partially disposed within trenches between cushions of the backrest.

13. The removable trim cover of claim 9, wherein:
the first zipper portion is a perimetric zipper portion disposed around a full boundary of the material body; and
the first zipper portion is adapted to be joined with the second zipper portion that is affixed to an outboard side surface, a top backside surface, an inboard side surface, and a bottom surface of the base trim cover.

14. The removable trim cover of claim 9, further comprising an attachment device disposed along a bottom edge of the material body, adapted to be joined with a mating attachment device on a bottom edge of a backrest center portion of a base trim cover or a lower edge of a rear portion of the base trim cover.

15. A removable cushion cover, comprising:
a material cover sized to cover an occupant-facing surface of a cushion of a seat;
a first zipper portion, disposed around a border of the material cover, adapted to be joined with a second zipper portion that is disposed on a trim cover that envelops the cushion of the seat; and
an accessory component integrated with the material cover.

16. The removable cushion cover of claim 15, wherein:
the material cover comprises a material body sized to cover a front surface of a cushion of a backrest of the seat; or
the material cover comprises a seat material body sized to cover a top surface of a cushion of a bottom of the seat.

17. The removable cushion cover of claim 15, wherein:
the accessory component is an electrical accessory; and
the removable cushion cover further comprises an electrical cable adapted to connect the electrical accessory to a power source of a vehicle in which the removable cushion cover is disposed.

18. The removable cushion cover of claim 17, wherein the electrical accessory comprises at least one of:
an occupant sensor;
a feedback device;
a massaging device;
a heating device; or
an electric air pump to drive air through a channel formed in the material cover.

19. The removable cushion cover of claim 15, wherein the accessory component is a storage pocket formed on a cushion-facing surface of the material cover.

20. The removable cushion cover of claim 15, wherein the accessory component comprises at least one bolster formed on a cushion-facing surface of the material cover.

21. The removable cushion cover of claim 20, wherein the at least one bolster comprises an attachment device to selectively attach the at least one bolster to a cushion-facing surface of the material cover.

22. The removable cushion cover of claim 15, wherein:
the accessory component is a material cover-shaped mid-layer disposed between the cushion and the material cover; and
the material cover-shaped mid-layer is selectively attachable to the material cover.

23. The removable trim cover of claim 1, wherein the first zipper portion is adapted to be joined with the second zipper portion that is inset from an edge of the base trim cover.

24. The removable trim cover of claim 9, wherein the first zipper portion is adapted to be joined with the second zipper portion that is inset from an edge of the base trim cover.

* * * * *